United States Patent
Murahashi et al.

(10) Patent No.: US 11,801,867 B2
(45) Date of Patent: Oct. 31, 2023

(54) VEHICLE CONTROL DEVICE AND VEHICLE CONTROL METHOD

(71) Applicant: HONDA MOTOR CO., LTD., Tokyo (JP)

(72) Inventors: Yoshimitsu Murahashi, Wako (JP); Takahiro Yoshida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 233 days.

(21) Appl. No.: 17/213,647

(22) Filed: Mar. 26, 2021

(65) Prior Publication Data

US 2021/0309254 A1  Oct. 7, 2021

(30) Foreign Application Priority Data

Mar. 30, 2020 (JP) .................................. 2020-061378
Mar. 24, 2021 (JP) .................................. 2021-050544

(51) Int. Cl.
*B60W 60/00* (2020.01)
*B60W 30/095* (2012.01)
(Continued)

(52) U.S. Cl.
CPC ...... *B60W 60/0015* (2020.02); *B60W 30/095* (2013.01); *B60W 30/18109* (2013.01);
(Continued)

(58) Field of Classification Search
None
See application file for complete search history.

(56) References Cited

U.S. PATENT DOCUMENTS

2007/0192013 A1   8/2007  Bando et al.
2009/0316956 A1  12/2009  Higuchi et al.
(Continued)

FOREIGN PATENT DOCUMENTS

JP   2009-051356 A   3/2009
JP   2010-003254 A   1/2010
(Continued)

OTHER PUBLICATIONS

Office Action received in corresponding Japanese application No. 2021-050544 dated Oct. 4, 2022 with English translation (6 pages).

*Primary Examiner* — Christian Chace
*Assistant Examiner* — Shayne M. Gilbertson
(74) *Attorney, Agent, or Firm* — Rankin, Hill & Clark LLP

(57) ABSTRACT

A vehicle control device of a vehicle includes: an action plan creating part that creates an action plan for autonomous driving by the vehicle; and a distance detection part that outputs detection information on detection of an object. The action plan creating part includes a collision probability map setting part configured to, when the distance detection part detects an obstacle, determine a collision probability map, which is a two-dimensional map of a collision probability distribution representing likelihood of a collision between the vehicle and the detected obstacle in a two-dimensional space of a location and a speed. The action plan creating part is configured to create a current action plan based on the collision probability map, a predetermined target collision probability, and a current location and a current speed of the vehicle.

13 Claims, 38 Drawing Sheets

(51) Int. Cl.
*B60W 30/18* (2012.01)
*G06V 20/58* (2022.01)
(52) U.S. Cl.
CPC ......... *G06V 20/58* (2022.01); *B60W 2510/18* (2013.01); *B60W 2554/4049* (2020.02)

(56) References Cited

U.S. PATENT DOCUMENTS

| | | |
|---|---|---|
| 2010/0106387 A1 | 4/2010 | Tsuchida |
| 2012/0022716 A1 | 1/2012 | Kitahama et al. |
| 2015/0032290 A1 | 1/2015 | Kitahama et al. |
| 2016/0280266 A1* | 9/2016 | Kawamata .......... B60W 10/184 |
| 2019/0333386 A1* | 10/2019 | Horita .................... G08G 1/166 |
| 2021/0139023 A1* | 5/2021 | Crego ............. B60W 60/00276 |
| 2021/0139024 A1* | 5/2021 | Crego ............... B60W 30/0953 |

FOREIGN PATENT DOCUMENTS

| | | |
|---|---|---|
| JP | 2010-198578 A | 9/2010 |
| JP | 4796400 B2 | 10/2011 |
| JP | 4967840 B2 | 7/2012 |

* cited by examiner

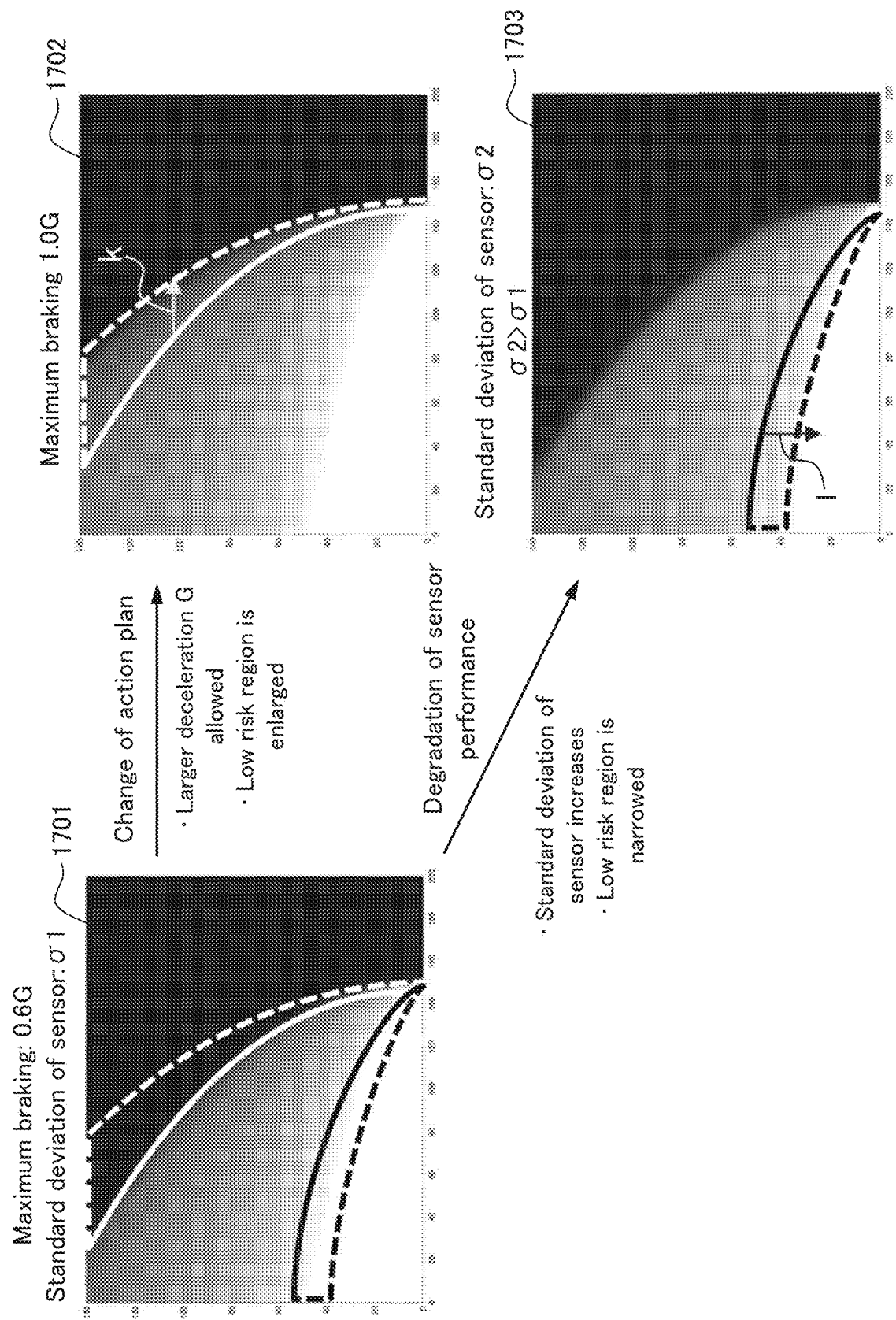

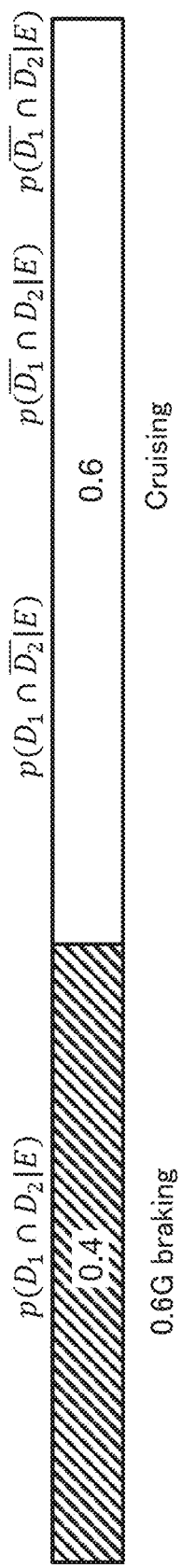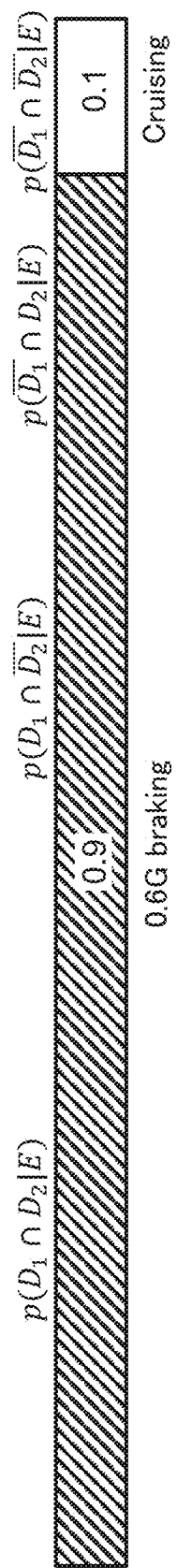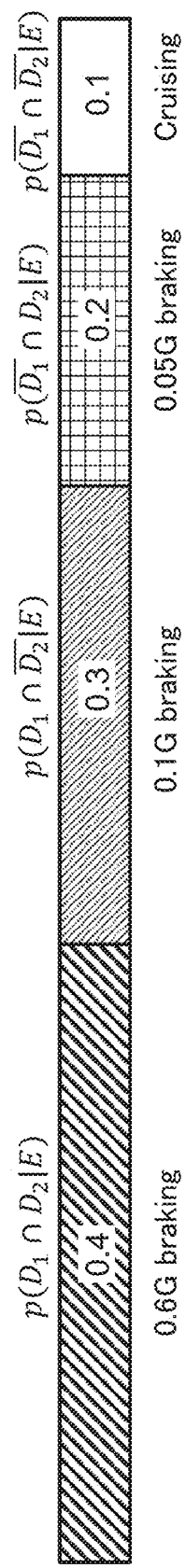

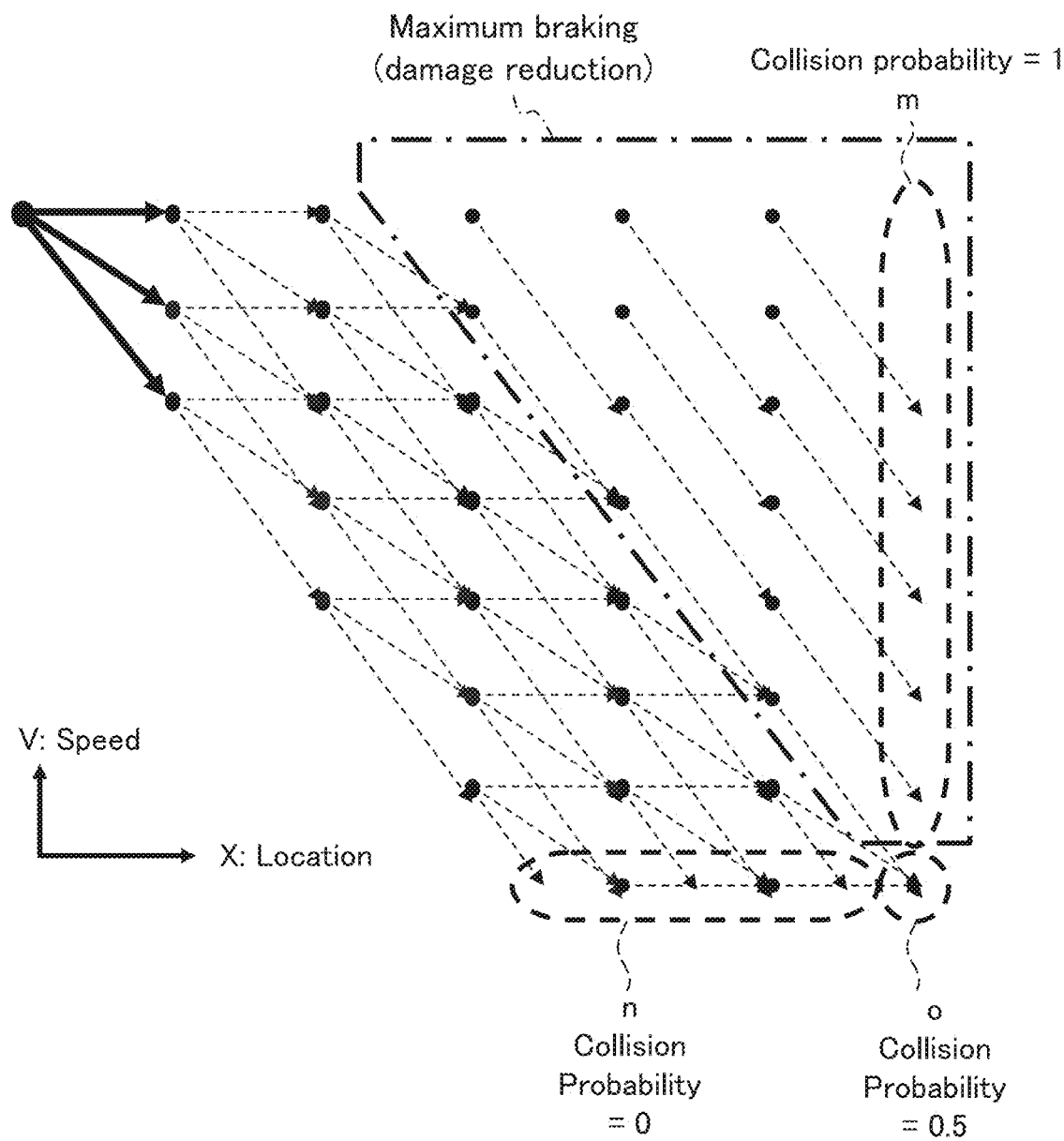

$\Delta T_x < \Delta T_v$ $\Delta T_x \geqq \Delta T_v$

FIG. 39

$$p(C|S_c) = \int \int p(C|S_n) p(S_n|S_c, \alpha(\hat{d})) p(\hat{d}|S_c) d\hat{d}\, dS_n \quad \cdots \quad (24)$$

$$p_c(G_{xc}, G_{vc}) = \sum_{\hat{d}_1} \sum_{\hat{d}_2} \sum_{\epsilon_\alpha} p(\hat{d}_1) p(\hat{d}_2) p(\epsilon_\alpha) p_c(g_{xn}, g_{vn}) \quad \cdots \quad (25)$$

VEHICLE CONTROL DEVICE AND VEHICLE CONTROL METHOD

CROSS-REFERENCE TO RELATED APPLICATIONS

The present application claims priority under 35 U.S.C. § 119 to Japanese Patent Application No. 2020-061378, filed Mar. 30, 2020 and Japanese Patent Application No. 2021-050544, filed Mar. 24, 2021, the disclosures of which are herein incorporated by reference in their entireties.

BACKGROUND

1. Technical Field

The present invention relates to a vehicle control device and a vehicle control method.

2. Description of Related Art

Japanese patent No. 4796400 discloses a vehicle speed control apparatus that includes: a target speed calculation part configured to calculate, based on an location error probability distribution and data stored in advance and representing an acceleration or the gradient thereof that does not cause an uncomfortable feeling to the driver in a manner depending on the distance from a location point where the speed is to be changed to a target destination, a target speed value at each location point in such a manner that the variation in the speed of the vehicle is controlled along a continuous curve; and a speed control part configured to detect the speed of the vehicle and control the driving torque to control the speed to the target speed value.

Japanese patent No. 4967840 discloses a collision damage reduction apparatus that includes: an object detection means for detecting a nearby object around an own vehicle; a collision likelihood determination means for determining a likelihood of collision of the own vehicle with an object detected by the object detection means on a discrete-time basis; a collision impact reduction means for performing a control for reducing the impact of collision based on the collision likelihood determined by the collision likelihood determination means.

SUMMARY

Problems to be Solved by Invention

The technique disclosed in Japanese Patent No. 4796400 controls the speed of the vehicle based on a location error probability distribution. The technique disclosed in Japanese Patent No. 4967840 determines a likelihood of collision between the own vehicle and an object. Both the techniques are to perform a speed control on the vehicle based on the location error probability distribution or the collision likelihood, which speed control is not related to an action plan for autonomous driving. There is a problem that in the event of determining an action plan using sensors, the distance to be detected by the sensors may not be enlarged while maintaining the reliability of the sensors due to insufficient detectable distances of the sensors. In addition, another problem of the conventional techniques is an insufficiency of clarification of safety levels and an insufficiency of quantification of reliability (accuracy, detection probability) of the sensors and the accuracy of the action plan.

The present invention has been made in view of such problems, and it is an object of the present invention to provide a vehicle control device and a vehicle control method that can provide safety and comfort.

Solution

To solve the above described problems, a vehicle control device according to a certain embodiment of the present invention is a vehicle control device configured to control a vehicle and includes: an action plan creating part configured to create an action plan for autonomous driving of the vehicle; a vehicle behavior control part configured to control at least a speed of the vehicle based on the action plan; and a distance detection part configured to detect an object and output detection information on detection of the object. The action plan creating part is configured to set a maximum deceleration of the vehicle for autonomous driving. The action plan creating part includes a collision probability map setting part configured to, when the distance detection part detects an obstacle, determine a collision probability map, which is a two-dimensional map of a collision probability distribution representing likelihood of a collision between the vehicle and the detected obstacle in a two-dimensional space of a location and a speed. The collision probability map has been created based on a target stop location determined based on a predetermined target collision probability, the maximum deceleration, and the detection information. The action plan creating part is configured to create a current action plan based on the collision probability map, the predetermined target collision probability, and a current location and a current speed of the vehicle.

According to the present invention, it is possible to provide a vehicle control device and a vehicle control method that are capable of providing safety and comfort.

BRIEF DESCRIPTION OF THE DRAWINGS

FIG. 56 illustrates a detection probability P(D|E) that a sensor will detect an obstacle in a state of the obstacle being present.

FIG. 6 illustrates an example of overdetection setting using values detected by the sensors in a distance range where the reliability of the sensors is low in the determination of the action plan illustrated in FIG. 5D.

FIG. 7 illustrates an example of high-reliability detection setting using values detected by the sensors in a distance range where the reliability of the sensors is high in the determination of the action plan illustrated in FIG. 5D.

FIG. 17 is an explanatory diagram for explaining the influence of the action plan and/or sensors of the vehicle control device according to the embodiment to the collision risk. Reference numeral 1701 in FIG. 17 denotes a collision probability map for a case where the maximum braking is 0.6G and the standard deviation of the sensor error is σ1. Reference numeral 1702 in FIG. 17 denotes a collision probability map for a case where the action plan setting of the collision probability map 1701 has been modified. The target collision probability for this case is indicated on the collision probability map 1702. Reference numeral 1703 in FIG. 17 denotes a collision probability map for a case where the sensor performance has degraded from the one in collision probability map 1701. The target collision probability for this case is indicated on the collision probability map 1703.

FIGS. 18A to 18C are each an explanatory diagram for explaining utilization of the reliabilities (detection probabilities) of plural sensors of the vehicle control device according to the embodiment. FIG. 18A illustrates the concept of braking using the results of detection by plural sensors with an AND logic; FIG. 18B illustrates the concept of braking using the results of detection by plural sensors with an OR logic; and FIG. 18C illustrates the concept of braking according to the detection state of plural sensors.

FIG. 22A illustrates an example in which a state transition is made from the initial state so as not to reduce the speed in the state transition tree shown in FIG. 21.

FIG. 22B illustrates an example in which a state transition is made from the initial state so as to slightly reduce the speed in the state transition tree shown in FIG. 21.

FIG. 22C illustrates an example in which a state transition is made from the initial state so as to reduce the speed in the state transition tree shown in FIG. 21.

FIG. 23 is an explanatory diagram for explaining the relationship of an algorithm and the action-based state transition tree shown in FIG. 21.

FIG. 31A illustrates a target speed curve based on an action plan in which the concept of collision probability has been introduced.

FIG. 31B illustrates a collision probability distribution when speed is 0.

FIG. 31C illustrates an error distribution of the distance detection part.

FIG. 31D represents a detection probability of the distance detection part.

FIG. 39 shows Formula (24) and Formula (25).

DETAILED DESCRIPTION OF EMBODIMENTS

An embodiment of the present invention is described in detail below with reference to the drawings.

EMBODIMENT

Figure 1:
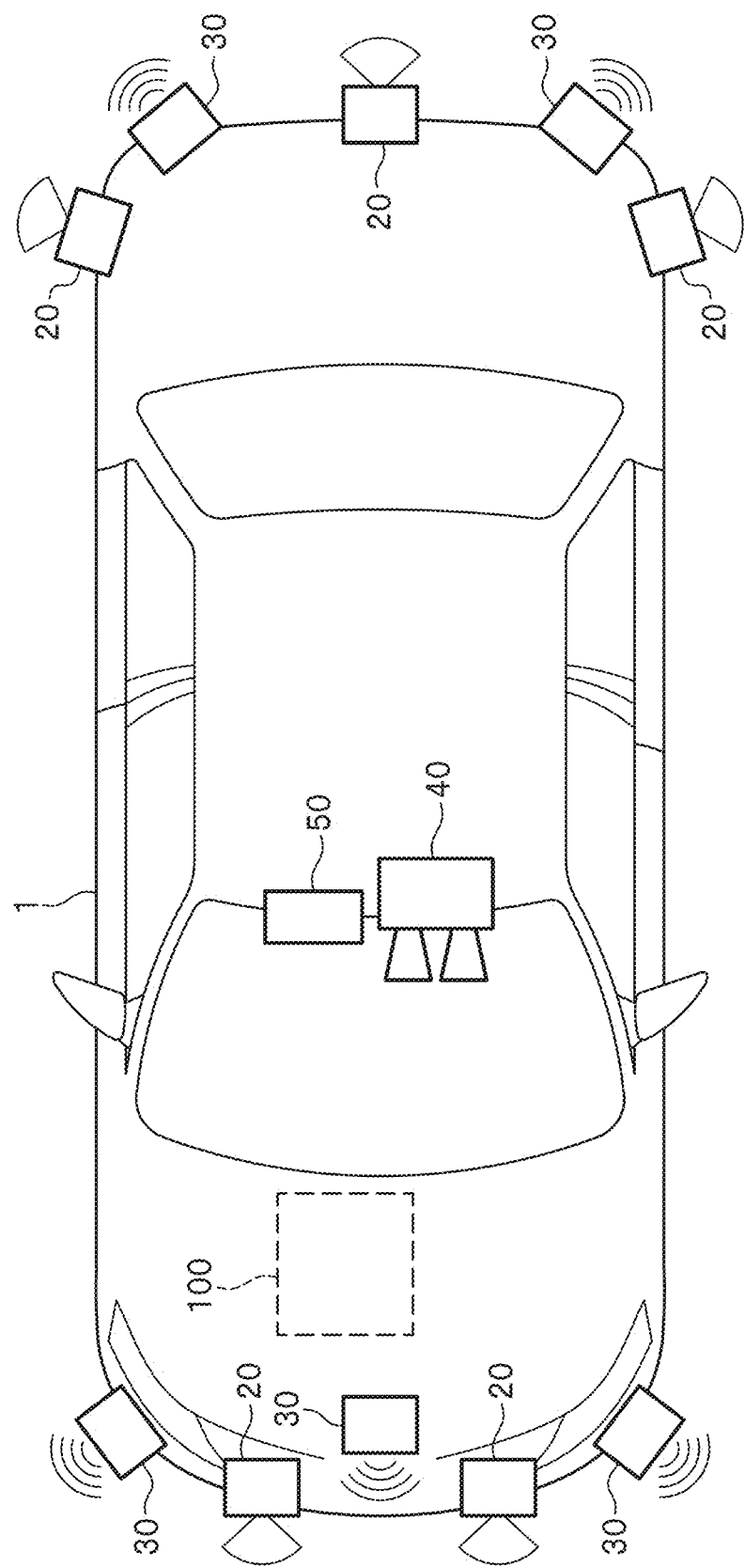
FIG. 1 is a diagram illustrating an entire structure of a vehicle which includes a vehicle control device according to an embodiment of the present invention.

FIG. 1 is a diagram illustrating an entire structure of a vehicle which includes a vehicle control device 100 according to an embodiment of the present invention. The vehicle 1 of interest (hereinafter referred to as an own vehicle 1) in which the vehicle control device 100 of the embodiment is mounted is, for example, a two-wheeled vehicle, a three-wheeled vehicle, a four-wheeled vehicle, or the like, and may be: a vehicle which has an internal combustion engine such as a diesel engine and a gasoline engine as a power source; an electric vehicle which has an electric motor as the power source; a hybrid vehicle including both the internal combustion engine and the electric motor; or the like. The above-described electric vehicle is driven by using electric power, which is discharged from a battery such as, for example, a secondary battery, a hydrogen fuel cell, a metal fuel cell, and an alcohol fuel cell.

Own Vehicle 1

As illustrated in FIG. 1, the own vehicle 1 includes: sensors (distance detection part) including finders 20, radars 30, and a camera 40; a navigation device 50; and the vehicle control device 100.

The finder 20 is, for example, a LIDAR (Light Detection and Ranging or Laser Imaging Detection and Ranging) which measures a distance to a target by illuminating the target with light and then measures the reflected scattered light. For example, two units of the finders 20 are disposed at right and left locations spaced apart from each other in a front part of the own vehicle 1, and three units of the finders 20 are disposed in a rear side thereof (that is, five units in the front and the rear parts in total).

For example, three units of the radars 30 are disposed in the front part of the own vehicle 1, and two units of the radars 30 are disposed in the rear side thereof (totaling five units in the front and the rear parts). The radar 30 detects an object by, for example, an FM-CW (Frequency Modulated Continuous Wave) method.

The camera 40 is, for example, a digital camera which uses a solid-state image sensing device such as a CCD (Charge Coupled Device) and a CMOS (Complementary Metal Oxide Semiconductor). The camera 40 is attached to an upper side of a front windshield, a rear surface of a rearview mirror, or the like. The camera 40 captures, for example, an image of an area in front of the own vehicle 1 periodically and repeatedly. In the example shown in FIG. 1, two monocular cameras are illustrated as the camera 40. The camera 40 may be, however, a stereo camera.

The configuration illustrated in FIG. 1 is given for illustrative purpose only, and part of the configuration may be omitted, or another configuration may be added thereto.

Vehicle Control Device 100

Figure 2:
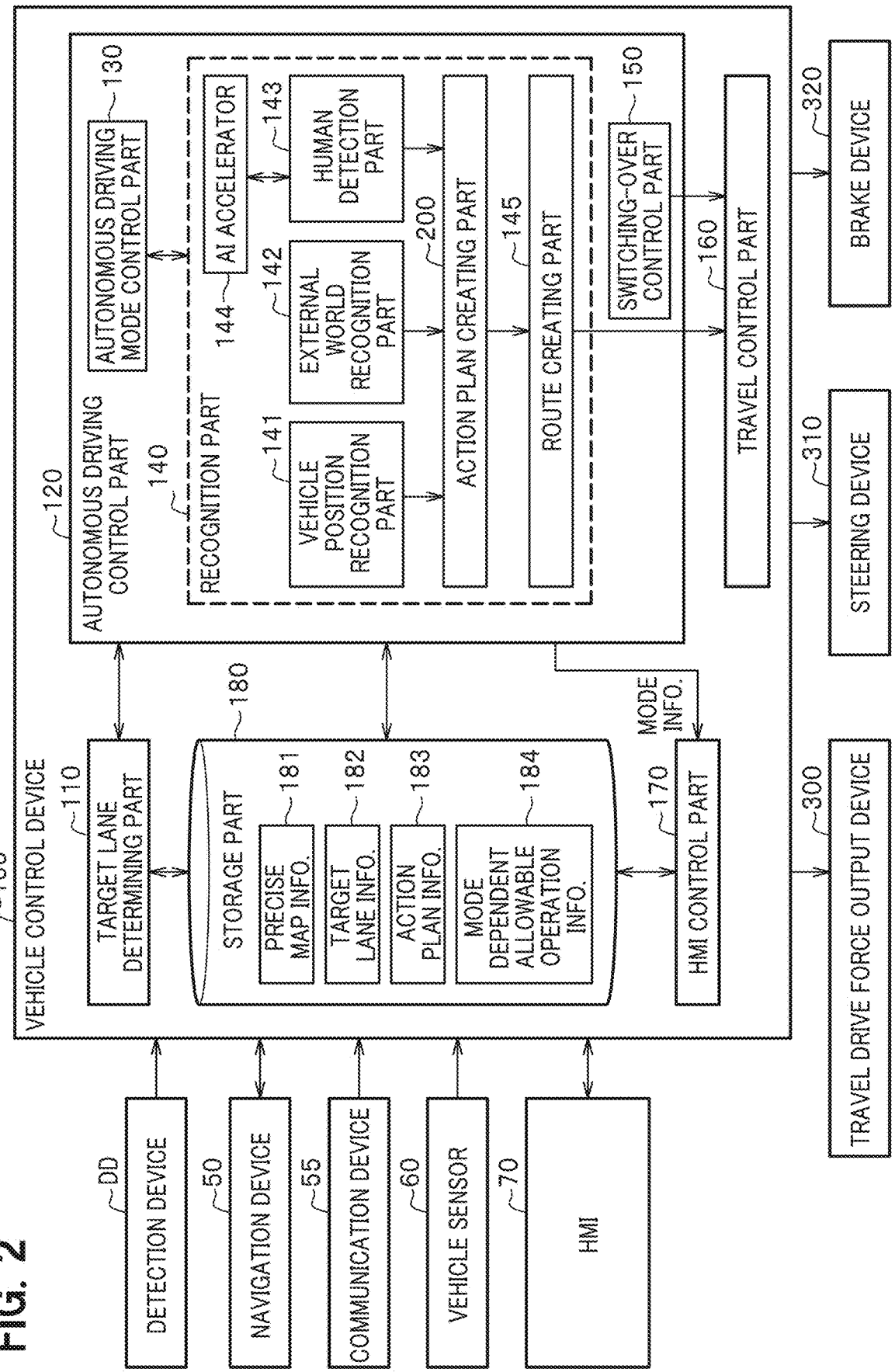
FIG. 2 is a functional configuration diagram focusing on the vehicle control device according to the embodiment.

FIG. 2 is a functional configuration diagram focusing on the vehicle control device 100 according to this embodiment. As shown in FIG. 2, the own vehicle 1 includes: a detection device DD (sensors) (distance detection part) including the finders 20, the radars 30, and the camera 40; the navigation device 50; a communication device 55; a vehicle sensor 60 (sensors) (distance detection part); a human machine interface (HMI) 70; the vehicle control device 100; a travel drive force output device 300; a steering device 310; and a brake device 320. Those devices and apparatuses are connected to each other through a multiplex communication line such as a CAN (Controller Area Network) communication line, a serial communication line, a wireless communication network, or the like. Note that the term "vehicle control device" may be referred to as not only the "vehicle control device 100" alone but also a combination of the vehicle control device 100 and other components (such as the detection device DD, an HMI 70, or the like).

Navigation Device 50

The navigation device 50 includes a GNSS (Global Navigation Satellite System) receiver, map information (a navigation map), and includes a touch panel type display device, a speaker, a microphone, and the like, which function as user interfaces. The navigation device 50 is configured to perform a function of determining a current location of the own vehicle 1 with a GNSS receiver and calculating a route from the current position to a destination that a user inputs. The route calculated by the navigation device 50 is sent to a target lane determining part 110 (described later) of the vehicle control device 100. The current location of the own vehicle 1 can be determined by an INS (Inertial Navigation System) making use of outputs of the vehicle sensor 60 and may be determined by the INS especially when the GNSS receiver does not receives signals from navigation satellites. In addition, the navigation device 50 is configured to, when the vehicle control device 100 performs a manual driving mode, give guidance on the route to the destination by voice, sound, or navigation display.

The function to determine the current location of the own vehicle 1 may be performed by other device that is separated from the navigation device 50. In addition, the functions of the navigation device 50 may be realized by functions of a remote terminal device a user owns such as a smartphone or a tablet terminal device. In this case, information is communicated between the remote terminal device and the vehicle control device 100 through wired or through wireless communication.

Communication Device 55

The communication device 55 may perform wireless communication using, for example, a cellular network, a Wi-Fi network, Bluetooth (registered trademark), DSRC (Dedicated Short Range Communication), or the like. The communication device 55 may be configured to communicate wirelessly with an information providing server of a system, such as VICS (registered trademark) (Vehicle Information and Communication System), which monitors traffic status of a road, to receive traffic information indicating the traffic status of a road on which the own vehicle 1 is now traveling or is going to travel. The traffic information includes such information as information on traffic jam ahead, a time required for passing through a traffic jam area, information on accident, a disabled car, and a construction work, information on speed restriction and lane restriction, information on location of parking areas and on whether or not a parking area, a highway travel center, or a rest stop is full. The communication device 55 may receive the traffic information by communicating with a wireless beacon installed on a side space of a road or by performing vehicle-to-vehicle communication with another vehicle traveling near the own vehicle 1. The communication device 55 is an example of an "acquisition unit" which acquires information on traffic jam.

Vehicle Sensor 60

The vehicle sensor 60 includes a vehicle speed sensor to detect a vehicle speed of the own vehicle 1, an acceleration sensor to detect an acceleration, a yaw rate sensor to detect an angular velocity about a vertical axis, and an orientation sensor to detect an orientation of the own vehicle 1. Note that, herein, the vehicle sensor 60 is sometimes referred to generally as a "sensor(s)" in the description of a method of designing an action plan and description of formulas relevant to the action plan.

HMI 70

Figure 3:
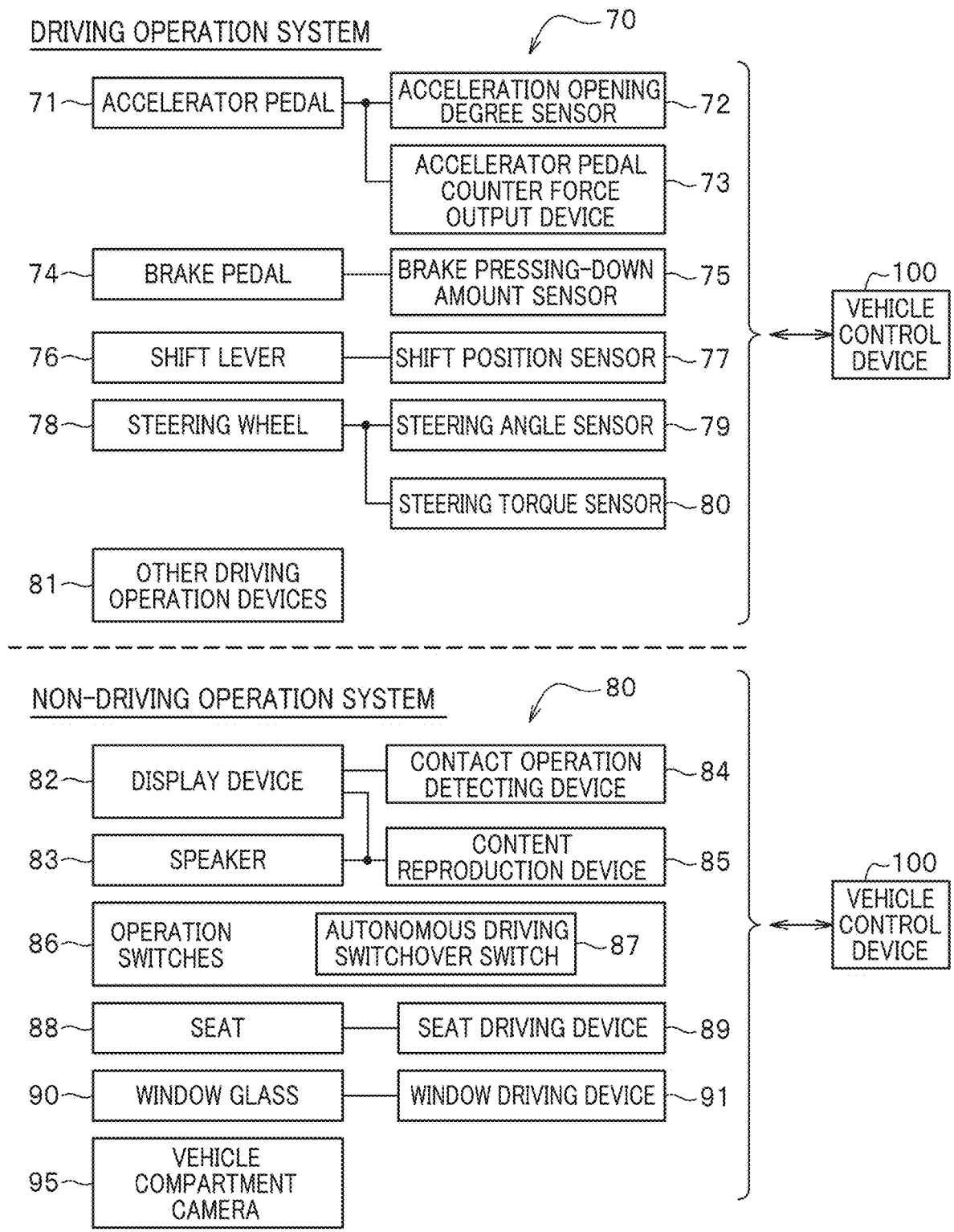
FIG. 3 is a configuration diagram illustrating an HMI of the vehicle control device according to the embodiment.

FIG. 3 is a configuration diagram illustrating the HMI 70. As illustrated in FIG. 3, the HMI 70 includes components for driving operation and components for other operations than the driving operation. However, separation between these is not distinctive and some component for the driving operation may have functions for a non-driving operation (or vice versa). The navigation device 50 and the HMI 70 are each an example of an "output unit".

The HMI 70 includes, as components of the driving operation system, an accelerator pedal 71, an acceleration opening degree sensor 72, an accelerator pedal counter force output device 73, a brake pedal 74, a brake pressing-down amount sensor (or a master pressure sensor or the like) 75, a shift lever 76, a shift position sensor 77, a steering wheel 78, a steering angle sensor 79, a steering torque sensor 80, and other driving operation devices 81.

The accelerator pedal 71 is an operation element to be pressed down by a driver and to receive an instruction by the driver for acceleration (or to be released back by the driver and to receive an instruction by the driver for deceleration). The acceleration opening degree sensor 72 is configured to detect an amount by which the accelerator pedal 71 is pressed down and output an acceleration opening degree signal to the vehicle control device 100.

Here, the acceleration opening degree signal may be directly outputted to the travel drive force output device 300, the steering device 310, or the brake device 320 instead of being outputted to the vehicle control device 100. Similarly, other output signals from the components for the driving operation may also be outputted to the vehicle control device 100 or directly to the travel drive force output device 300, the steering device 310, or the brake device 320 instead of being outputted to the vehicle control device 100. The accelerator pedal counter force output device 73 is configured to output a force (operation counter force) that the accelerator pedal 71 applies in response to receiving an instruction from the vehicle control device 100 and acts in a direction opposite to a direction in which the accelerator pedal 71 is pressed down, for instance.

The brake pedal 74 is an operation element to receive an instruction by a driver for deceleration. The brake pressing-down amount sensor 75 is configured to detect an amount by which a driver presses down the brake pedal 74 (or detect a force applied to the brake pedal 74 to press down the brake pedal 74) and output a brake-amount signal corresponding to a detected result to the vehicle control device 100.

The shift lever 76 is an operation element to receive an instruction by a driver for changing a shift position. The shift position sensor 77 is configured to detect a shift position to which a driver shifts the shift lever 76 and output a shift position signal indicating a detected result to the vehicle control device 100.

The steering wheel 78 is an operation element to receive an instruction by a driver for steering the own vehicle 1. The steering angle sensor 79 is configured to detect an operation angle of the steering wheel 78 and output a steering angle signal indicating the detected result to the vehicle control device 100. The steering torque sensor 80 is configured to detect a torque applied to a steering shaft by the steering wheel 78 to be turned and output a steering torque signal indicating a detected result to the vehicle control device 100.

Examples of the other driving operation devices 81 include a joystick, a button, a dial switch, and a GUI (Graphical User Interface) switch. The other driving operation devices 81 are configured to receive instructions for acceleration, deceleration, turning, and the like and output the instructions to the vehicle control device 100.

The HMI 70 includes such elements for non-driving operation as a display device 82, a speaker 83, a contact operation detecting device 84, a content reproduction device 85, various operation switches 86, a seat 88, a seat driving device 89, a window glass 90, and a window driving device 91.

Examples of the display device 82 include, for example, an LCD (Liquid Crystal Display), an organic EL (Electroluminescence) display, each of which is attached to various portions of an instrument panel or any portion which faces a front passenger seat or a rear seat. The display device 82 may be a HUD (Head-Up Display) that projects an image on a front windshield or other window glass. The speaker 83 outputs voice. In a case where the display device 82 is a touch panel, the contact operation detecting device 84 is configured to detect a contact position (touch position) on a display screen surface of the display device 82 and output the contact position to the vehicle control device 100. In a case where the display device 82 is not a touch panel, however, the contact operation detecting device 84 may be omitted.

The content reproduction device 85 includes, for example, a DVD (Digital Versatile Disc) player, a CD (Compact Disc) player, a television receiver, a device generating various guidance images, or the like. Each of the display device 82, the speaker 83, the contact operation detecting device 84, and the content reproduction device 85 may be partially or entirely included in the navigation device 50.

The various operation switches 86 are installed at various locations in a vehicle compartment. The various operation switches 86 may include an autonomous driving switchover switch 87 to instruct that autonomous driving should start (or in a predetermined time) or stop. The autonomous driving switchover switch 87 may be a GUI (Graphical User Interface) switch or a mechanical switch. The various operation switches 86 may include switches to drive the seat driving device 89 or the window driving device 91.

The seat 88 is a seat on which the driver sits. The seat driving device 89 may be capable of driving the seat 88 to change freely a reclining angle, a front-rear direction position and a yaw angle. The window glass 90 is installed, for example, in respective doors. The window driving device 91 is configured to drive the window glass 90 to open and close. The vehicle compartment camera 95 may be a digital camera utilizing a solid imaging element, such as CCD or CMOS. The vehicle compartment camera 95 may be installed on a rear view mirror, a steering boss, or an instrument panel, or at such a position that the vehicle compartment camera 95 is able to take an image of at least a head portion of a driver who is performing driving operation. For instance, the vehicle compartment camera 95 may periodically and repeatedly take an image of the driver.

Referring back to FIG. 2, the vehicle control device 100 is realized by, for example, one or more processors or hardware having a function equivalent thereto. The vehicle control device 100 may have a configuration in which: an ECU (Electronic Control Unit) in which a processor such as a CPU (Central Processing Unit), a storage device, and a communication interface are connected to each other by an internal bus; or a MPU (Micro-Processing Unit), or the like are combined with each other.

The vehicle control device 100 includes the target lane determining part 110, an autonomous driving control part 120 (distance detection part), an autonomous driving mode control part 130, a recognition part 140, a switching-over control part 150, a travel control part 160 (vehicle behavior control part), an HMI control part 170, and a storage part 180.

A part or all of the functions of the target lane determining part 110, the respective parts of the autonomous driving control part 120 (distance detection part), and the travel control part 160 may be performed by a processor executing a program (software). Part or all of those functions may be performed by hardware such as an LSI (Large Scale Integration) and an ASIC (Application Specific Integrated Circuit) or may be performed by a combination of software and hardware.

It is assumed in explanation below that the autonomous driving control part 120 executes the function of each of the parts (to be described in detail hereinafter) by reading an appropriate program as needed from ROM or EEPROM (Electrically Erasable Programmable Read-Only Memory) and loading the read program on a RAM to have the part perform the function. The program for each part may be stored in the storage part 180 in advance or may be stored in other storage medium and read through a communication medium into the vehicle control device 100 as needed.

Target Lane Determining Part 110

The target lane determining part 110 may be implemented using a MPU (Micro Processing Unit), for example. The target lane determining part 110 may be configured to divide a route provided by the navigation device 50 into a plurality of sections (for example, divide the route every 100 meters in the vehicle traveling direction) and determine a target lane for each of the sections with reference to precise map information 181. The target lane determining part 110 may be configured to make a decision, for example, on which one of the lanes numbered from the left-most lane in each section the own vehicle 1 should run on. For example, if there is a junction ahead where a current road along which the own vehicle 1 is traveling branches into two roads or other road joins the current road, the target lane determining part 110 determines a reasonable target lane so that the own vehicle 1 can run through the junction to run on an intended travel route beyond the junction. The target lane determined by the target lane determining part 110 is stored as target lane information 182 in the storage part 180.

Autonomous Driving Control Part 120

The autonomous driving control part 120 includes the autonomous driving mode control part 130, the recognition part 140, and the switching-over control part 150.

Autonomous Driving Mode Control Part 130

The autonomous driving mode control part 130 may be configured to determine the mode of autonomous driving (autonomous driving mode) according to an operation performed by the driver via the HMI 70, an event determined by the action plan creating part 200, a travel mode determined by a route creating part 145, and the like. The HMI control part 170 is notified of the autonomous driving mode. A limit depending on the performance or the like of the detection device DD (sensors) of the own vehicle 1 may be set for the autonomous driving mode.

In any of the autonomous driving modes, switching to a manual driving mode (an overriding) is possible by operating one or more driving operation components in the HMI 70. The overriding occurs, for example: when the driver of the own vehicle 1 continuously operates a driving operation component of the HMI 70 for a predetermined period of time or longer; when the variation in an amount associated with an operation (for example, an acceleration opening degree of the accelerator pedal 71, a brake pressing-down amount of the brake pedal 74, a steering angle of the steering wheel 78) becomes equal to or larger than a predetermined value; or when the operation of the driving operation system is performed a predetermined number of times or more.

Recognition Part 140

The recognition part 140 includes an own vehicle location recognition part 141, an external world recognizing part 142, a human detection part 143 (detection part), an AI (Artificial Intelligence) accelerator 144 (detection part), an action plan creating part 200, and a route creating part 145.

Own Vehicle Location Recognition Part 141

The own vehicle location recognition part 141 is configured to recognize a lane (travel lane) in which the own vehicle 1 is traveling, and a relative location of the own vehicle 1 with respect to the travel lane, based on the precise map information 181 stored in the storage part 180 and on information inputted from the finder 20 (sensor), the radar 30 (sensor), the camera 40 (sensor), the navigation device 50, or the vehicle sensor 60.

The own vehicle location recognition part 141 recognizes the travel lane by comparing a pattern of road partitioning lines (e.g., an arrangement of solid lines and dashed lines) recognized based on the precise map information 181 with a pattern of road partitioning lines near the own vehicle 1 recognized based on images captured by the camera 40. When recognizing the travel lane of the own vehicle 1, the current location of the own vehicle 1 received from the navigation device 50 or a processing result by INS may be taken into account.

External World Recognizing Part 142

Referring back to FIG. 2, the external world recognizing part 142 is configured to recognize the states of nearby vehicles, such as a location, a speed, and an acceleration of each nearby vehicle, based on information inputted from the finders 20, radars 30, camera 40, and the like. The nearby vehicle herein means a vehicle which is traveling in the vicinity of the own vehicle 1 in the same direction as the own vehicle 1. The location of the nearby vehicle may be indicated by a representative point such as the center of gravity and a corner of the nearby vehicle or may be indicated by a zone represented with a profile of the nearby vehicle. The term "state" of the nearby vehicle may include acceleration of the nearby vehicle, and whether the nearby vehicle is changing lanes (or whether or not the nearby vehicle intends to change lanes). The state can be obtained based on information from the above-described various components. The external world recognizing part 142 may be configured to recognize, in addition to the locations of the nearby vehicles, locations of guard rails, utility poles, parked vehicles, pedestrians, or any other objects.

Human Detection Part 143

The human detection part 143 is configured to detect a human from an image(s) taken by the camera 40. More specifically, the human detection part 143 is configured to detect a specific target object (such as a human or bicycle) in a specific area, using the AI accelerator 144. The human detection part 143 issues a request for detection of a human to the AI accelerator 144. The AI accelerator 144 performs AI computation outside a CPU and transmits a result of the detection of a human to the human detection part 143. As a high-speed detection is required in detecting a human, the AI accelerator 144 is used in detecting a human. The detection may be, however, conducted without using the AI accelerator 144.

For the sake of simplicity of the description, the human detection part 143 has been described as being separate from the camera 40 and the external world recognizing part 142. The human detection part 143 may be, however, any component that is capable of detecting a specific target object. Examples of such a component include: an image processing part that extracts a human or the like from an image taken by the camera 40; and a part that recognizes and detects a human or the like from a profile of an image object in an internal processing of the external world recognizing part 142. In this case, the human detection part 143 is omitted from the recognition part 140 in FIG. 2.

In addition, as described hereinafter, it is possible to increase the recognition probability of recognizing a human detected by the human detection part 143 by making use of the VICS information received by the communication device 55.

AI Accelerator 144

The AI accelerator 144 is a processor dedicated to detection of a human and uses a computation resource(s) other than CPUs. The AI accelerator 144 is used in, for example, accelerating image processing by a processor enhanced by a GPU (Graphics Processing Unit) and signal processing using FPGA (Field Programmable Gate Array). The AI accelerator 144 performs AI computation on dedicated hardware (for example, GPU).

Route Creating Part 145

The route creating part 145 is configured to determine, when a lane keeping event is processed, a travel mode according to which the own vehicle 1 should travel, from a plurality of travel modes including: a constant-speed travel, a follow-up travel, a low-speed follow-up travel, a deceleration travel, a curve travel, an obstacle avoiding travel, and the like. The route creating part 145 then generates a route candidate based on the determined travel mode.

The route creating part 145 is configured to evaluate the generated route candidate from, for example, such two viewpoints as planning suitability and safety and select a route to be outputted to the travel control part 160. From the viewpoint of the planning suitability, routes are evaluated in such a manner that a route having high followability to a previously created plan (for example, an action plan) and being short in a total length is highly evaluated. For example, when changing to a right side lane is desired, if a candidate route makes the own vehicle 1 once change lanes to the left and then return to the original lane, the candidate route is poorly evaluated. From the viewpoint of safety, for example, routes are evaluated in such a manner that, at each point in a route, the larger a distance between the own vehicle 1 and an object (a nearby vehicle or the like) and the smaller a change in the amount of acceleration, deceleration, or steering angle is required in the route, then the route is highly evaluated.

Switching-Over Control Part 150

Referring back to FIG. 2, the switching-over control part 150 is configured to switch between the autonomous driving mode and the manual driving mode, based on a signal inputted from the autonomous driving switchover switch 87 (see FIG. 3), or the like. The switching-over control part 150 switches the autonomous driving mode to the manual driving mode, based on an operation instructing acceleration, deceleration, or steering to any of the driving operation components of the HMI 70. For example, the switching-over control part 150 may switch the autonomous driving mode to the manual driving mode (overriding) when a specific state continues for a reference period of time or longer. The specific state is a state such that an operation amount indicated by a signal inputted from any of driving operation components of the HMI 70 exceeds a prescribed threshold value.

After switching to the manual driving mode by overriding, in a case where an operation on the driving operation component of the HMI 70 has not been detected for a predetermined period of time, the switching-over control part 150 may switch the manual driving mode back to the previous autonomous driving mode. For example, when performing a handover control of shifting from the autonomous driving mode to the manual driving mode at a scheduled termination point of the autonomous driving, in order to notify a driver of a handover request in advance, the switching-over control part 150 may output information on the notification to the HMI control part 170.

Travel Control Part 160

The travel control part 160 is configured to control the travel drive force output device 300, the steering device 310, and the brake device 320 in such a way that the own vehicle 1 traces a route generated by the route creating part 145 on time as scheduled.

The travel control part 160 has functions as the vehicle behavior control part that controls at least the speed of the vehicle based on an action plan.

HMI Control Part 170

The HMI control part 170 is configured to, when receiving information on an autonomous driving mode communicated from the autonomous driving control part 120, control HMI 70 in accordance with the type of the autonomous driving mode with reference to mode dependent allowable operation information 184 (described later, See FIG. 6).

The HMI control part 170 is configured to determine those devices that are allowed to be used (navigation device 50 and part or all of HMI 70) and those devices that are not allowed to be used, by referencing the mode dependent allowable operation information 184 in accordance with the information on the autonomous driving mode received from the autonomous driving control part 120. In addition, the HMI control part 170 is configured to determine, based on the determination result, whether an operation by the driver on a component of the HMI 70 for a non-driving operation or on the navigation device 50 should be enabled or not.

For example, when the vehicle control device 100 is performing the manual driving mode, the driver can operate driving operation components of HMI 70 (for example, accelerator pedal 71, brake pedal 74, shift lever 76, and steering wheel 78; see FIG. 3). When the vehicle control device 100 is performing an autonomous driving mode, the driver has a duty of monitoring the surrounding of the own vehicle 1.

In this case, in order to prevent driver distraction, i.e., to prevent the driver from being distracted due to actions other than driving (for example, an operations on the HMI 70, or the like), the HMI control part 170 may be configured to perform a control such that an operation to a part or all of the non-driving operation components of the HMI 70 by the driver is not allowed. In this event, in order to make the driver monitor the surrounding of the own vehicle 1, the HMI control part 170 may be configured to make the display device 82 (see FIG. 3) display, by means of an image or the like, presence of a nearby vehicle of the own vehicle 1 or a state of the nearby vehicle, which is recognized by the external world recognizing part 142, and also make the HMI 70 accept a confirmation operation by the driver in a manner depending on the situation.

The HMI control part 170 may be configured to, when the driving mode is an autonomous driving, perform control in such a manner that restrictions on the driver distraction are eased and that operations by the driver on the non-driving operation components are allowed, which have not been allowed before. The HMI control part 170 makes, for example, the display device 82 display a video, the speaker 83 (see FIG. 3) output voice, or the content reproduction device 85 (see FIG. 3) reproduce contents stored in a DVD or the like. Note that the content reproduced by the content reproduction device 85 may include various types of content, examples of which include amusement or entertainment, such as a TV program, in addition to the content stored in a DVD or the like. The "content reproduction operation" described above with reference to FIG. 6 may indicate an operation of the contents of amusement or entertainment.

Storage Part 180

The storage part 180 may store therein information such as, for example, the precise map information 181, the target lane information 182, the action plan information 183, and the mode dependent allowable operation information 184. The storage part 180 may be a ROM (Read Only Memory), a RAM (Random Access Memory), an HDD (Hard Disk Drive), a flash memory, or the like. A program to be executed by a processor may be stored in the storage part 180 in advance or may be downloaded from an external device via an in-vehicle Internet device or the like. Alternatively, the program may be installed in the storage part 180 by inserting a portable storage medium storing the program into a drive device (not illustrated).

The precise map information 181 may include more precise map information than the navigation map installed in the navigation device 50. The precise map information 181 may include, for example, information on a center portion of a lane or a boundary of the lane. The information on the boundary includes: a type, a color, and a length of a lane mark; a width of a road and a width of a road shoulder; a width of a main lane and widths of other lanes; a position of the boundary, a type of the boundary (guard rail, planted strip, kerbstone), and a zebra pattern zone for guiding and the like. These may be included in the precise map.

The precise map information 181 may also include road information, traffic regulation information, address information (addresses or postal codes), facility information, telephone number information, or the like. The road information includes: information representing a type of a road such as an expressway, a toll road, a national road, and a prefectural road; the number of lanes of the road; a width of each lane; a slope of a road; a location of a road (three-dimensional coordinates including a longitude, a latitude, and an altitude); a curvature of a curve of a lane; a location of a junction and a fork of lanes; and a road sign installed along a road. The traffic regulation information includes information on a lane closed due to construction, a traffic accident, a traffic jam, or the like.

Action Plan Creating Part 200

Basic Action Plan

The action plan creating part 200 is configured to set a start point of an autonomous driving, and/or a destination of the autonomous driving. The start point of the autonomous driving may be a current location of the own vehicle 1 or may be a location point at which an instruction of starting autonomous driving has been conducted. The action plan creating part 200 is configured to create an action plan to be used in a road section between the start point and the destination of the autonomous driving. The action plan creating part 200 may be configured to create an action plan to be used in any section.

The action plan is constituted by, for instance, various events that are to be processed in a sequential order. The various events include, for example, a deceleration event to decelerate the own vehicle 1, an acceleration event to accelerate the own vehicle 1, a lane keeping event to have the own vehicle 1 keep on traveling in a travel lane without deviating from the travel lane, a lane change event to change travel lanes, an overtaking event to have the own vehicle 1 overtake a vehicle traveling ahead of the own vehicle 1, a branching point event to have the own vehicle 1 change travel lanes to a lane the driver wants to take or keep on traveling on the current lane without deviating from the current lane, a joining point event to have the own vehicle 1 accelerate or decelerate to change travel lanes to join a main travel lane from a joining lane, a hand-over event to switch from the manual driving mode to the autonomous driving mode at the start point of the autonomous driving or switch from the autonomous driving mode to the manual driving mode at the scheduled termination point of the autonomous driving.

The action plan creating part 200 schedules the lane change event, the branching point event or the joining point event at a location where the target lane determined by the target lane determining part 110 is switched to another lane. Information on the action plan created by the action plan creating part 200 is stored in the storage part 180 as action plan information 183 (described below).

Action Plan Creating Part 200

Vehicle Action Plan to be Determined with Reference to Collision Probability

Figure 4:
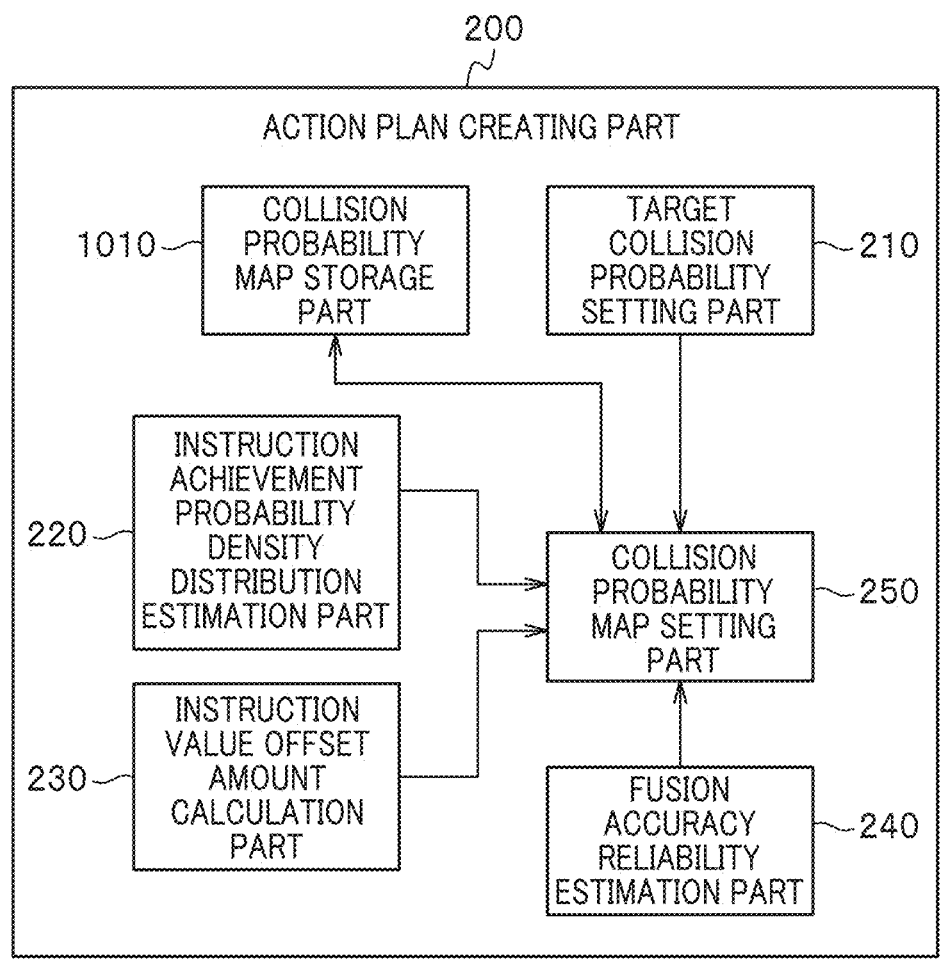
FIG. 4 is a configuration diagram illustrating an action plan creating part of the vehicle control device according to the embodiment.

FIG. 4 is a block diagram of the action plan creating part 200. The action plan creating part 200 is configured to obtain a collision probability representing the likelihood of occurrence of a collision between the obstacle and the vehicle on the basis of the detected distance to the obstacle and to create an action plan of the vehicle. The action plan creating part 200 creates an action plan for autonomous driving of the vehicle.

As shown in FIG. 4, the action plan creating part 200 may include: a collision probability map storage part 1010 configured to sore a collision probability map 1000 that visualizes action plans (see FIG. 14) each having a specific collision probability in a two-dimensional map of location and speed; and a target collision probability setting part 210, an instruction achievement probability density distribution estimation part 220, an instruction value offset amount calculation part 230 (offset amount calculation part), a fusion accuracy reliability estimation part 240, and a collision probability map setting part 250.

The action plan creating part 200 may be configured to create a sudden braking allowed action plan and a preliminary braking action plan. The sudden braking allowed action plan keeps the set speed set for autonomous driving and permits sudden braking operations in a low collision probability region in the collision probability map 1000, the low collision probability region having collision probabilities lower than a predetermined threshold value lower than a target collision probability. The preliminary braking action plan avoids sudden braking operations by repeating short-time braking in a high collision probability region in the collision probability map 1000, the high collision probability region having a collision probability higher than a predetermined threshold value but lower the target collision probability.

Target Collision Probability Setting Part 210

A target collision probability setting part 210 sets a predetermined target collision probability.

Instruction Achievement Probability Density Distribution Estimation Part 220

The instruction achievement probability density distribution estimation part 220 estimates an instruction achievement probability density distribution 1001 (see FIG. 10A) that is defined with the magnitude and probability of a distance between the location designated in an instruction from the travel control part 160 (vehicle behavior control part) and the location where the vehicle would actually reach.

Instruction Value Offset Amount Calculation Part 230

The instruction value offset amount calculation part 230 calculates an instruction value offset amount 1002 (see FIG. 10A) that represents the distance between a target stop location and the obstacle.

Fusion Accuracy Reliability Estimation Part 240

The fusion accuracy reliability estimation part 240 calculates a fusion accuracy reliability-based probability distribution 1003 (see FIG. 10A) that represents the recognition accuracy of detection devices DD (in particular, distance detection sensor) (distance detection part). The fusion accuracy reliability-based probability distribution 1003 depends on the detection accuracy (distance detection accuracy) of the sensors such as a camera and radar. For this reason, the fusion accuracy reliability-based probability distribution 1003 depends on the redundancy of the later-described sensors and on the detection scheme thereof, which may be AND detection scheme (see FIG. 27) or OR detection scheme (see FIG. 28).

Collision Probability Map Setting Part 250

The collision probability map setting part 250 determines a collision probability map according to formula (1) described below.

Travel Drive Force Output Device 300, Steering Device 310, and Brake Device 320

Referring back to FIG. 2, the vehicle control device 100 provides control on the travel drive force output device 300, the steering device 310, and the brake device 320.

Travel Drive Force Output Device 300

The travel drive force output device 300 is configured to output a travel drive force (a torque) required for a vehicle to travel, to a drive wheel. If the own vehicle 1 is an automobile having an internal combustion engine as a power source, the travel drive force output device 300 may include, for example, an engine (not shown), a transmission (not shown) and an engine ECU (Electronic Control Unit, not shown) to control the engine. Alternatively, if the own vehicle 1 is an electric vehicle having an electric motor as a power source, the travel drive force output device 300 may include a travel motor (not shown) and a motor ECU to control the travel motor (not shown). Alternatively, if the own vehicle 1 is a hybrid vehicle, the travel drive force output device 300 may include an engine, a transmission, an engine ECU, a travel motor, and a motor ECU (all of these are not shown).

When the travel drive force output device 300 includes only an engine, the engine ECU is configured to control a throttle opening degree of the engine, a shift position, and the like in accordance with information received from the travel control part 160 to be described later. When the travel drive force output device 300 includes only the travel motor, the motor ECU is configured to control the duty ratio of a PWM signal given to the travel motor in accordance with information received from the travel control part 160. When the travel drive force output device 300 includes both an engine and a travel motor, the engine ECU and the motor ECU work in cooperation with each other to control the travel drive force in accordance with information received from the travel control part 160.

Steering Device 310

The steering device 310, for example, includes a steering ECU and an electric motor (these are not shown). The electric motor is configured to turn wheels to be steered to change a direction of the wheels by applying a force to a rack-and-pinion mechanism. The steering ECU is configured to drive the electric motor for changing the direction of the wheels to be steered in accordance with information inputted by the vehicle control device 100 or inputted information on a steering angle or a steering torque.

Brake Device 320

The brake device 320 may be an electrically driving servo brake device including, for example, a brake caliper, a brake cylinder to apply a hydraulic pressure to the brake caliper, an electric motor to generate the hydraulic pressure in the cylinder, and a braking control part (all of these are not shown). The braking control part of the electrically driving servo brake device is configured to control the electric motor in accordance with the information inputted from the travel control part 160 so that a brake force that is commensurate with a braking operation is applied to each wheel. In addition, the electrically driving servo brake device may include a mechanism to transmit a hydraulic pressure generated by an operation on a brake pedal to the brake cylinder through a master cylinder as a back-up system.

The brake device 320 is not limited to the electrically driving servo brake device as above described and may be an electrically controlled hydraulic pressure brake device. The electrically controlled hydraulic pressure brake device is configured to control an actuator in accordance with the information inputted from the travel control part 160 to transmit a hydraulic pressure in the master cylinder to brake cylinders. In addition, the brake device 320 may include a regenerative brake system with the travel motor that may be included in the travel drive force output device 300.

Distance Detection Part

The autonomous driving control part 120 of the embodiment functions as the distance detection part together with the detection device DD and vehicle sensor 60. The distance detection part is configured to output detection information based on the information outputted from the detection device DD and the vehicle sensor 60. The detection information includes: a combination of sensors (sensor configuration), of a plurality of sensors included in the detection device DD and vehicle sensor 60, which has detected a target object; a detected time period starting from a time at which the sensor combination has detected the target object and during which detected time period the sensor combination has continuously detected the target object; and a detected distance determined based on the outputs from the sensor combination and the detected time period. The detected distance is determined during the traveling based on a result of a measurement process performed in advance, in which measurement process the sensor combination is tested to confirm its ability to detect a target object in a situation where the true distance to the target object is known.

Next, a description will be given of the operations of the vehicle control device 100 as configured above.

Explanation of Principles

First, a description will be given of considerations on the problems of the conventional technique.

FIGS. 5 to 8 are explanatory diagrams for explaining problems of the conventional technique.

Problem 1

There is a problem that in the event of determining an action plan using sensors, the distance to be detected by the sensors may not be enlarged while maintaining the reliability of the sensors due to insufficient detectable distances of the sensors. This problem is hereinafter referred to as problem 1.

Figure 5A:
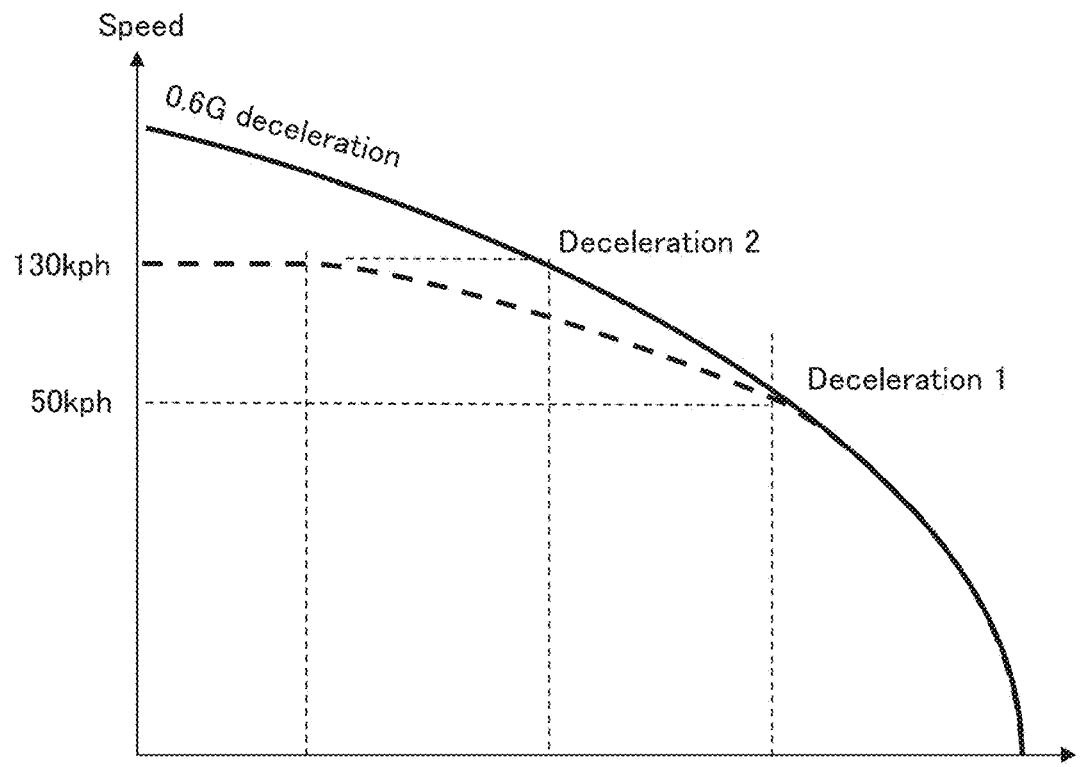
FIG. 5A illustrates a target speed curve of the vehicle control device according to the embodiment in the event of deceleration of 0.6G to a target stop location.

FIG. 5A illustrates a target speed curve in the event of deceleration to a target stop location. FIG. 5A is a diagram illustrating a target speed curve in the event of deceleration of 0.6G, in which diagram the horizontal axis represents the location of the vehicle and the vertical axis represents the speed of the vehicle. The bold solid line in FIG. 5A represents the target speed curve calculated for the deceleration of 0.6G. The bold dashed line in FIG. 5A represents a target speed curve in the event of varying the traveling speed from a speed of 130 kph (starting error detection) and reaching the target speed at a speed of 50 kph (terminated within a permissible error). The location of the vehicle at a speed of 0 is the target stop location.

Figure 5B:
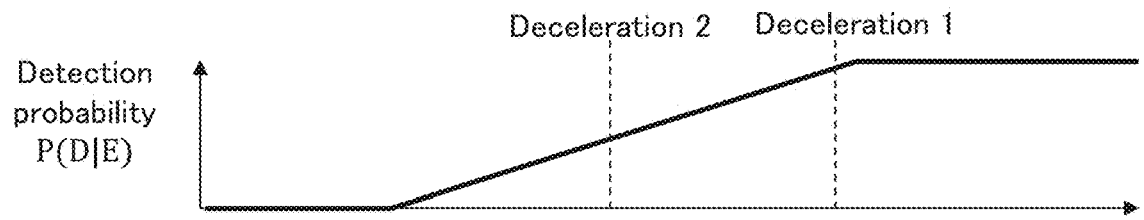
FIG. 5C illustrates a false detection probability P(D|E) that the sensor will detect an obstacle in a state of the obstacle being absent.
FIG. 5D illustrates an example of a deceleration profile of an action plan in the case of autonomous driving.
Figure 5C:
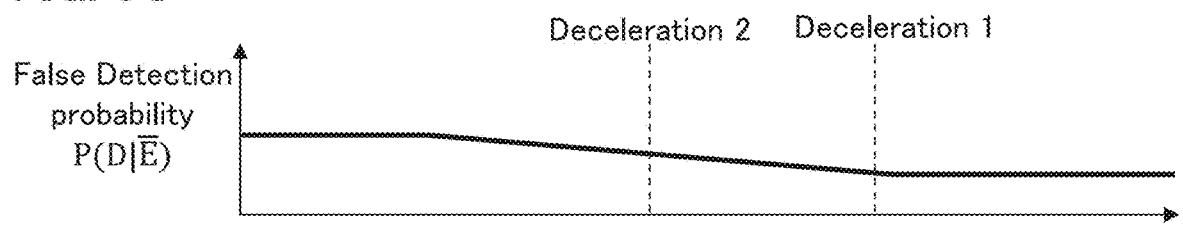

FIG. 5B illustrates a detection probability $P(D|E)$ of the sensors (e.g., vehicle sensors such as a vehicle speed sensor and detection devices DD such as a radar and camera) in the event of determining the target speed values illustrated in FIG. 5A. FIG. 5C illustrates a false detection probability $P(D|\overline{E})$ of the sensors in the event of determining the target speed value illustrated in FIG. 5A. Here E denotes a state where an obstacle is present, and $\overline{E}$ denotes a state where no obstacle is present. D denotes an event of detecting an obstacle.

As illustrated in FIGS. 5B and 5C, the false detection probability $P(D|\overline{E})$ tends to decrease as the detection probability $P(D|E)$ increases.

Figure 5D:
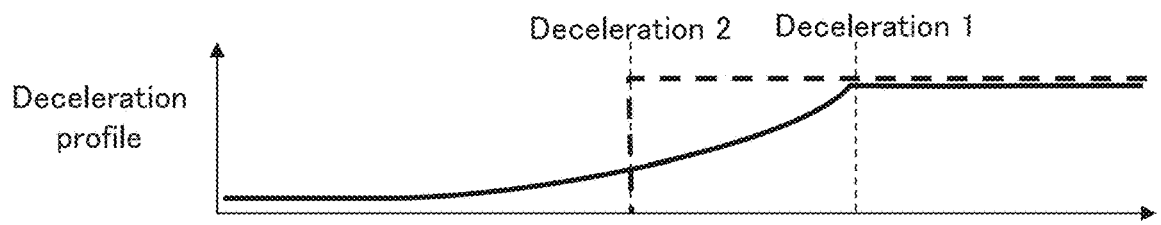

FIG. 5D illustrates an example of a deceleration profile of an action plan in the case of autonomous driving. The deceleration profile is determined by a predetermined algorithm with taking into account the above-described detection probability and false detection probability.

Figure 6:
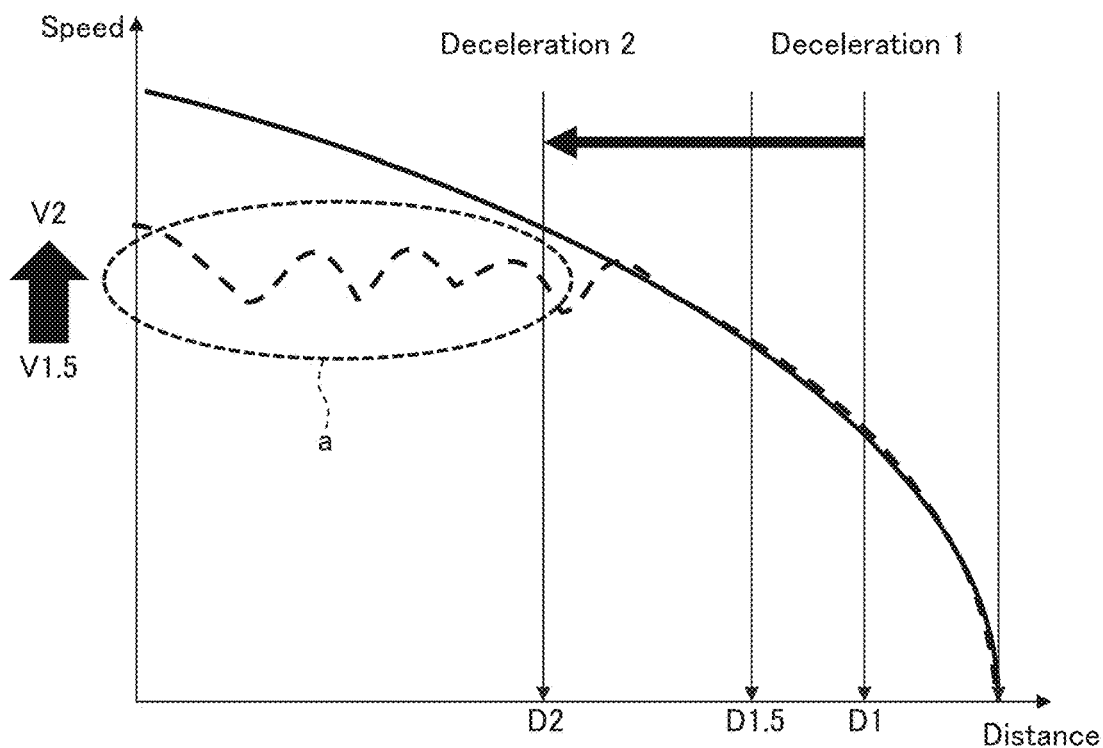
FIG. 6 is an explanatory diagram for explaining an action plan based on the reliability of sensors in the event of determining the target speed curve illustrated in FIG. 5A.
Figure 7:
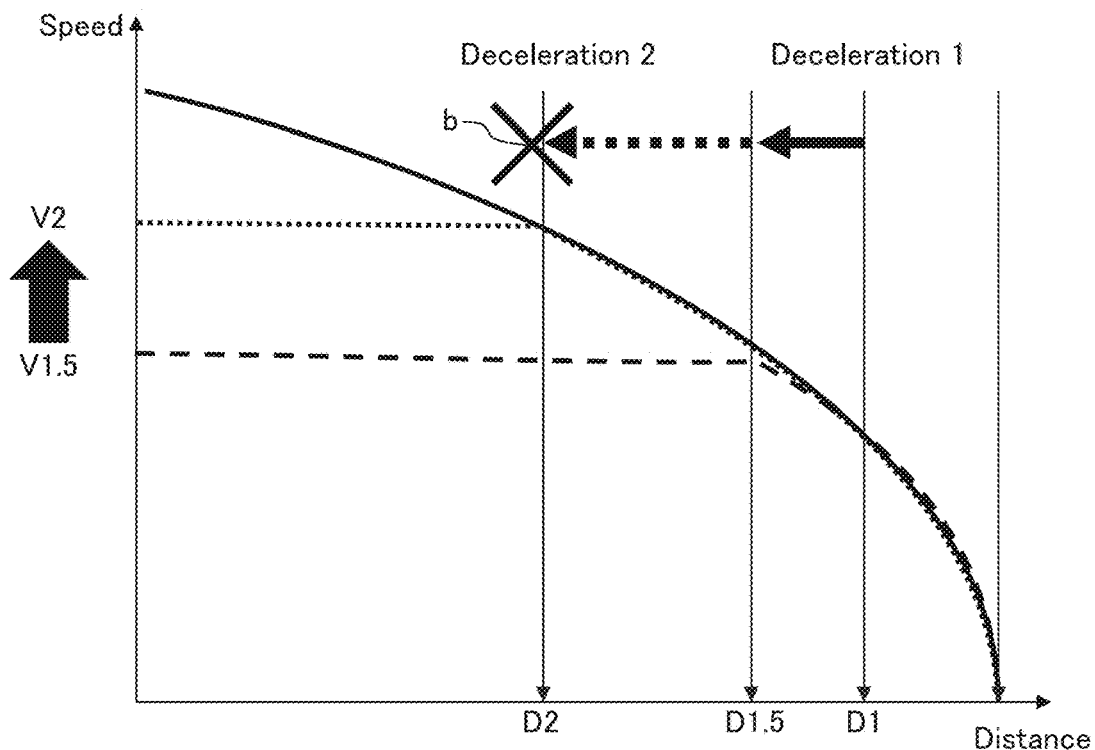
FIG. 7 is an explanatory diagram for explaining an action plan based on the reliability of sensors in the event of determining the target speed curve illustrated in FIG. 5A.

FIGS. 6 and 7 are explanatory diagrams for explaining the action plan based on the reliability of the sensors in the event of determining the target speed curve illustrated in FIG. 5A. FIG. 6 is an example of overdetection setting using values detected by the sensors in a distance range where the reliability of the sensors is low in the event of determining the action plan illustrated in FIG. 5D. FIG. 7 is an example of high-reliability detection setting using values detected by the sensors in a distance range where the reliability of the sensors is high in the event of determining the action plan illustrated in FIG. 5D. The horizontal axis presented in FIGS. 6 and 7 represents the vehicle location. In FIGS. 6 and 7, location D2 represents a distance of approximately 120 to 160 m to the target stop location; D1.5, 60 to 100 m; and D1, 30 to 50 m. The vertical axis presented in FIGS. 6 and 7 represents the target speed of the vehicle. In FIGS. 6 and 7, speed V1.5 represents a speed of approximately 50 to 70 kph; and V2, 120 to 140 kph.

A description will be given of the actions illustrated in FIG. 6, under an assumption that the travel environment condition of the autonomous driving system is within an Operational Design Domain (ODD) and the vehicle can be driven at speed V2. In determining the action plan illustrated in FIG. 5D, under the overdetection setting using values detected by the sensors in a distance range where the reliability of the sensors is low, although the distance to be detected (distance in a range from Deceleration 1 to Deceleration 2) is large, false braking frequently occurs due to the large false detection probability of the sensors as illustrated in the dotted ellipse a in FIG. 6. Therefore, use of sensor data as is in a low-reliability region decreases the commercial value of the vehicle due to the frequent false braking.

On the other hand, under the high-reliability detection setting under which braking operations are to be performed in a distance range where the reliability of the sensors is high, the detection length decreases as illustrated by mark x b in FIG. 7, in which case speed V2, which is permissible in ODD, cannot be reached. Therefore, use of sensor data in an established high-reliability distance range requires reducing the cruising speed, in which case speed V2 of ODD cannot be established.

As will be appreciated from the above description, the distance to be detected by the sensors may not be enlarged while maintaining the reliability of the sensors due to insufficient detectable distances of the sensors.

Figure 8:
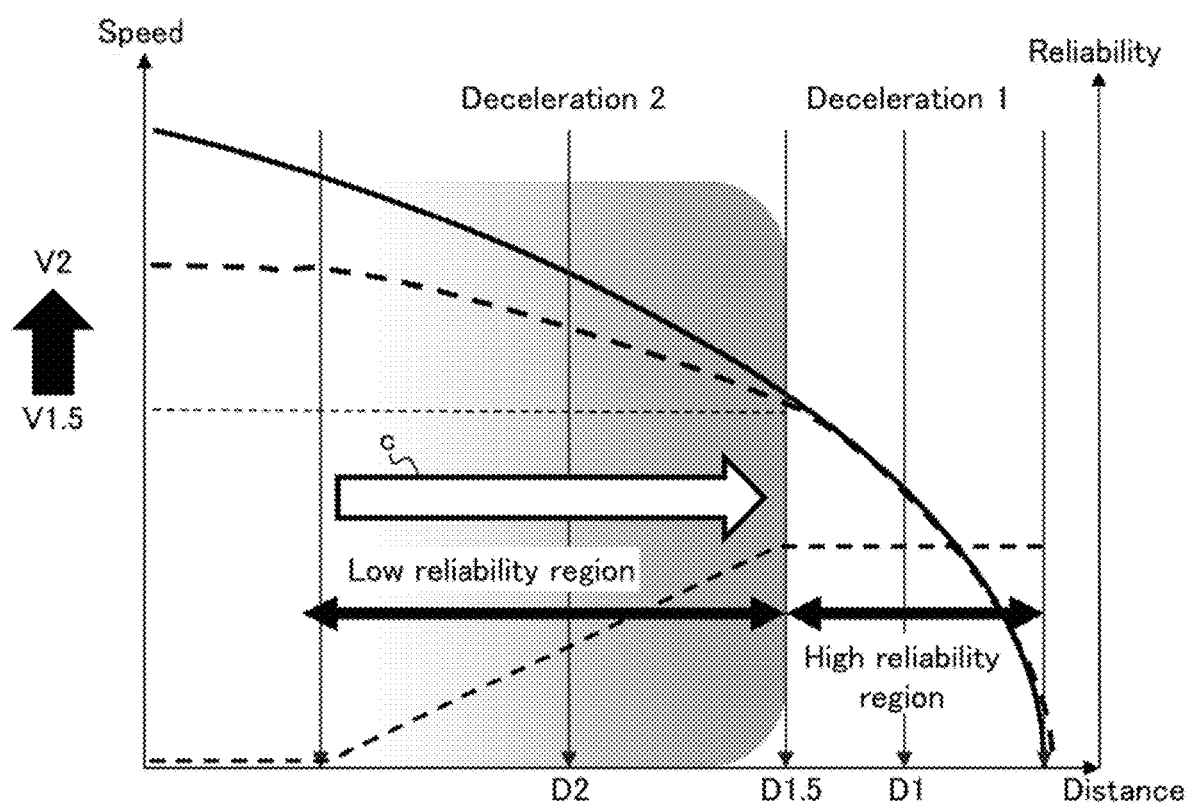
FIG. 8 is an explanatory diagram for explaining how the problems explained with reference to FIGS. 6 and 7 can be solved.

FIG. 8 is an explanatory diagram for explaining an approach that can solve the problems explained with reference to FIGS. 6 and 7. This approach is to start deceleration so as not to degrade the ride quality from a location where the reliability of sensor data is low, thereby to make it possible to stop the vehicle reliably in a high-reliability region. In this approach, the braking force is gradually increased in a manner depending on the reliability as shown by arrow c in FIG. 8. This means the continuously varying reliability is positively used in the action plan. That is, the stopping operation is started at an increased distance and braking is started even in the low-reliability distance range, which may possibly achieve traveling at cruising speed V2.

The embodiment of the present invention provides, to solve the problem 1, a method for calculating the reliability and a method for linking the reliability to action plans.
Problem 2

A problem addressed as problem 2 is an insufficiency of clarification of safety levels and an insufficiency of quantification of reliability (accuracy, detection probability) of sensors and the accuracy of the action plan. To solve the problem 2, the embodiment of the present invention provides formulas that quantitatively assess the reliability (accuracy, detection probability) of sensors and the action plan, to clarify a distance range that can be regarded as safe.
Basic Idea The embodiment of the present invention introduces a concept of "collision probability" to create an action plan. This is based on the idea that an action plan is considered as possessing a "collision probability" like a recognition operation possesses a "recognition probability". According to this idea, the "collision probability" is introduced to the action plan.

Figure 9:
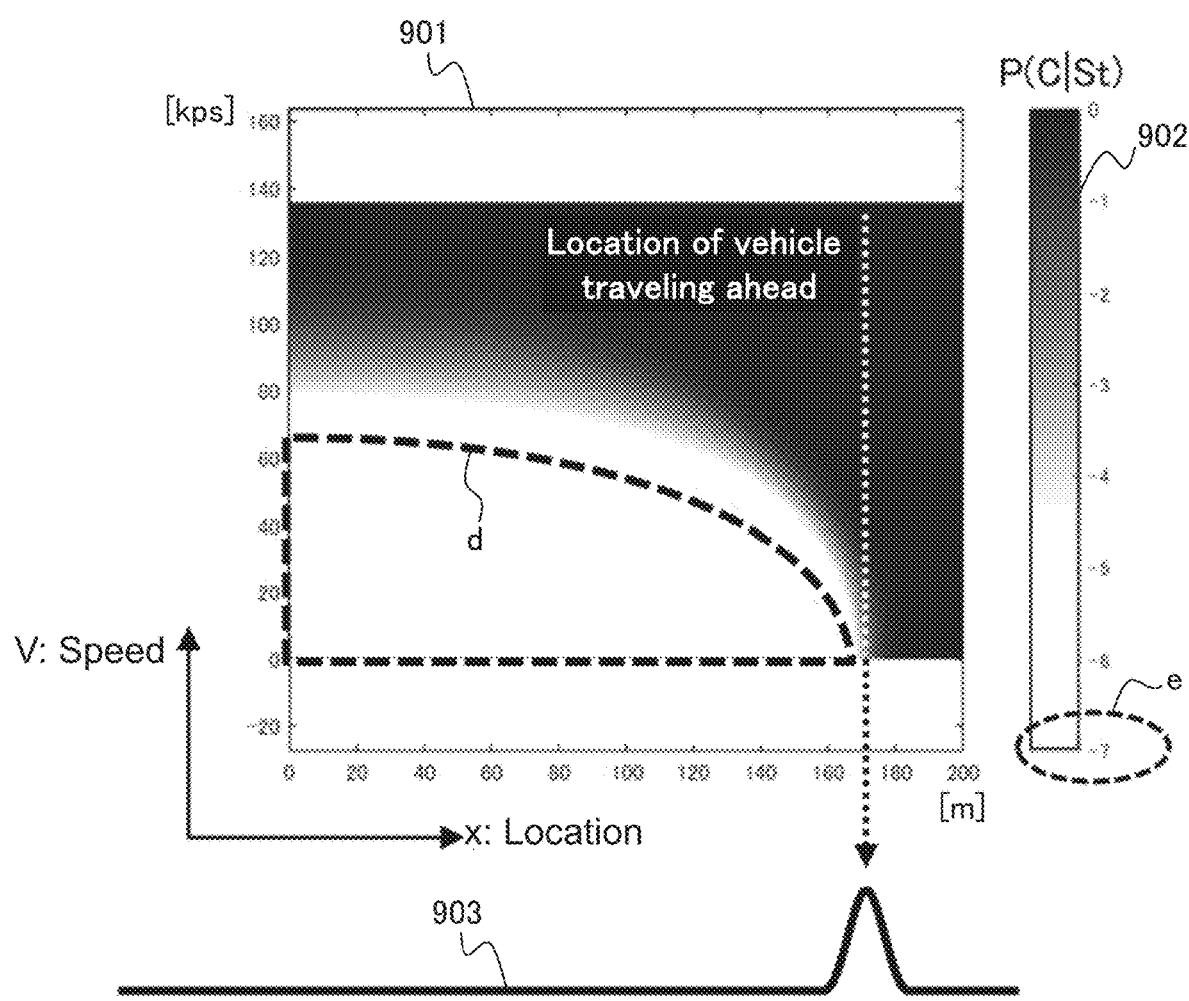
FIG. 9 is an explanatory diagram for explaining a collision probability based on which the vehicle control device issues an instruction to decelerate until reaching the location of the vehicle traveling ahead (target stop location) to avoid a collision. Reference numeral 901 in FIG. 9 denotes a collision probability map based on which deceleration is to be performed until reaching the location of the vehicle traveling ahead to avoid a collision. Reference numeral 902 in FIG. 9 denotes a graph representing the magnitude of a collision probability $P(C|S_t)$ in tone expression according to which the collision probability is represented in the collision probability map 901. Reference numeral 903 in FIG. 9 denotes a graph representing an image of the peak of the collision probability distribution when the speed is 0 in the collision probability map 901.

FIG. 9 is an explanatory diagram for explaining a collision probability based on which deceleration is to be performed until reaching the location of the vehicle traveling ahead (target stop location) to avoid a collision. Reference numeral 901 in FIG. 9 denotes a collision probability map with reference to which deceleration is to be performed until reaching the location of the vehicle traveling ahead to avoid a collision. The horizontal axis of the collision probability map 901 represents the location, and the vertical axis of the collision probability map 901 represents the speed. Reference numeral 902 in FIG. 9 denotes a graph representing the magnitude of collision probability $P(C|S_t)$ in tone expression according to which the collision probability is represented in the collision probability map 901. Reference numeral 903 in FIG. 9 denotes a graph representing an image of the peak of the collision probability distribution when the speed is 0 in the collision probability map 901.

The collision probability $P(C|S_t)$ represented in the collision probability map 901 is calculated on the basis of the detection probability and accuracy of the sensors, the algorithm and accuracy of the action plan. Dashed region d in the collision probability map 901 represents a region where it is unlikely that a collision occurs as long as the vehicle travels at a speed and at a location falling in the region. Dashed region e annotated in the tone expression 902 represents a probability of $10^{-7}$, a probability at which a collision is considered as being unlikely to occur.

As can be appreciated from the collision probability distribution 903, the collision probability $P(C|S_t)$ when the speed is 0 can be determined according to the standard deviation σ (not shown) of the sensor error. This means that, at a location spaced apart by a distance of 6σ, the collision probability will be a probability of $10^{-7}$.

The embodiment of the present invention can estimate the accuracies and detection probabilities of the sensors and the algorithm of the action plan in an integrated manner, and uses the estimated information as data for determining validity of the algorithm.

Figure 10A:
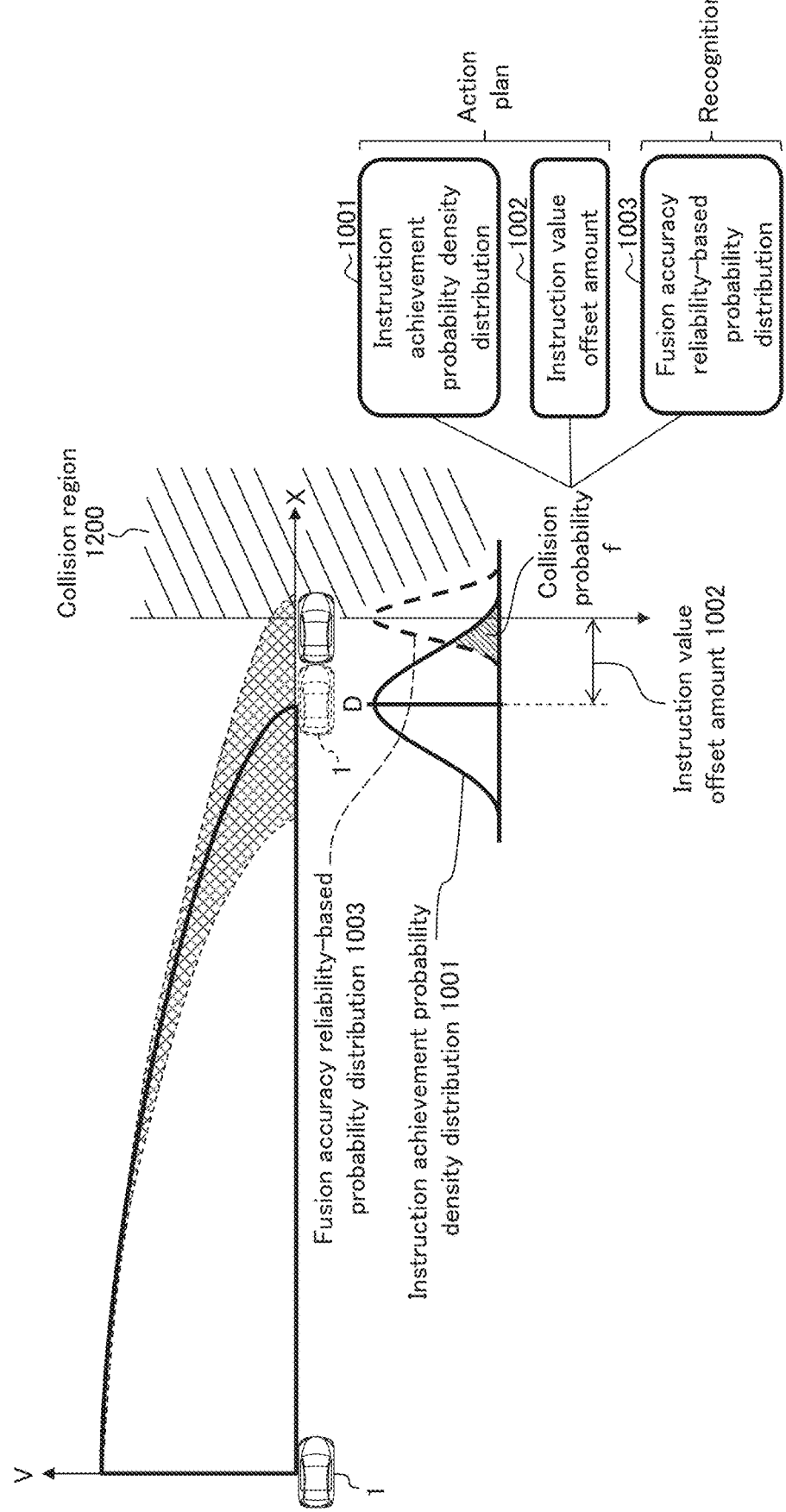
FIG. 10A illustrates a target speed curve which is based on an action plan according to a collision probability set for a vehicle controlled by the vehicle control device according to the embodiment and performing deceleration until reaching the location of a vehicle traveling ahead (target stop location) to avoid a collision.

FIG. 10A is an explanatory diagram for explaining the basic idea of the embodiment of the present invention.
Techniques to Handle Collision Probabilities
Parameters of Collision Probability FIG. 10A illustrates a target speed curve (bold line) of the vehicle 1 attempting to decelerate in order to stop at the location of the vehicle traveling ahead, i.e., the target stop location D, to avoid a collision. The horizontal axis X shown in FIG. 10A represents the location of the vehicle and the vertical axis V shown in FIG. 10A represents the speed. The vehicle 1 may not be able to stop at the target stop location D due to various factors. The actual location and speed of vehicle 1 will be distributed in the hatched region shown in FIG. 10A.

A collision probability f representing a likelihood of the vehicle 1 to collide with the vehicle traveling ahead is determined with the following three parameters, as illustrated on the right side of FIG. 10A: an instruction achievement probability density distribution 1001, an instruction value offset amount 1002, and a fusion accuracy reliability-based probability distribution 1003. The instruction achievement probability density distribution 1001 and the instruction value offset amount 1002 are used by the action plan to which the concept of collision probability is introduced. The fusion accuracy reliability-based probability distribution 1003 is used to represent recognition accuracy of sensors. Hereinafter, a description will be given of each of the parameters.

The instruction achievement probability density distribution 1001 is one of the three parameters with which the collision probability is to be determined (see FIG. 15 and its relevant description below). The instruction achievement probability density distribution 1001 represents the magnitude and probability of the distance difference between the location designated in an instruction from the travel control part 160 (vehicle behavior control part) and the location where the own vehicle 1 actually reaches.

The instruction value offset amount 1002 is one of the three parameters with which the collision probability is to be determined. The instruction value offset amount 1002 is a parameter that represents an offset by which the target stop location should be spaced apart from the vehicle traveling ahead.

The fusion accuracy reliability-based probability distribution 1003 depends on the combination of sensors, such as cameras, radars, and Lidars, detected time period, and detected distance. The fusion accuracy reliability-based probability distribution 1003 depends on the redundancy of the sensors and the below-described detection scheme, which may be AND detection scheme (see FIGS. 18A and 27 and their relevant descriptions below), OR detection scheme (see FIGS. 18B and 28 and their relevant descriptions below), or HALF-AND detection scheme (see FIGS. 18C and 29 and their relevant descriptions below).

Hereinbelow, relationships between the instruction achievement probability density distribution 1001, fusion accuracy reliability, the fusion accuracy reliability-based probability distribution 1003, the collision probability f, and the instruction value offset amount 1002 will be described in detail with reference to FIGS. 10A, 10B, 10C, and 12.

Instruction Achievement Probability Density Distribution

The instruction achievement probability density distribution 1001 represents a distribution of the location at which the vehicle 1 actually stops in response to a certain deceleration request with respect to the target stop location. The instruction achievement probability density distribution 1001 shown in FIG. 10A is an example of the distribution of the stop location of the vehicle 1 having attempted to stop at location D. The instruction achievement probability density distribution 1001 is a characteristic to be measured in advance through a measurement process to measure the stop location of the vehicle 1 to which a certain deceleration instruction has been given.

Assume that the action plan creating part 200 has determined an acceptable maximum deceleration for an action plan in accordance with the current autonomous driving mode and the like. An instruction achievement probability density distribution measured in advance in the above-described measurement process with a deceleration which is equal to or approximately the same as the maximum deceleration is regarded as the instruction achievement probability density distribution 1001 for the action plan to be currently executed.

Fusion Accuracy Reliability

The fusion accuracy reliability is obtained from: a sensor configuration representing a combination of sensors in a plurality of sensors, the combination of sensors having detected a target object; and a detected time period during which the sensor configuration continuously having detected the target object. In general, the more the number of sensors detecting the target object, or the longer the detected time period, the fusion accuracy reliability increases. The fusion accuracy reliability varies in a manner depending on the combination of the sensors detecting the target object.

Figure 10B:
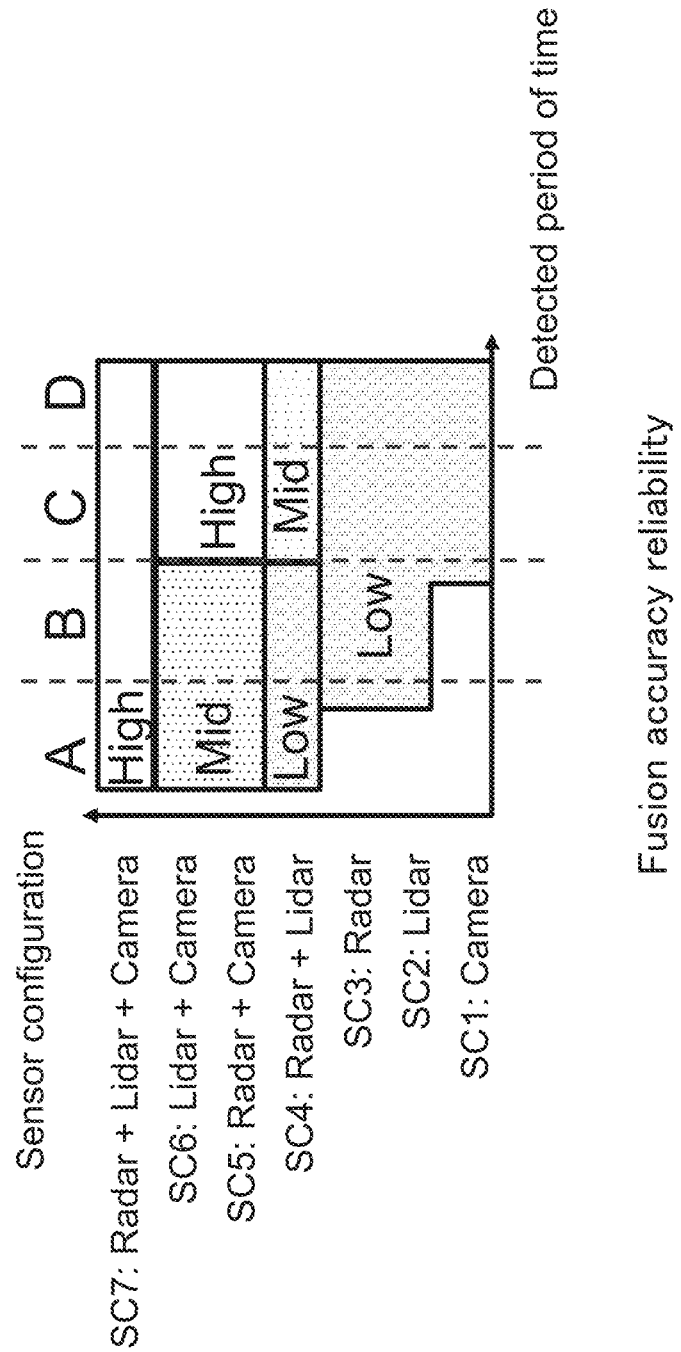
FIG. 10B illustrates a fusion accuracy reliability that is determined when a detection device of the vehicle has detected a target object. It is determined based on the sensor configuration having detected a target object and the detected time period during which the target object has been detected.

FIG. 10B illustrates an example of fusion accuracy reliabilities assessed for combinations of three kinds of sensors: Camera, Lidar, and Radar and their detected time periods. Along the vertical axis in FIG. 10B, combinations of sensors are arranged in ascending order of their reliability. The horizontal axis in FIG. 10B represents the time period during which the combination of sensors has continuously detected a target object.

For example, when a target object is detected by sensor configuration SC1 (Camera) and the detected time period is D, the fusion accuracy reliability is Low; when a target object is detected by sensor configuration SC6 (Lidar+Camera) and the detected time period is B, the fusion accuracy reliability is Mid; and when a target object is detected by sensor configuration SC7 (Radar+Lidar+Camera) and the detected time period is D, the fusion accuracy reliability is High. The fusion accuracy reliability may be assessed in three levels Low, Mid, and High as shown in FIG. 10B by comparing the measured probability of correct detections by each sensor configuration for each detected time period with predetermined threshold values. Alternatively, the numerical value of the measured probability of correct detections may be used as is to represent the fusion accuracy reliability.

Fusion Accuracy Reliability-Based Probability Distribution

Figure 10C:
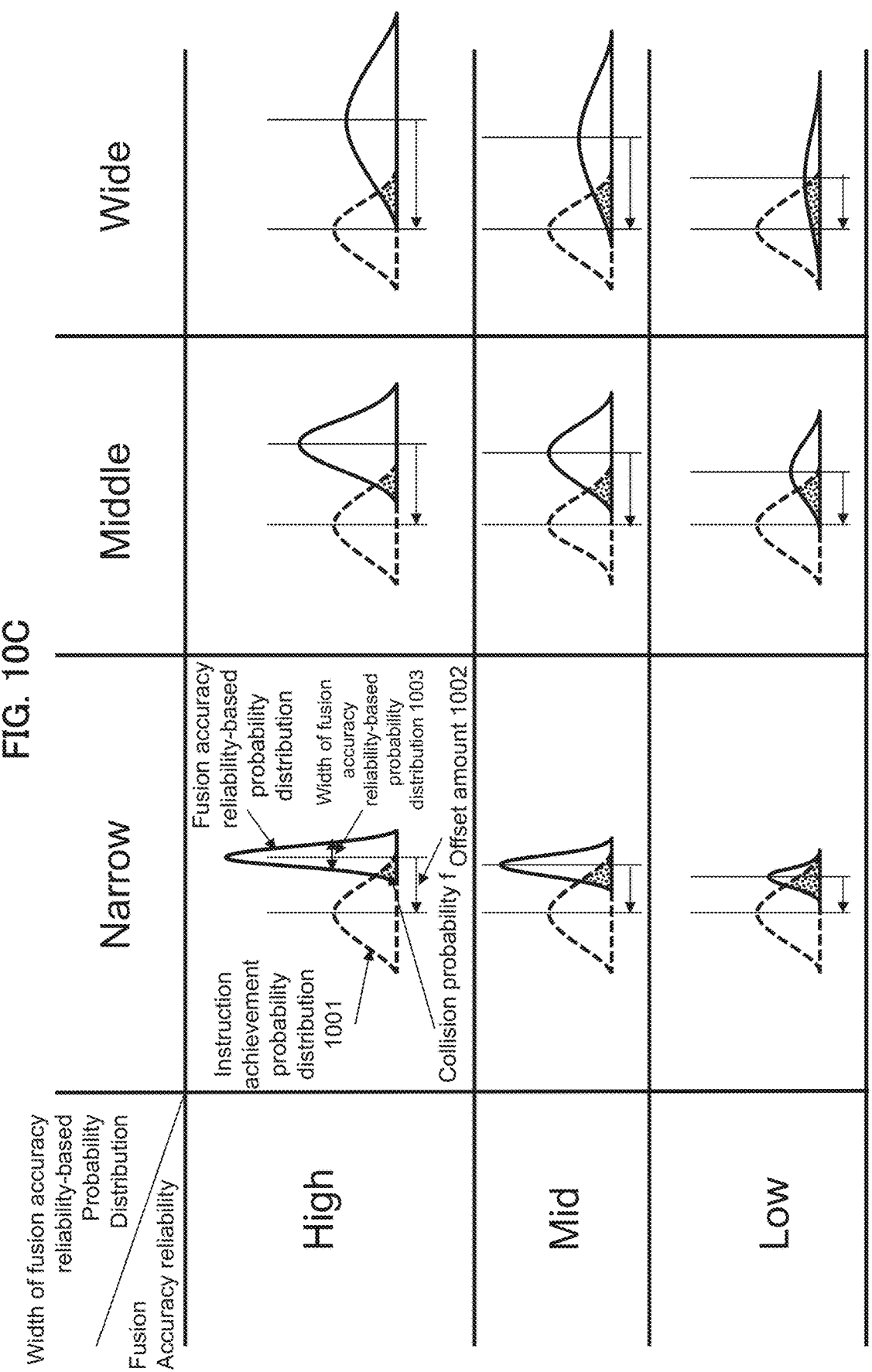
FIG. 10C illustrates variation in an offset amount of instruction value, which offset amount is to be obtained, when a distance detection device of the vehicle according to the embodiment has detected a target object, on the basis of an instruction achievement probability density distribution and a fusion accuracy reliability-based probability distribution determined based on the sensor configuration having detected the target object and a detected time period during which the target object has been detected.

A fusion accuracy reliability-based probability distribution represents a distribution according to which the detected distances measured with a combination of sensors will be expected to be distributed with respect to the true value. FIG. 10C illustrates relationships between the fusion accuracy reliability, the fusion accuracy reliability-based probability distribution 1003, the instruction achievement probability density distribution 1001, the collision probability f, and the offset amount 1002.

When focusing on one of the fusion accuracy reliabilities, e.g., Mid, the larger the deviations of the detected distances from the true distance, the wider the width of the fusion accuracy reliability-based probability distribution 1003 becomes, and the smaller the deviations of the detected distances from the true distance, the narrower the width of the fusion accuracy reliability-based probability distribution 1003 becomes. The fusion accuracy reliability-based probability distribution 1003 and its width are to be obtained in advance through a process of finding, in a situation where the true distance is known, an error distribution according to which the errors of the detected distances are distributed.

When focusing on the cases where the width of the fusion accuracy reliability-based probability distribution 1003 is Middle, the height of the fusion accuracy reliability-based probability distribution 1003 is high when the fusion accuracy reliability is High; and the height of the fusion accuracy reliability-based probability distribution 1003 is low when the fusion accuracy reliability is Low. The height of the fusion accuracy reliability-based probability distribution 1003 is determined so that the area of the probability distribution is approximately proportional to the detection probability of the sensor configuration. The width and height of the fusion accuracy reliability-based probability distribution 1003 are characteristics to be obtained in advance through a process of finding a detection characteristics, in which process the sensor configuration is tested to find whether an object is detected in a situation where the object is known to be present or absent.

Instruction Value Offset Amount

A collision probability f representing a likelihood of vehicle 1 colliding with a vehicle traveling ahead of vehicle 1 is determined by a relative location relationship between the instruction achievement probability density distribution 1001 and the fusion accuracy reliability-based probability distribution 1003, which relative location relationship is to be determined by the instruction value offset amount 1002. The instruction value offset amount 1002 specifies a distance difference between the locations of apexes of the two distributions of the instruction achievement probability density distribution 1001 and the fusion accuracy reliability-based probability distribution 1003, which distance difference determines the collision probability f.

In other words, the instruction value offset amount 1002 can be determined so that the collision probability f becomes equal to the target collision probability. The collision probability f is obtained by a convolution between the fusion accuracy reliability-based probability distribution 1003 and the instruction achievement probability density distribution

1001. The instruction value offset amount 1002 can be determined so that the collision probability f becomes equal to the target collision probability. The nine graphs shown in FIG. 10C represent, for a given instruction achievement probability density distribution 1001, how the offset amount 1002 varies when the offset amount 1002 is determined so as to obtain the same collision probability for each of combinations of fusion accuracy reliability and a fusion accuracy reliability-based probability distribution 1003. It should be noted that the target collision probability is a predetermined fixed value determined in advance in a design phase taking into account the detection probability of objects to be detected and the severity of collisions with the objects.

In FIG. 10C, when focusing on one of the fusion accuracy reliabilities, e.g., Mid, the narrower the width of the fusion accuracy reliability-based probability distribution 1003, the smaller the instruction value offset amount 1002 becomes, and the wider the width of the fusion accuracy reliability-based probability distribution 1003, the larger the instruction value offset amount 1002 becomes. In FIG. 10C, when focusing on the cases in which the width of the fusion accuracy reliability-based probability distribution 1003 is Middle, the higher the fusion accuracy reliability, the larger the instruction value offset amount 1002 becomes, and the lower the fusion accuracy reliability, the smaller the instruction value offset amount 1002 becomes.

Width of Fusion Accuracy Reliability-Based Probability Distribution

The width of the fusion accuracy reliability-based probability distribution 1003 varies in a manner depending on the sensor configuration (types and combination of sensors), detected time period, the distance to the target object, and the like. In general, when the distance to the target object is far, the width of the fusion accuracy reliability-based probability distribution 1003 is wide; and when the distance to the target object is near, the width of the fusion accuracy reliability-based probability distribution 1003 is narrow. When a comparison is made between cases in which the distances to the target objects are the same, for example, in the case of sensor configuration SC1 (Camera), the width of the fusion accuracy reliability-based probability distribution 1003 is wide; in the case of sensor configuration SC3 (Radar), middle; and in the case of sensor configuration SC4 (Radar+Lidar), narrow. In addition, in general, the longer the detected time period, the narrower the width of the fusion accuracy reliability-based probability distribution 1003 becomes.

Estimation of Width of Fusion Accuracy Reliability-Based Probability Distribution while Traveling As described above, the width of the fusion accuracy reliability-based probability distribution 1003 can be obtained in advance through a process of finding an error distribution according to which the errors of the detected distances are distributed in a situation where the true distance is known. In detail, the width of the fusion accuracy reliability-based probability distribution 1003 is to be obtained for each of the combinations of the sensor configuration (types and combination of sensors), the detected time period, and the detected distance. Then, it is possible to construct a table (not shown, detection probability distribution width table) that receives, as inputs, a sensor configuration (types and combination of sensors), a detected time period, and a detected distance and outputs a width of a fusion accuracy reliability-based probability distribution 1003 and to store the detection probability distribution width table in a storage device (e.g., Read Only Memory (ROM)) of the vehicle control device. With this structure, it is possible to estimate the width of the current fusion accuracy reliability-based probability distribution 1003 by referencing the detection probability distribution width table with the combination of the current sensor configuration, the detected time period, and the detected distance.

The detection probability distribution width table has been described as taking the three parameters of sensor configuration, detected time period, and detected distance and outputting the width of the fusion accuracy reliability-based probability distribution 1003. However, to reduce the size of the table, the information to be input to the table may be reduced to two parameters: a fusion accuracy reliability (High/Mid/Low) and a detected distance or a sensor configuration and a detected time period. In addition, to reduce the information to be inputted, the precision (quantization width) of each of the parameters may be selected in addition to the number of the parameters. These selections are to be made in a tradeoff between precision and cost.

Procedure to Calculate Offset Amount While Traveling

Figure 12:
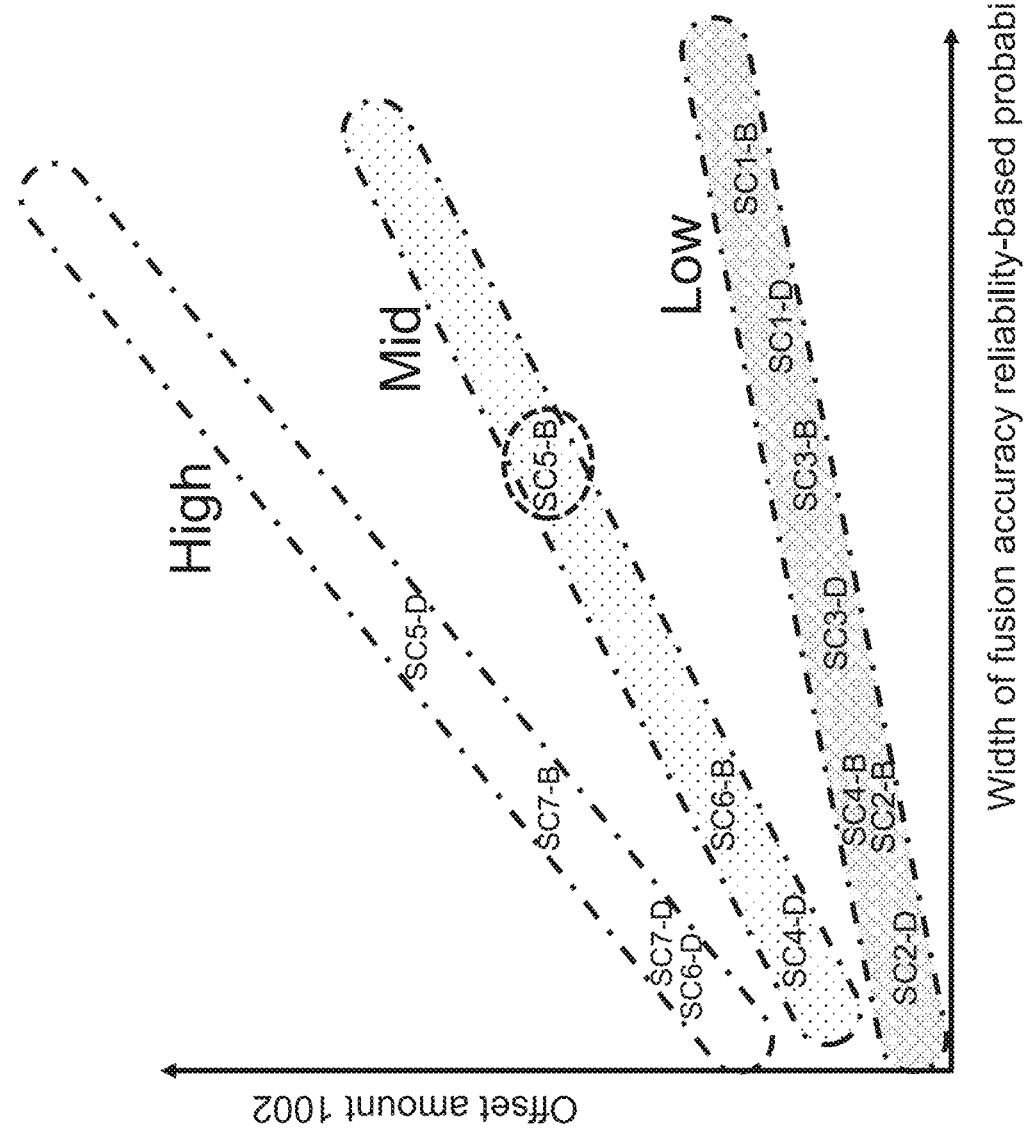
FIG. 12 illustrates a relationship between the fusion accuracy reliability-based probability distribution and the offset amount of the vehicle control device according to the embodiment.

FIG. 12 is an explanatory diagram for explaining how the offset amount 1002 can be obtained from the sensor configuration and the detected time period while traveling when an instruction achievement probability density distribution 1001 and a target collision probability are given for a target object located at a certain distance.

In FIG. 12, the horizontal axis represent the width of the fusion accuracy reliability-based probability distribution and the vertical axis represents the offset amount. In FIG. 12, for the given instruction achievement probability density distribution 1001 and the target collision probability, the offset amount 1002 obtained based on the fusion accuracy reliability-based probability distribution 1003 actually measured for each of the combinations of sensor configuration and detected time period, shown in FIG. 10B, is plotted with respect to the width of the fusion accuracy reliability-based probability distribution 1003.

In FIG. 12, plots for the cases of the fusion accuracy reliability being High, Mid, and Low are enclosed in dash-dot line regions High, Mid, and Low, respectively. In FIG. 12, for example, a combination of sensor configuration SC5 (Radar+Camera) detecting a target object and detected time period B is denoted by reference numeral SC5-B. Plots of the other combinations are also denoted by reference numerals formed in the same manner.

As shown in FIG. 12, the plots of the offset amounts have linear relationships with respect to the width of the fusion accuracy reliability-based probability distribution 1003, with a different slope on different fusion accuracy reliability. The higher the fusion accuracy reliability, the larger the slope of the linear relationship.

As the instruction achievement probability density distribution 1001 varies in a manner depending on the deceleration requested, the relationships shown in FIG. 12 vary in a manner depending on the deceleration requested. However, those relationships present approximately the same tendencies. Therefore, it is possible to store parameters (e.g., slope) of a linear relationship per each deceleration and per each fusion accuracy reliability in a table (not shown, offset amount characteristic parameter table) to calculate the offset amount by a simple calculation while traveling.

Specifically, the offset amount characteristic parameter table is looked up with the maximum deceleration for the current action plan and the fusion accuracy reliability (High/Mid/Low) to select a linear relationship, which is like one of the linear relationships shown in FIG. 12. Then, the width of the fusion accuracy reliability-based probability distribution 1003 is obtained by looking up the detection probability distribution width table. And then, the obtained width of the fusion accuracy reliability-based probability distribution 1003 and the selected linear relationship is used to calculate the offset amount 1002.

The calculation method described above calculates the offset amount 1002 using one of the linear relationships shown in FIG. 12 and the width of the fusion accuracy reliability-based probability distribution 1003 separately estimated. Alternatively, as a more general way, it is conceivable to create a table that receives the deceleration, sensor configuration, detected time period, and detected distance and outputs a corresponding offset amount and to obtain the offset amount 1002 by looking up the table only once.

As will be appreciated from the above description, the instruction achievement probability density distribution 1001 can be estimated based on the deceleration. In addition, the width of the fusion accuracy reliability-based probability distribution 1003 can be estimated based on the sensor configuration, detected time period, and detected distance. The offset amount 1002 that gives the target collision probability can be calculated from the instruction achievement probability density distribution 1001 and the width of the fusion accuracy reliability-based probability distribution 1003. Putting these together, it is possible to create an offset amount table (not shown) that receives a deceleration, a sensor configuration, a detected time period, a detected distance and outputs a corresponding offset amount 1002 using a Read Only Memory (ROM).

With this configuration, however, the size of the offset amount table increases in a manner depending on the precision of input information. That is, when the quantization steps of the deceleration, detected time period, and detected distance is made small and/or when the number of combinations of sensors is large, the capacity of the offset amount table increases. That means, whether to calculate the offset amount 1002 based on the linear relationships as shown in FIG. 12 or obtain the offset amount 1002 by looking up the offset amount table is a tradeoff between precision, calculation time, and cost.

Returning to FIG. 10A, a description will be given of an example of the flow of calculating the offset amount 1002 by the vehicle control device 100.

As shown in FIG. 10A, the fusion accuracy reliability-based probability distribution 1003 has its center at the vehicle traveling ahead. Assume that the own vehicle 1 attempts to stop at the location indicated by reference numeral D shown in FIG. 10A to avoid collision with the vehicle traveling ahead. In this situation, the instruction achievement probability density distribution 1001 is a distribution having its center at location D as shown in FIG. 10A. In the example shown in FIG. 10A, the instruction achievement probability density distribution 1001 partially overlaps with the fusion accuracy reliability-based probability distribution 1003. As described above, the area of this overlapping region represents a collision probability in this stopping operation. When the offset amount 1002 is changed, this overlapping area varies and thus the collision probability also varies.

The own vehicle 1 currently traveling cannot know the actual location of the vehicle traveling ahead, and thus cannot know the location of the center axis of the fusion accuracy reliability-based probability distribution 1003. However, as described above, the width of the fusion accuracy reliability-based probability distribution 1003 can be estimated by obtaining the fusion accuracy reliability from a combination of: a sensor configuration representing a combination of sensors in a plurality of sensors, the combination of sensors having detected a target object; and a detected time period during which the sensor configuration continuously having detected the target object, and by referencing the data measured in advance. In addition, as described above, the instruction achievement probability density distribution 1001 in the current stopping operation can be estimated based on the maximum deceleration currently set by referencing the data measured in advance.

Then, under the instruction achievement probability density distribution 1001 estimated in the current stopping operation, an offset amount 1002 that gives a target collision probability can be determined by performing calculation based on the fusion accuracy reliability, the width of the fusion accuracy reliability-based probability distribution 1003, and data obtained by a measurement in advance as described with reference to FIG. 12.

The instruction value offset amount 1002 has been described as being determined so that the collision probability, which is obtained by a convolution of the instruction achievement probability density distribution 1001 and the fusion accuracy reliability-based probability distribution 1003 spaced apart by the instruction value offset amount 1002, becomes equal to the target collision probability. However, as described above, when storing the offset amount table, which receives the deceleration, sensor configuration, detected time period, and detected distance and outputs the corresponding offset amount, in a Read Only Memory (ROM) and the offset amount table is to be looked up while traveling, there is no need of calculation of the convolution while traveling because information on the instruction achievement probability density distribution 1001 and the fusion accuracy reliability-based probability distribution 1003 is embedded in the offset amount table. That means, there is no need of estimating the instruction achievement probability density distribution 1001 and fusion accuracy reliability-based probability distribution 1003 themselves or using them in the calculation.

Now, a description will be given of a reason why the instruction achievement probability density distribution 1001 is obtained based on the maximum deceleration currently set. When the deceleration is made large, the instruction achievement probability density distribution 1001 gets wider and thus the offset amount to be set becomes large. Assuming the maximum deceleration for an action plan makes it possible to obtain a safe offset amount suitable to the action plan.

Hereinbelow, a description will be given of the operation described above with reference to FIG. 11.

Flow of Determining Instruction Value of Action Plan

Figure 11:
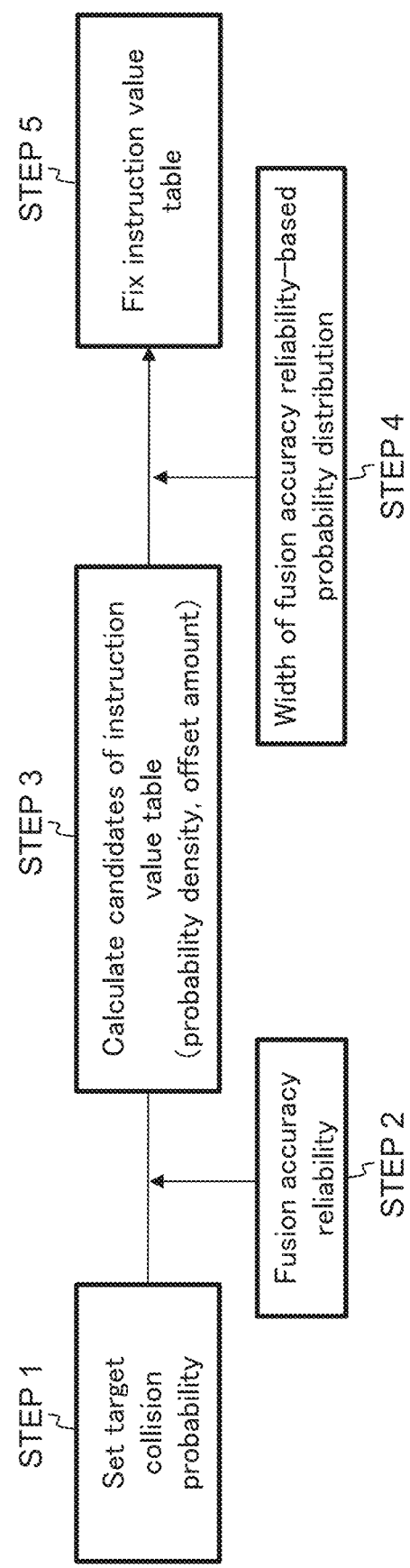
FIG. 11 illustrates a flowchart of determining an instruction value of an action plan of the vehicle control device according to the embodiment.

FIG. 11 illustrates a flow of determining an instruction value offset amount for an action plan using the characteristic shown in FIG. 12. Hereinbelow, a description will be given of an example of embodiment in which the instruction value offset amount 1002 is determined based on the characteristic shown in FIG. 12. The instruction value offset amount 1002 specifies a target stop location at which the vehicle 1 is to be controlled to stop in an action plan to be created by the action plan creating part 200, as an offset from the location indicated by the detected distance detected by the distance detection part.

STEP 1

The target collision probability setting part 210 sets a target collision probability. The target collision probability is a predetermined fixed value determined in advance in a design phase taking into account the detection probabilities of objects to be detected and the severities of collisions with the objects.

STEP 2

The fusion accuracy reliability estimation part 240 determines a fusion accuracy reliability based on the current sensor configuration and the detected time period. The fusion accuracy reliability is determined based on the correct detection probability observed in advance with the same combination of sensors, as described with reference to FIG. 10B. The fusion accuracy reliability is obtained from: a sensor configuration representing a combination of sensors in a plurality of sensors, the combination of sensors having detected a target object; and a detected time period during which the sensor configuration continuously having detected the target object. In general, the more the number of sensors detecting the target object, or the longer the detected time period, the fusion accuracy reliability increases. The fusion accuracy reliability varies depending on the combination of the sensors detecting the target object.

STEP 3

The instruction achievement probability density distribution estimation part 220 and an instruction value offset amount calculation part 230 determines candidates of an instruction value table (probability density, offset amount). The instruction achievement probability density distribution estimation part 220 determines a candidate of the instruction achievement probability density distribution 1001 based on the maximum deceleration currently set. As described above, the candidate of the instruction achievement probability density distribution 1001 is determined based on characteristic that has been measured in advance through a measurement process to measure the stop location of the vehicle 1 to which a certain deceleration instruction has been given.

The instruction value offset amount calculation part 230 determines candidates of the instruction value offset amount based on the fusion accuracy reliability determined by the fusion accuracy reliability estimation part 240 and the candidate of the instruction achievement probability density distribution 1001.

This step corresponds to selecting one of the dash-dot line regions High, Mid, and Low shown in FIG. 12. For example, when the fusion accuracy reliability is Mid, the offset amounts in dash-dot line region Mid in FIG. 12 are the candidates.

STEP 4

The fusion accuracy reliability estimation part 240 estimates the width of the fusion accuracy reliability-based probability distribution. The instruction value offset amount calculation part 230 selects one from the offset amount candidates selected in STEP 3, based on the estimated width of the fusion accuracy reliability-based probability distribution 1003. This corresponds to, for example, when the fusion accuracy reliability is determined as Mid because the target object is detected by sensor configuration SC5 (Radar+ Camera) and the detected time period is B, selecting the offset amount 1002 corresponding to reference numeral SC5-B shown in FIG. 12 as a result of applying the estimated width of the fusion accuracy reliability-based probability distribution 1003 to the characteristic for the case where the fusion accuracy reliability is Mid.

The width of the fusion accuracy reliability-based probability distribution 1003 is obtained, for example, by inputting the current sensor configuration and the detected time period to the detection probability distribution width table and getting the output from the table, as described above. The detection probability distribution width table stores data of the width of probability distribution obtained in advance through a measurement process.

STEP 5

The action plan creating part 200 determines an instruction value table using the offset amount 1002 obtained in STEP 4. As a result, the target location at which the action plan creating part 200 attempts the vehicle 1 to stop is determined.

It should be noted that the flow from STEP 1 to STEP 4 is an example and the flow is not limited thereto. For example, the determination of the offset amount by the above-described STEP 3 and STEP 4 can be executed by storing the offset amount table, which receives the deceleration, sensor configuration, detected time period, detected distance and outputs a corresponding offset amount, in a Read Only Memory (ROM) and by the action plan creating part 200 looking up the table. In this embodiment, the instruction achievement probability density distribution 1001 and the width of the fusion accuracy reliability-based probability distribution 1003 are reflected in the data stored in the offset amount table, and thus there is no need of obtaining the instruction achievement probability density distribution 1001 and the width of the fusion accuracy reliability-based probability distribution 1003 separately while traveling. Hereinbelow, a description will be given of an embodiment under the assumption that an offset amount that gives a target collision probability is directly obtained from the deceleration, sensor configuration, detected time period, and detected distance, in a manner similar to using the offset amount table.

Collision Probability

The collision probability $p(C|S_t)$ represented by a collision probability map is to be calculated in accordance with the calculation model represented by formula (1). The details of the calculation process related to this calculation will be described later.

$$p(C|S_t) = \iiint p(C|S_{t+1}) p(S_{t+1}|a_D(S_t, \hat{d})) p(\hat{d}|d) d\hat{d} dS_{t+1} \quad (1)$$

where $S_t$ represents a state (location, speed) at time t, $S_{t+1}$ represents a state (location, speed) at time t+1, i.e. next state, $p(C|S_{t+1})$ represents a collision probability at the next state (location, speed), $p(S_{t+1}|a_D(S_t, \hat{d}))$ represents a probability of transitioning to a state $S_{t+1}$ due to an action generated when $\hat{d}$ is observed in a state $S_t$ (this represents algorithm and accuracy of action plan), and $p(\hat{d}|d)$ represents a probability of observing a state $\hat{d}$ of a target object when the actual state of the target object is d (this represents sensor reliability, i.e., detection probability and accuracy).

Flowchart

Figure 13:
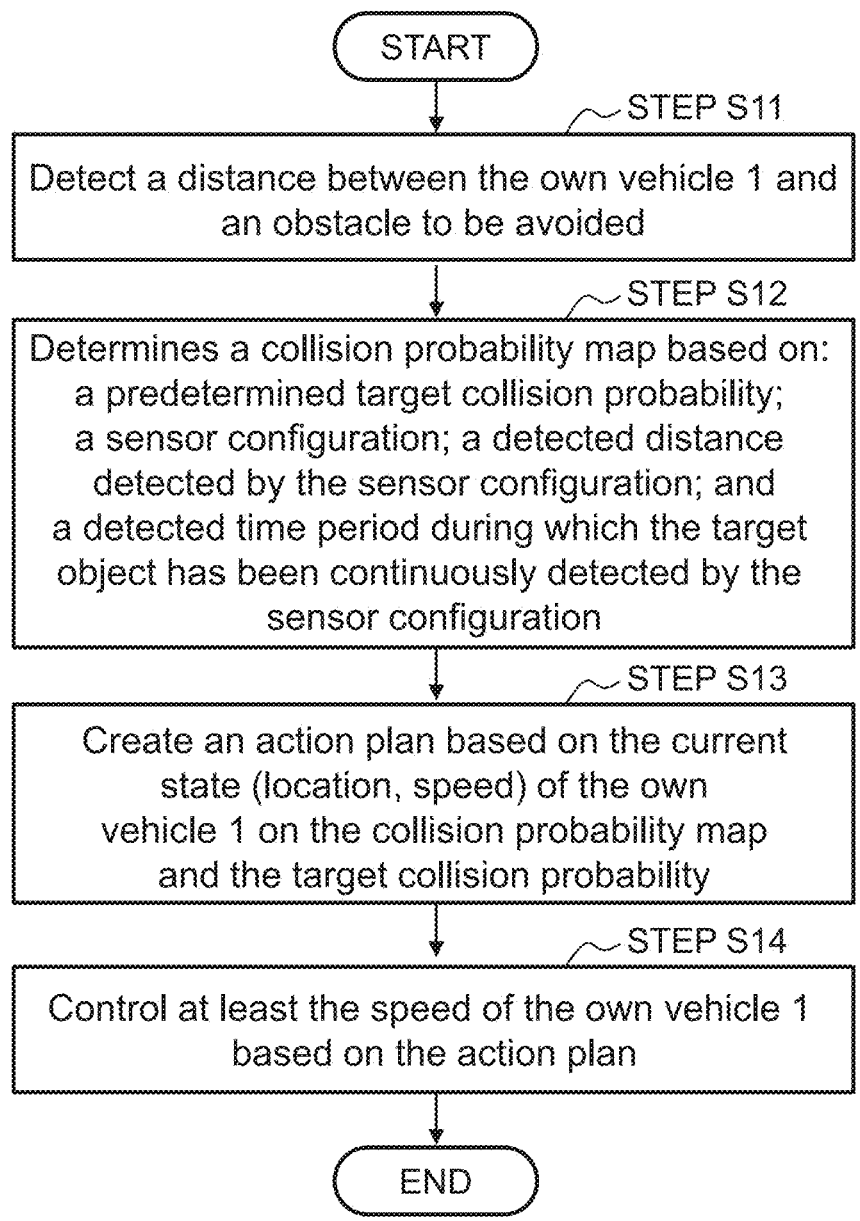
FIG. 13 is a flowchart illustrating vehicle control processing performed by the vehicle control device according to the embodiment.

FIG. 13 illustrates a flowchart representing a vehicle control flow of the vehicle control device 100 according to the embodiment.

This flow is repeatedly executed by the autonomous driving control part 120 (see FIG. 2) at a predetermined cycle.

STEP S11

The autonomous driving control part 120 (distance detection part) detects, on the basis of the output from the detection device DD (distance detection part), a distance between the own vehicle 1 and an obstacle to be avoided.

STEP S12

The collision probability map setting part 250 determines a collision probability map based on: a predetermined target collision probability; a maximum deceleration currently set by the action plan creating part 200; a combination of sensors (sensor configuration), of a plurality of sensors included in the detection device DD of the distance detection part, which has detected a target object; a detected distance detected by the sensor configuration; and a detected time period during which the target object has been continuously detected by the sensor configuration. The target collision probability is a predetermined fixed value determined in advance in a design phase taking into account the detection probability of objects to be detected and the severities of collisions with the objects.

This collision probability map has been constructed using an offset amount which is determined so that a collision probability calculated based on overlapping between the instruction achievement probability density distribution 1001 estimated based on the maximum deceleration and the fusion accuracy reliability-based probability distribution 1003 estimated based on the sensor configuration, detected distance, and detected time period is equal to the target collision probability. In other words, the collision probability map is constructed based on the target collision probability, maximum deceleration, sensor configuration, detected distance, and detected time period, using a target stop location which is set so that the collision probability at the target stop location is equal to the target collision probability.

The collision probability map to be obtained here includes discrete grid points each of which corresponds to a location and a speed and for each of which a collision probability is obtained by an approximate calculation. Each of the discrete grid points represents a discrete state.

STEP S13

The action plan creating part 200 creates an action plan based on the collision probability of the own vehicle 1 at the current state (location, speed) on the collision probability map and the target collision probability.

STEP S14

The travel control part 160 controls at least the speed of the own vehicle 1 based on the action plan, completing one cycle of this flow.

The autonomous driving control part 120 executes STEPS S11 to S14 for every predetermined time period.

Hereinbelow, a description will be given of features of the collision probability map to be used in the above-described vehicle control.

Collision Probability Map

Figure 14:
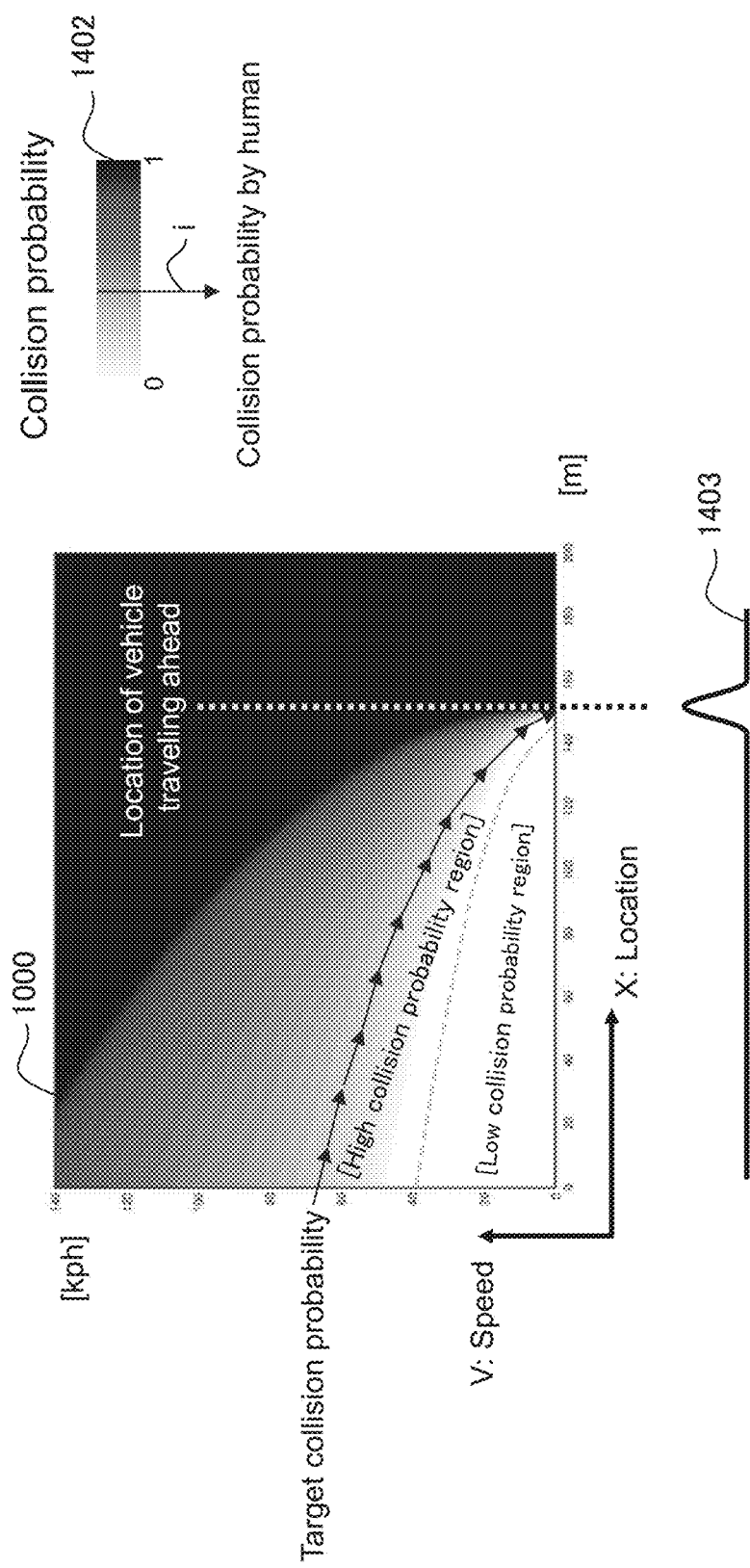
FIG. 14 illustrates a collision probability map used in the vehicle control device according to the embodiment. Reference numeral 1000 in FIG. 14 denotes a collision probability map, based on which deceleration is to be performed until reaching the location of the vehicle traveling ahead to avoid a collision. Reference numeral 1402 in FIG. 14 represents the magnitude of a reliability in observation in tone expression according to which the collision probabilities in the collision probability map 1000 is represented. Reference numeral 1403 in FIG. 14 represents an image of the peak of the collision probability distribution when the speed is 0 in the collision probability map 1000.

FIG. 14 illustrates the collision probability map 1000. Reference numeral 1000 in FIG. 14 denotes a collision probability map, based on which deceleration is performed until reaching the location of the vehicle traveling ahead to avoid a collision. The horizontal axis X of the collision probability map 1000 represents the location of the own vehicle and the vertical axis V of the collision probability map 1000 represents the speed of the own vehicle. Reference numeral 1402 in FIG. 14 represents the magnitude of a reliability in observation in tone expression according to which the collision probabilities in the collision probability map 1000 is represented. Reference numeral 1403 in FIG. 14 represents an image of the peak of the collision probability distribution when the speed is 0 in the collision probability map 1000.

It should be noted that the collision probability map 1000 shown in FIG. 14 is presented to explain how an action plan can be created with reference to the collision probability map and is a theoretical one that has been created in a situation where the actual location of the vehicle traveling ahead is known.

When the detection probability and accuracy of the sensors, the accuracy of the action plan, and the collision probability at the final state are determined, a collision probability is calculated for each state representing the speed of the vehicle and the location of the vehicle relative to the target object. The collision probability map 1000 is created based on the calculated collision probabilities.

For example, a collision probability by human is defined within a range of 0 to 1 expressed in the tone expression 1402. This collision probability by human (see reference numeral i in FIG. 14) can be determined as the target collision probability. Here, the term "collision probability by human" means a collision probability at which a human (driver) will cause a collision when driving the vehicle 1 in the same road environment. Setting the collision probability by human as the target collision probability is based on an idea that to make the autonomous driving safer than manual driving, the collision probability in a case where an autonomous driving system drives should be lower than the collision probability in a case where a human drives the vehicle.

A target speed curve can be drawn on the collision probability map 1000 as shown in FIG. 14 by connecting states (location, speed) whose collision probability is the same as the target collision probability. The arrows on the collision probability map 1000 correspond to the target collision probability.

The collision probability distribution at a speed of 0 corresponds to the fusion accuracy reliability-based probability distribution 1003 and presents a normal distribution like the characteristic 1403 shown in FIG. 14. Assuming that the standard deviation of the normal distribution is a (not shown), at a location spaced apart by a distance of 6σ, the collision probability will be $10^{-7}$ and thus it is unlikely that a collision occurs.

An object of the present invention is to achieve both safety and comfort. In this regard, the embodiment of the present invention sets an appropriate action plan on the collision probability map 1000 illustrated in FIG. 14.

When the collision probability is lower than a first threshold value lower than the target collision probability (see [Low collision probability region] in the collision probability map 1000 shown in FIG. 14), braking is restrained and thus the set speed is maintained as much as possible. In this case, comfort is emphasized, and no jerky movement will occur but sudden braking needs to be permitted.

When the collision probability is lower than the target collision probability but equal to or higher than a second threshold value equal to or higher than the first threshold value (see [High collision probability region] in the collision probability map 1000 shown in FIG. 14), braking is performed frequently. In this case, safety is emphasized, and jerky movement may occur, but sudden braking will not occur. The collision probability map 1000 shown in FIG. 14 represents an example where the second threshold value is equal to the first threshold value.

The shading expression on the collision probability map 1000 shown in FIG. 14 can be used as an index to control the vehicle so as to limit the collision probability in a range less than a predesigned collision probability. The autonomous driving control can be performed so as not to enter the darker shaded region.

Accuracy of Achieving Goal of Algorithm of Action Plan

A description will be given of the accuracy of achieving the goal of an action plan.

Obtaining the accuracy of achieving the goal of an algorithm of an action plan corresponds to obtaining $p(S_{t+1} | a_D(S_t, \hat{d}))$ in formula (1).

Figure 15:
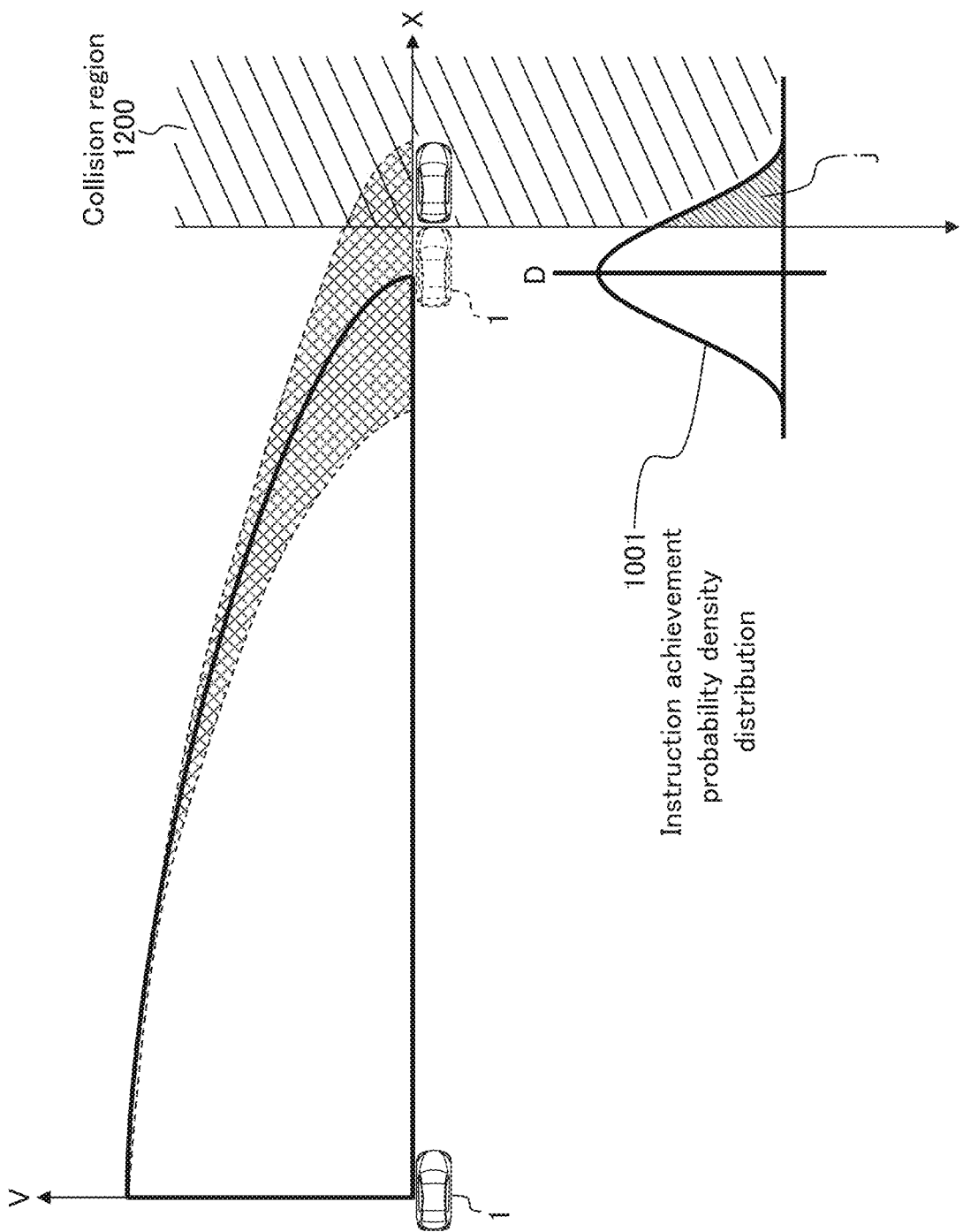
FIG. 15 is an explanatory diagram for explaining a relationship between an action plan of the vehicle control device according to the embodiment and the risk of a collision.

FIG. 15 is an explanatory diagram for explaining a relationship between an action plan and the risk of a collision. The same entities as those shown in FIG. 10A are given the same reference numerals.

The vehicle control device 100 (see FIG. 2) controls the vehicle 1 so that the vehicle 1 can stop at location D shown in FIG. 15. However, it can be difficult to achieve stopping at location D due to several factors including road surface conditions and faults occurring in the vehicle body. The likelihood of achieving the stopping can be represented by a probability density distribution. In the case of the present embodiment, the instruction achievement probability density distribution estimation part 220 (see FIG. 4) calculates an instruction achievement probability density distribution 1001.

As shown in FIG. 15, the instruction achievement probability density distribution 1001 may include part that overlaps the collision region 1200 (see reference numeral j in FIG. 15). This part represents the risk of collision. This means that achieving more safety is to reduce this part (see reference numeral j in FIG. 15). As a way to reduce that part, it is conceivable to make the probability density distribution concentrated to the central value (i.e., reduce the factors regarding road surface conditions, faults of the vehicle body, and the like). However, this is difficult to achieve. A realistic way is to set location D to a location closer to the own vehicle 1 than the collision region 1200.

Reliability (Detection Probability, Accuracy) of Sensors

A description will be given of the reliability (detection probability, accuracy) of sensors.

Obtaining the reliability of sensors corresponds to obtaining $p(\hat{d}|d)$ in formula (1).

Figure 16:
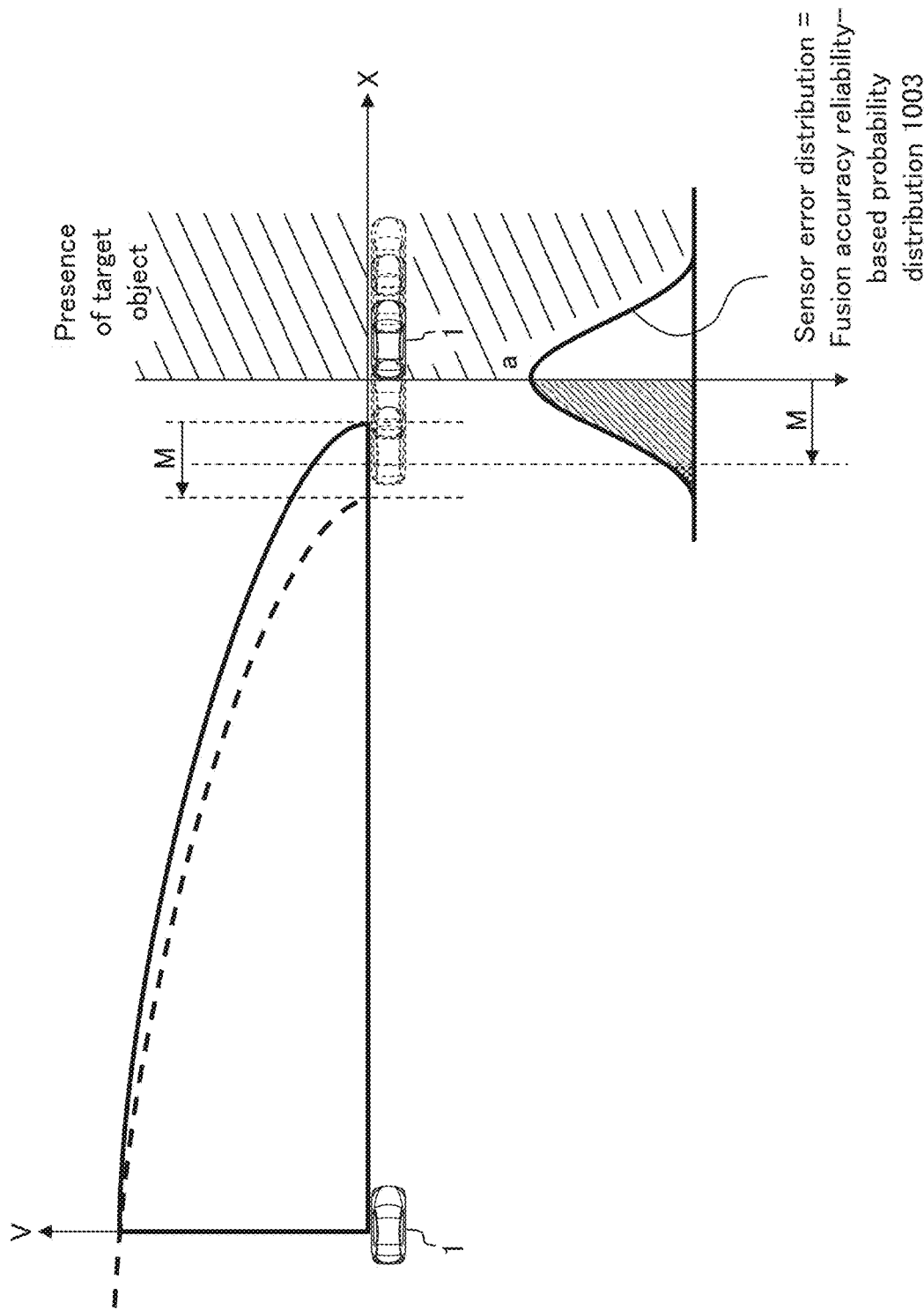
FIG. 16 is an explanatory diagram for explaining the error distribution of the sensors of the vehicle control device according to the embodiment.

FIG. 16 is an explanatory diagram for explaining the error distribution of the sensors. The same entities as those shown in FIG. 15 are given the same reference numerals. The sensor error distribution, illustrated in lower part of FIG. 16, represents a distribution of the errors in the detection results of the sensors. This distribution will be centered at the location of the target object. This distribution is regarded as the fusion accuracy reliability-based probability distribution 1003 described above.

As can be appreciated from FIG. 16, by setting a margin M between the location at which the vehicle is controlled to stop by braking and the detected location of the target object detected by the sensors, the probability of collision can be reduced.

Influence of Action Plan and/or Sensors to Collision Risk

A description will be given of influences of an action plan and/or sensors to the risk of collision.

FIG. 17 is an explanatory diagram for explaining influences of an action plan and/or sensors to the risk of collision. Reference numeral 1701 in FIG. 17 denotes a collision probability map for a case where the maximum braking is 0.6G and the standard deviation of the sensor error is σ1. The white solid line shown in the collision probability map 1701 indicates an example of the target collision probability.

Reference numeral 1702 in FIG. 17 denotes a collision probability map for a case where the action plan setting of the collision probability map 1701 has been modified. The target collision probability for this case is indicated on the collision probability map 1702. Increasing the maximum braking allowed in the action plan will increase the ability of vehicle 1 to deal with obstacles and reduce the collision probability. In this case, combinations of location and speed that have a collision probability being equal to the target collision probability move toward upper right (toward the target object and toward higher speed) on the collision probability map. That is, the low collision probability region spreads in a wider area. In this case, the maximum braking setting of the action plan setting of collision probability map 1702 has been increased to a maximum braking of 1.0G. This means a larger deceleration G can be used for the braking, resulting in an enlarged area of states with low risk of collision. This is illustrated by arrow k shown on the collision probability map 1702 as an example. Therefore, it is possible to defer the timing of braking to a time as late as possible.

Reference numeral 1703 in FIG. 17 denotes a collision probability map for a case where the sensor performance has degraded from the sensor performance based on which collision probability map 1701 has been determined. In this case, the sensor performance has degraded, so that the error standard deviation of the sensors has increased from σ1 to σ2 (σ1<σ2). As a result, the collision probability is estimated as high, resulting in a reduced area of low collision probability region. This is illustrated by arrow l shown on the collision probability map 1703. In this case, by generating an action plan so as to reduce the traveling speed, the risk of collision is reduced.

Utilization of Reliabilities (Detection Probabilities) of Plural Sensors

A description will be given of utilization of the reliabilities (detection probabilities) of plural sensors.

FIGS. 18A to 18C are each an explanatory diagram for explaining utilization of the reliabilities (detection probabilities) of plural sensors. FIG. 18A illustrates the concept of braking using the results of detection by plural sensors with an AND logic; FIG. 18B illustrates the concept of braking using the results of detection by plural sensors with an OR logic; and FIG. 18C illustrates the concept of braking according to the every detection state of plural sensors.

Here, assume that the plural sensors consist of sensor 1 and sensor 2. Here, $D_1$ denotes an event of detecting a target object by sensor 1; $D_2$ denotes an event of detecting a target object by sensor 2; and E denotes a state where a target object is present. $p(D_1|E)$ represents a probability of an event that sensor 1 detects a target object under a state where the target object is actually present; $p(D_2|E)$ represents a probability of an event that sensor 2 detects a target object under a state where the target object is actually present; $p(D_1 \cap D_2|E)$ represents a probability of an event that both sensor 1 and sensor 2 detect a target object under a state where the target object is actually present; $p(D_1 \cap \overline{D_2}|E)$ represents a probability of an event that sensor 1 detects a target object but sensor 2 fail to do so under a state where the target object is actually present; $p(\overline{D_1} \cap D_2|E)$ represents a probability of an event that sensor 1 fails to detect a target object but sensor 2 detects the target object under a state where the target object is actually present; and $p(\overline{D_1} \cap \overline{D_2}|E)$ represents a probability of an event that both sensor 1 and sensor 2 fail to detect a target object under a state where the target object is actually present. When the probability of detection by both the sensor 1 and the sensor 2 at the same time $p(D_1 \cap D_2|E)$ holds formula (2), the event $D_1|E$ and the event $D_2|E$ are said to be not independent.

$$p(D_1 \cap D_2|E) \neq p(D_1|E)p(D_2|E) \qquad (2)$$

In the example of the detection with the AND logic, illustrated in FIG. 18A, braking with a deceleration of 0.6G is performed at a rate of 0.4 with respect to a total of 1.0, and cruising is performed at a rate of 0.6 with respect to the total of 1.0. In the case of the detection with the AND logic, braking is performed only when both the sensors detect a target object at the same time. The probability of the occurrence of this event under a state where the target object is actually present is $p(D_1 \cap D_2|E)$. When either or both of the sensors fail to detect the target object, cruising is performed. The probability of the occurrence of this event under a state where the target object is actually present is given as: $p(D_1 \cap \overline{D_2}|E)+p(\overline{D_1} \cap D_2|E)+p(\overline{D_1} \cap \overline{D_2}|E)$.

A description will be given later of an example of an action plan using the detection with the AND logic (hereinafter referred to as AND detection scheme) with reference to FIG. 27.

In the example of the detection with the OR logic, illustrated in FIG. 18B, braking with a deceleration of 0.6G is performed at a rate of 0.9 with respect to a total of 1.0, and cruising is performed at a rate of 0.1 with respect to the total of 1.0. In the case of the detection with the OR logic, braking is performed when either or both of the sensors detect a target object. The probability of the occurrences of this event under a state where the target object is actually present is given as: $p(D_1 \cap D_2|E)+p(D_1 \cap \overline{D_2}|E)+p(\overline{D_1} \cap D_2|E)$. When both the sensors fail to detect the target object, cruising is performed. The probability of the occurrence of this event under a state where the target object is actually present is given as $p(\overline{D_1} \cap \overline{D_2}|E)$.

A description will be given later of an example of an action plan using the detection with the OR logic (hereinafter referred to as OR detection scheme) with reference to FIG. 28. Note that the advantages and disadvantages or application conditions of the action plan using AND detection scheme and the action plan using OR detection scheme cannot be said unconditionally.

In the example of the braking according to states of plural sensors, illustrated in FIG. 18C, a 0.6G braking is performed at a rate of 0.4, which corresponds to probability $p(D_1 \cap D_2|E)$; a 0.1G braking is performed at a rate of 0.3, which corresponds to probability $p(D_1 \cap \overline{D_2}|E)$; a 0.05G braking is performed at a rate of 0.2, which corresponds to probability $p(\overline{D_1} \cap D_2|E)$; and cruising is performed at a rate of 0.1, which corresponds to probability $p(\overline{D_1} \cap \overline{D_2}|E)$.

A description will be given later of an example of action plan that performs braking according to detection states as HALF-AND detection scheme, with reference to FIG. 29. It should be noted that the utilization of reliabilities (detection probabilities) of plural sensors illustrated in FIGS. 18A to 18C is illustrated merely for the purpose of example and not limitation.

The embodiment utilizes the variations that occur in the detection states of two sensors to construct such a logic of action plan that achieves both the safety and comfort by varying the braking force according to the detection probabilities.

Collision Probability That Occurs in Performing Algorithm a

A description will be given of a collision probability and a discomfort probability that occur in performing algorithm a.

Figure 19:
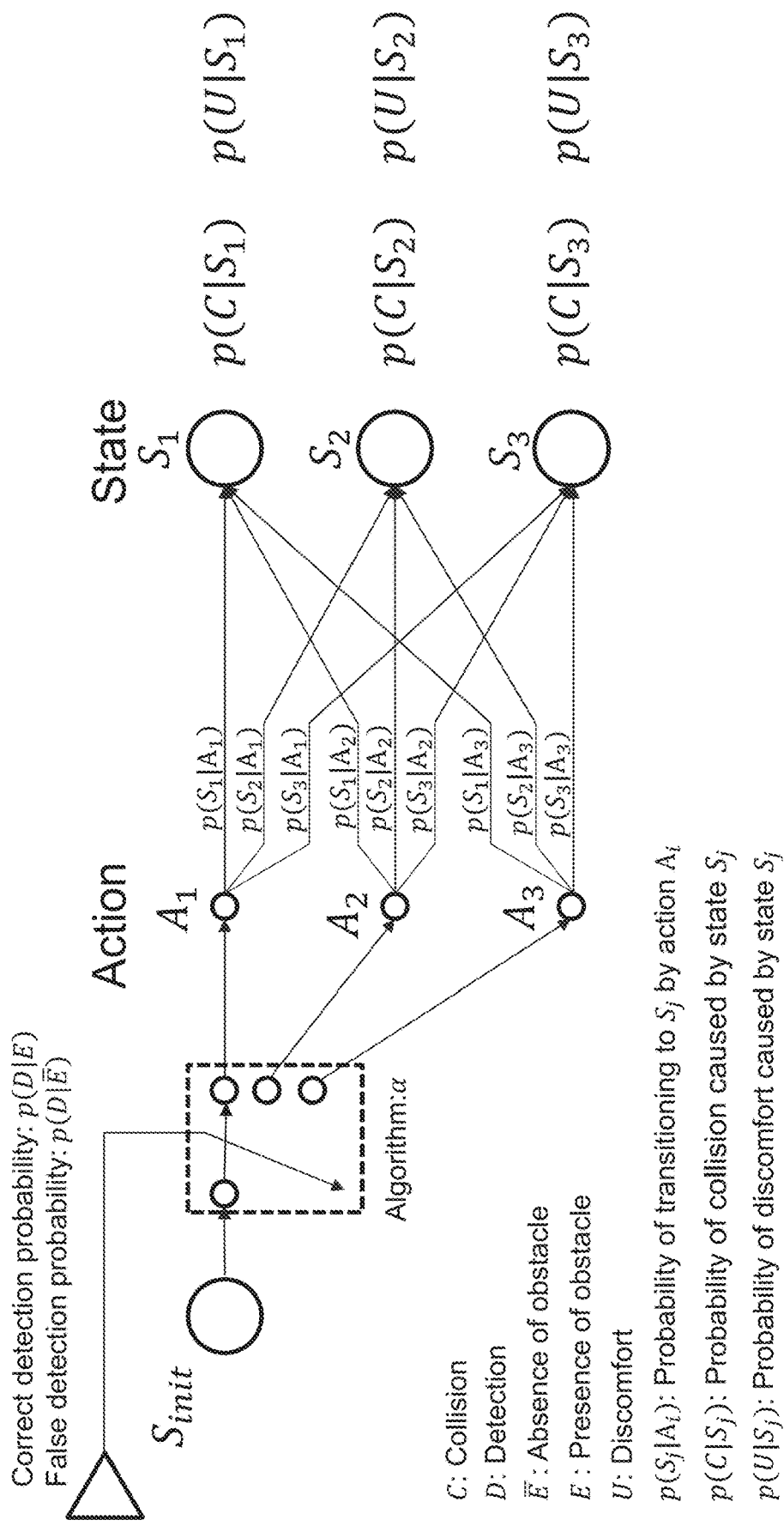
FIG. 19 is a state transition diagram that illustrates changes in the collision probability and discomfort probability that occur in performing algorithm a of the vehicle control device according to the embodiment.

FIG. 19 is a state transition diagram that illustrates changes in the collision probability and discomfort probability that occur in performing algorithm a. The problem to be solved under the model of this transition diagram is to identify an action $A_i$ which gives a total collision probability being a predetermined collision probability $P_c$ according to algorithm a, represented as $a=\{D \rightarrow A_i, \overline{D} \rightarrow A_1\}$ and shown in the dashed frame in FIG. 19. Here, $D \rightarrow A_i$ means that action $A_i$ is adopted when a target object is detected; and $\overline{D} \rightarrow A_1$ means that action $A_1$ is adopted when there is no target object detected.

In FIG. 19 and the formulas given below, $A_i$ denotes an action i, $S_i$ denotes a state i, C denotes a collision, U denotes an event of discomfort, D denotes an event of detecting an obstacle, $\overline{D}$ denotes an event of not detecting of an obstacle; E denotes a state where an obstacle is present; $\overline{E}$ denotes a state where no obstacle is present.

A correct detection probability $p(D|E)$ of the sensors and a false detection probability $p(D|\overline{E})$ of the sensors are inputted to the algorithm a.

A collision probability $p_a(C|E)$ that occurs in performing algorithm a is represented by formula (3); and a collision probability $p(C|A_i)$ that occurs in selecting action $A_i$ is represented by formula (4). The action $A_i$ that results in the collision probability being closest to $P_c$ is represented in formula (5) using the collision probability $p(C|E)$ that occurs in performing algorithm a and the collision probability $p(C|A_i)$ that occurs in selecting action $A_i$. In other words, formula (5) represents algorithm a that identifies action $A_i$ that results in the total collision probability being closest to the predetermined collision probability $P_c$. That is, once the targeted, predetermined collision probability $P_c$ has been determined, measures to be taken in algorithm a are determined.

Collision probability that occurs in performing algorithm a:

$$p_a(C|E)=p(C|A_i)p(D|E)+p(C|A_1)p(\overline{D}|E) \tag{3}$$

Collision probability that occurs in selecting action $A_i$:

$$p(C|A_i) = \sum_k p(S_k|A_i)p(C|S_k) \tag{4}$$

Action that results in the total collision probability being closest to $P_c$:

$$i = \arg\min_k |p(C|A_k)p(D|E) + p(C|A_1)p(\overline{D}|E) - P_c| \tag{5}$$

FIG. 19 illustrates transitions from initial state $S_{init}$ to states $S_1$ to $S_3$ by actions $A_1$ to $A_3$. The probability of the transition from $S_{init}$ to $S_1$ by action $A_1$ is denoted as $p(S_1|A_1)$; by action $A_2$, $p(S_1|A_2)$; and by action $A_3$, $p(S_1|A_3)$. The probability of the transition from $S_{init}$ to $S_2$ by action $A_1$ is denoted as $p(S_2|A_1)$; by action $A_2$, $p(S_2|A_2)$; and by action $A_3$, $p(S_2|A_3)$. The probability of the transition from $S_{init}$ to $S_3$ by action $A_1$ is denoted as $p(S_3|A_1)$; by action $A_2$, $p(S_3|A_2)$; and by action $A_3$, $p(S_3|A_3)$. In other words, states $S_1$ to $S_3$ can be regarded as states to each of which the above-described corresponding transitions from $S_{init}$ are made in response to an event that occurs at a corresponding one of the above-mentioned probabilities.

Once the destination states $S_1$, $S_2$, and $S_3$ are determined, corresponding collision probabilities $p(C|S_1)$, $p(C|S_2)$, and $p(C|S_3)$ and corresponding discomfort probabilities $p(U|S_1)$, $p(U|S_2)$, and $p(U|S_3)$ are determined.

Figure 20:
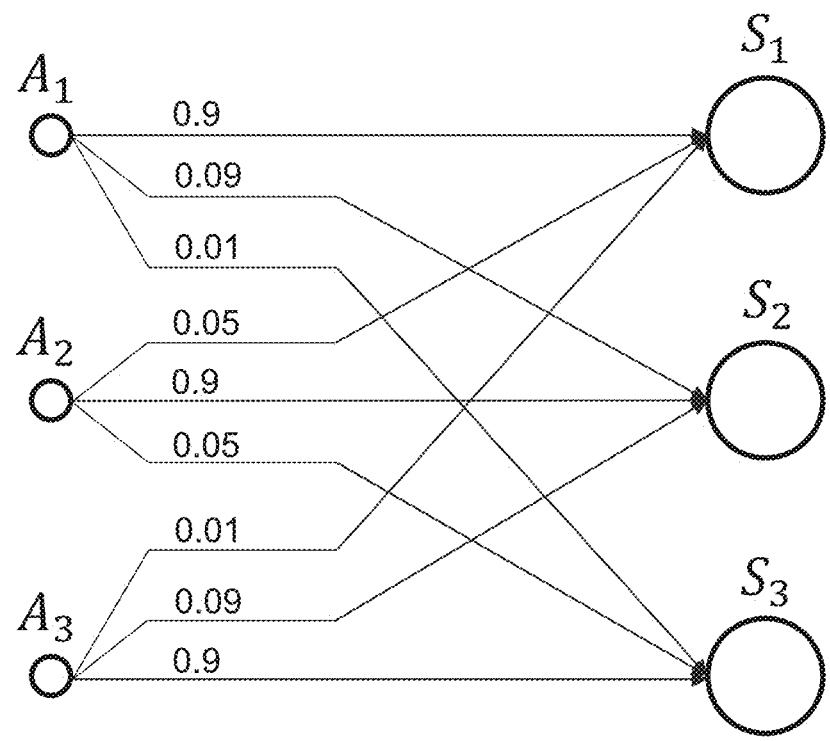
FIG. 20 illustrates an example of the specific values of the state transition probabilities of transitions caused by the actions shown FIG. 19.

FIG. 20 illustrates an example of the specific values of the state transition probability of transitions to S1 to S3 by action A1 to A3 shown in FIG. 19, i.e., $p(S_1|A_1)$, $p(S_2|A_1)$, $p(S_3|A_1)$, $p(S_1|A_2)$, $p(S_2|A_2)$, $p(S_3|A_2)$, $p(S_1|A_3)$, $p(S_2|A_3)$, and $p(S_3|A_3)$.

The collision probability $p_a(C|E)$ that occurs in performing algorithm a is represented by formula (3); and the collision probability $p(C|A_i)$ that occurs in selecting action $A_i$ is represented by formula (4).

The action $A_i$ that results in the collision probability being closest to $P_c$ is represented in formula (5) using the collision probability $p_a(C|E)$ that occurs in performing algorithm a and the collision probability $p(C|A_i)$ that occurs in selecting action $A_i$.

Formula (6) represents the discomfort probability $p(U|A_i)$ that occurs in selecting action $A_i$; and formula (7) represents the discomfort probability $p_a(C|E)$ that occurs in performing algorithm a.

Discomfort probability that occurs in selecting action $A_i$:

$$p(U|A_i) = \sum_k p(S_k|A_i)p(U|S_k) \qquad (6)$$

Discomfort probability that occurs in performing algorithm a:

$$p_a(C|\overline{E}) = p(C|A_i)p(D|\overline{E}) + (C|A_1)p(\overline{D}|\overline{E}) \qquad (7)$$

Formation of Action-Based State Transition Tree

A description will be given of assessment of collision probability that occurs in performing an algorithm in terms of forming an action-based state transition tree in a network.

First, a description will be given of a state transition tree formed based on actions.

FIG. 20 illustrates a specific example of action-based state transitions from a state to states $S_1$ to $S_3$. A state transition tree is formed according to such state transitions to be performed on each state.

Figure 21:
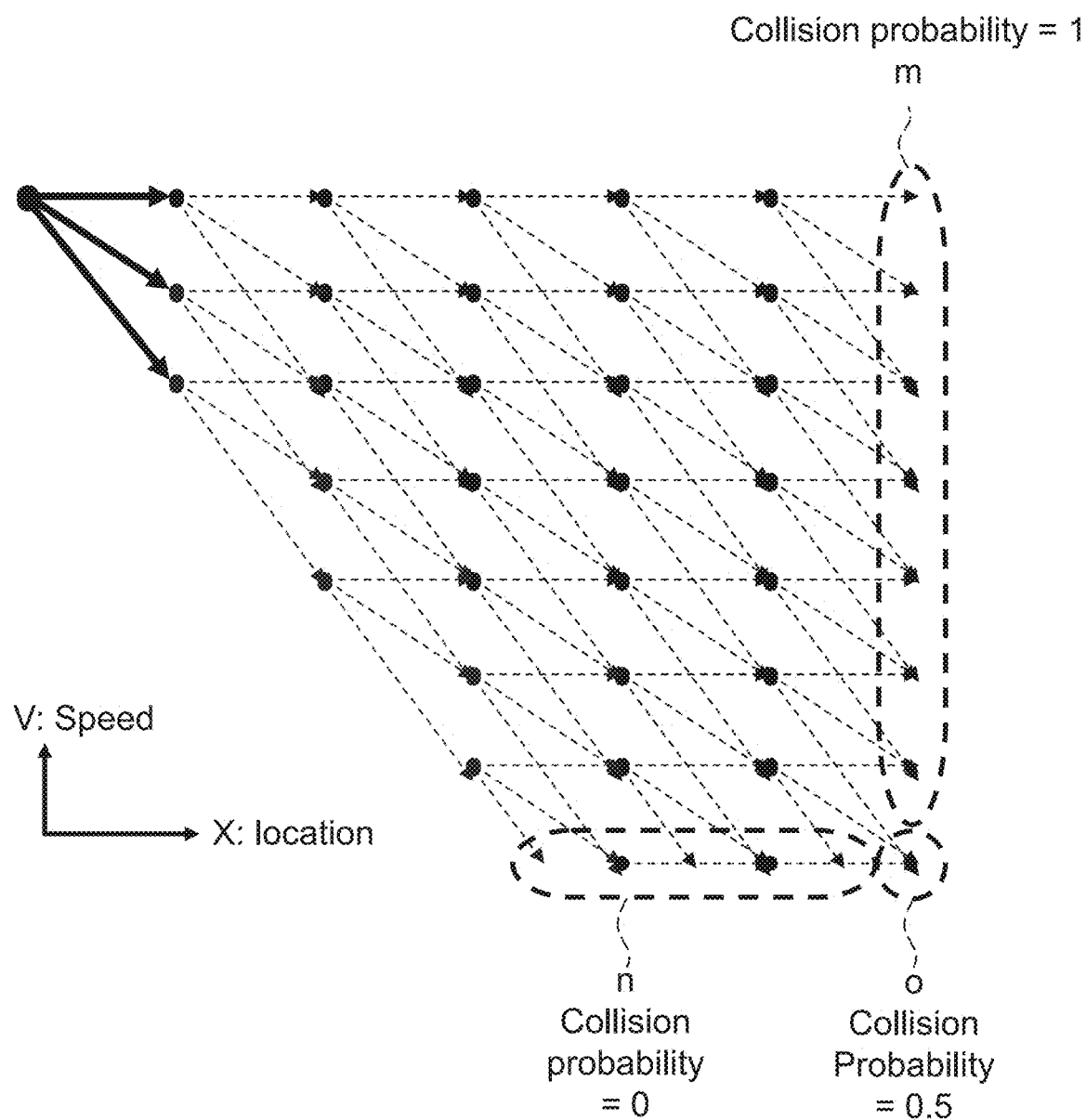
FIG. 21 is an explanatory diagram for explaining a state transition tree which is based on actions made by the vehicle control device according to the embodiment.

FIG. 21 is an explanatory diagram for explaining an action-based state transition tree. In FIG. 21, the horizontal axis X represents the location, and the vertical axis V represents the speed. The state transition tree represents state transitions to states each of which has a collision probability and from each of which transitions are made to other states until the target stop location (collision location) has been reached or the collision has been avoided while deceleration or cruising is performed. Thus, each transition from a state is represented as a right arrow or right-down arrow on the state transition tree.

The bullet marks in FIG. 21 each represent a state. The dotted arrows in FIG. 21 each represent a transition from a state to another state with movement to another location. The dotted arrows extending from a state and reaching other states represent the branching of the state. As each state transition involves movement of the vehicle toward the target stop location (collision location), the distance between the vehicle and the target stop location decreases as the state transitions. Thus, as a result of a state transition, the detection probability (including detection probability of road surface condition) of the sensors increases.

In FIGS. 22A to 22C and 23, the bold arrow mark(s) each represent a state transition of interest and the thin arrow marks each represent a state transition succeeding the state transition indicated by the bold arrow mark.

For example, in the case of FIG. 21, as the states at the right end and enclosed by dashed frame m are each at the location of the target object and each have a non-zero speed, a collision will occur and thus the collision probability of each state is 1. As the states at the bottom end and enclosed by dashed frame n in FIG. 21 each represents a state in which the vehicle has stopped (with a speed of 0) before reaching the collision location and thus has avoided a collision, the collision probability of each state is 0. Although the state at the bottom right corner and enclosed by dashed frame o in FIG. 21 is at the collision location but with a speed of zero, the collision probability of the state is 0.5.

Next, a description will be given of the action-based state transition tree, shown in FIG. 21, in terms of variation in the detection probability.

Figure 22A:
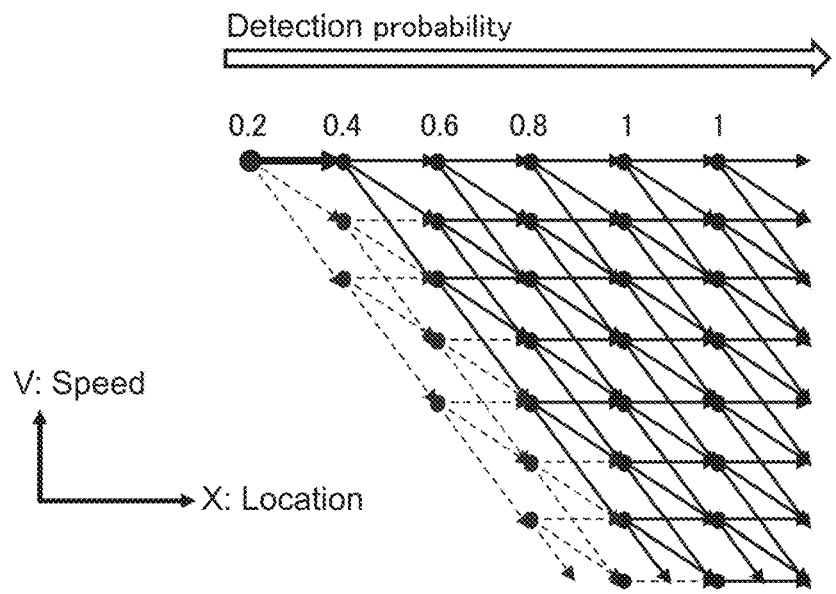
FIGS. 22A, 22B, and 22C are each an explanatory diagram for explaining the action-based state transition tree, shown in FIG. 21, in terms of the variation in the detection probability.
Figure 22B:
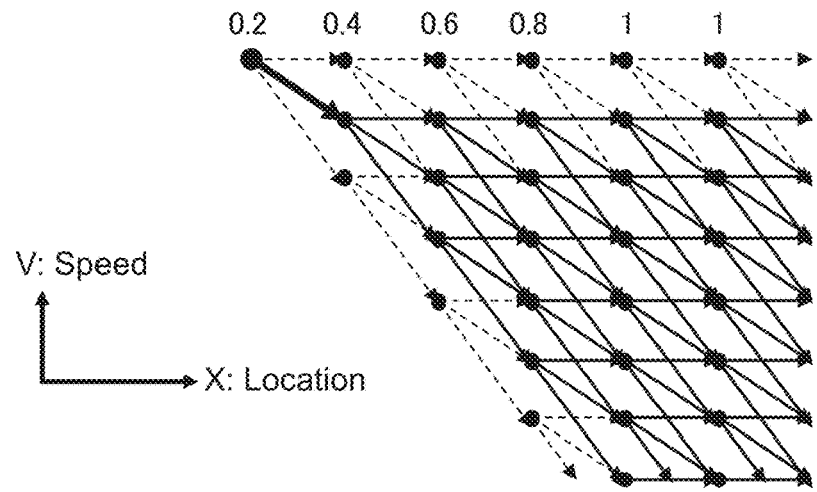
Figure 22C:
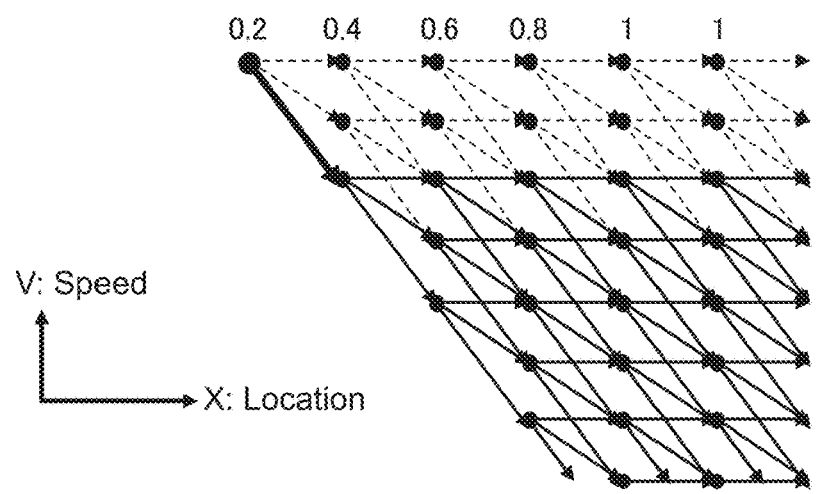

FIGS. 22A, 22B, and 22C are each an explanatory diagram for explaining the action-based state transition tree, shown in FIG. 21, in terms of the variation in the detection probability. The detection probability of the sensors increases by each transition toward the target stop location (collision location). The detection probabilities of the states located in the same column of the state transition tree take the same value. Assume that the detection probabilities of the states take a value of 0.2, 0.4, 0.6, 0.8, 1.0, and 1.0 in order in respective columns located from the left end column.

FIG. 22A illustrates an example in which a state transition is made from the initial state so as not to reduce the speed (toward right in the state transition tree shown in FIG. 21).

FIG. 22B illustrates an example in which a state transition is made from the initial state so as to slightly reduce the speed (toward right and bottom, in an intermediate direction therebetween, in the state transition tree shown in FIG. 21).

FIG. 22C illustrates an example in which a state transition is made from the initial state so as to reduce the speed (toward right and bottom in the state transition tree shown in FIG. 21).

As can be appreciated from a comparison between FIGS. 22A to 22C, although the larger the deceleration, the likelihood of occurrence of a collision decreases, when the deceleration is performed in an earlier timing, the collision probability needs to be calculated in a state with the sensor detection probability being low (reliability being low).

In this way, by creating an action-based state transition tree, it is possible to use the network in the tree to assess the collision probability that is occurs in performing an algorithm.

Next, a description will be given of the relationship of an algorithm and an action-based state transition tree.

FIG. 23 is an explanatory diagram for explaining the relationship of an algorithm and the action-based state transition tree shown in FIG. 21.

The algorithm to be applied to the action-based state transition tree need not necessarily be the same at every subtree thereof. For example, when the sensor detects a vehicle entering into the travel lane of the own vehicle to cut in front of the own vehicle or detects the occurrence of an obstacle or falling object in the middle of performing an algorithm on the action-based state transition tree shown in FIG. 21, the state transition tree indicated in the alternate long and short dash line frame p in FIG. 23 can be introduced disregarding the original action-based state transition tree shown in FIG. 21 to allow maximum braking to decrease the collision damage.

Continuousness of Processing to be Performed on Collision Probability by Algorithm a A description will be given of the continuousness of the processing to be performed on the collision probability by algorithm a.

Figure 24A:
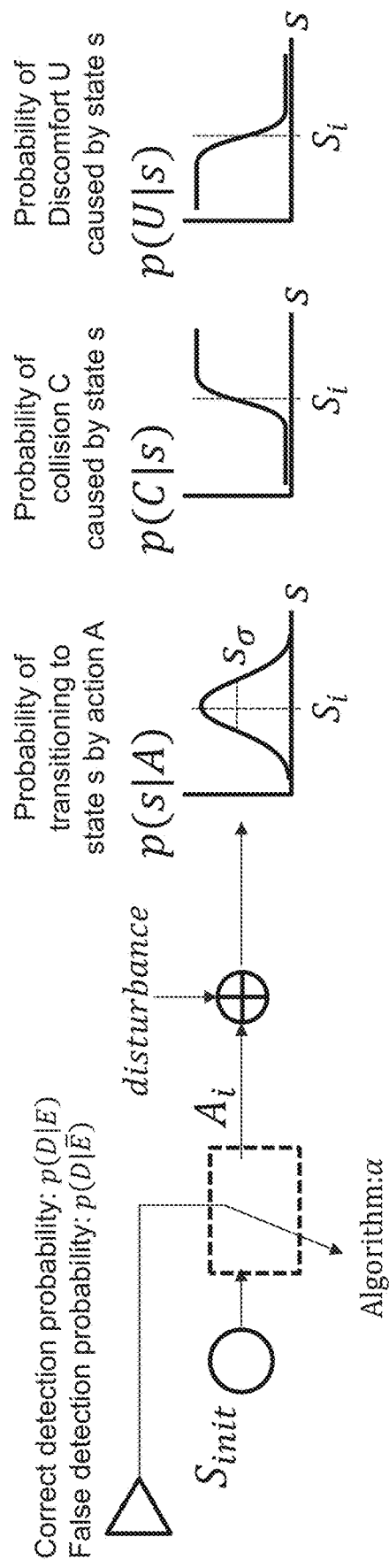
FIGS. 24A and 24B are explanatory diagrams for explaining the continuousness of the processing to be performed on the collision probability by algorithm a of the vehicle control device according to the embodiment.

FIG. 24A is an explanatory diagram for explaining the continuousness of the processing to be performed on the collision probability by algorithm a. FIG. 24A illustrates a model in which although algorithm a selects an action $A_i$ to cause a state transition from state $S_{init}$ to $S_i$, the state does not always transition to state $S_i$ due to disturbance caused by outside factors but rather presents a continuous probability distribution.

In FIG. 24A, the probability $p(s|A)$ of the state transition to state $S_i$ by action $A_i$ has a normal distribution with a standard deviation $s_o$. As a result, the collision probability $p(C|s)$ at state $S_i$ and the discomfort probability $p(U|s)$ at state $S_i$ each have a continuous distribution like shown in FIG. 24A. In this way, by assuming a probabilistic model that assumes disturbance, it is possible to more accurately handle probabilistic events that are actually observed.

Figure 24B:
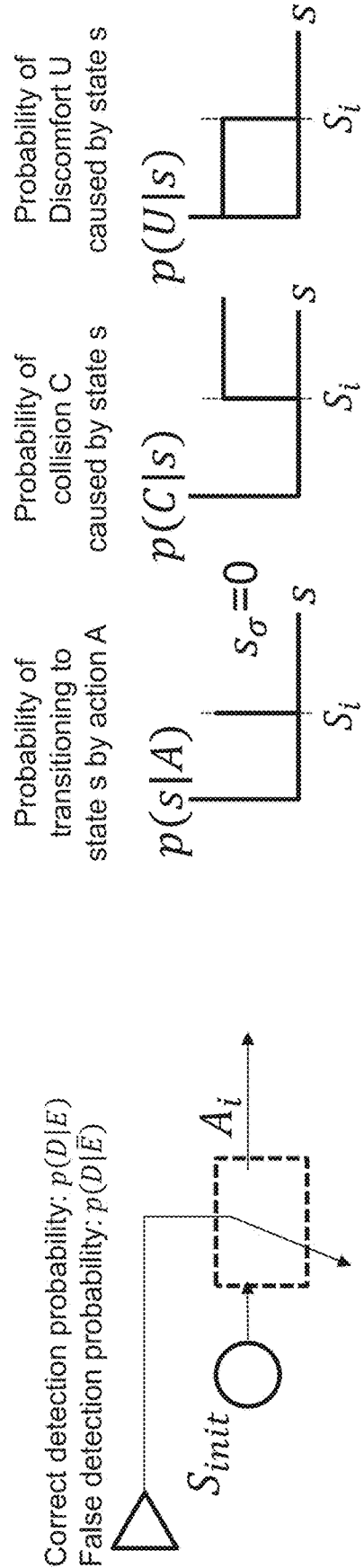

In contrast, FIG. 24B illustrates a model that does not take into account disturbance. In this case, as there is no disturbance, the distribution $p(s|A)$ does not have a spread and is discontinuous. The collision probability $p(C|s)$ and the discomfort probability $p(U|s)$ each have a discontinuous distribution, which makes impossible to handle probabilistic events that are actually observed.

A description will be given of how a probability in the model shown in FIG. 24A can be handled. In FIG. 24A and formulas described below, A ($A_i$) denotes an action; S, a state ($S_{init}$ denotes an initial state); C, a collision; U, a discomfort; D, an event of detecting an obstacle by the distance detection part; $\overline{D}$, an event of non-detecting an obstacle by the distance detection part; E, presence of obstacle; $\overline{E}$, absence of obstacle; $\hat{d}$, detection information (detection/non-detection, detected distance) by the distance detection part. Note that $A_1$ represents a cruising operation.

The algorithm a indicated by the dashed frame in FIG. 24A identifies an action $A_i$ such that the total collision probability that occurs in performing algorithm a={D→$A_i$, $\overline{D}$→$A_1$} is closest to a predetermined collision probability $P_c$. A correct detection probability $p(D|E)$ of the distance detection part, a false detection probability $p(D|\overline{E})$ of the distance detection part, and a detection information $\hat{d}$ detected by the distance detection part are inputted to the algorithm a.

A collision probability $p(C|A)$ denotes the collision probability that occurs in the event of selecting an action $A_{\overline{D}}$ and is given by formula (8). $A_D$ denotes an algorithm adopted when an obstacle is detected and $A_{\overline{D}}$ denotes an algorithm adopted when no obstacle is detected. $A_D$ and $A_{\overline{D}}$ are represented by formula (9). The total collision probability $p(C|E)$ is given by formula (10) with reference to formulas (8) and (9).

Collision probability in selecting an action:

$$p(C|A) = \int p(s|A)p(C|s)ds \quad (8)$$

Algorithm:

$$A_D = a_D(\hat{d}), A_{\overline{D}} = a_{\overline{D}}(\hat{d}) \quad (9)$$

Total collision probability:

$$p(C|E) = p(C|A_D)p(D|E) + p(C|A_{\overline{D}})p(\overline{D}|E) \quad (10)$$

As represented by formula (8), the probability $p(s|A)$, which represents a probability of transition to state s by action A, and the collision probability at state s are each regarded as continuous information; and the collision probability $p(C|A)$ representing a probability of a collision that may occur when action A is selected is represented by an integration of a multiplication of them with respect to state s. The embodiments of the present application handle the collision probability continuously based on the model in which disturbance is added to the action A as described above.

Creation of Action Plan

A description will be given of an action plan that is created by putting together the detection error and detection probability of the sensors.

Figure 25:
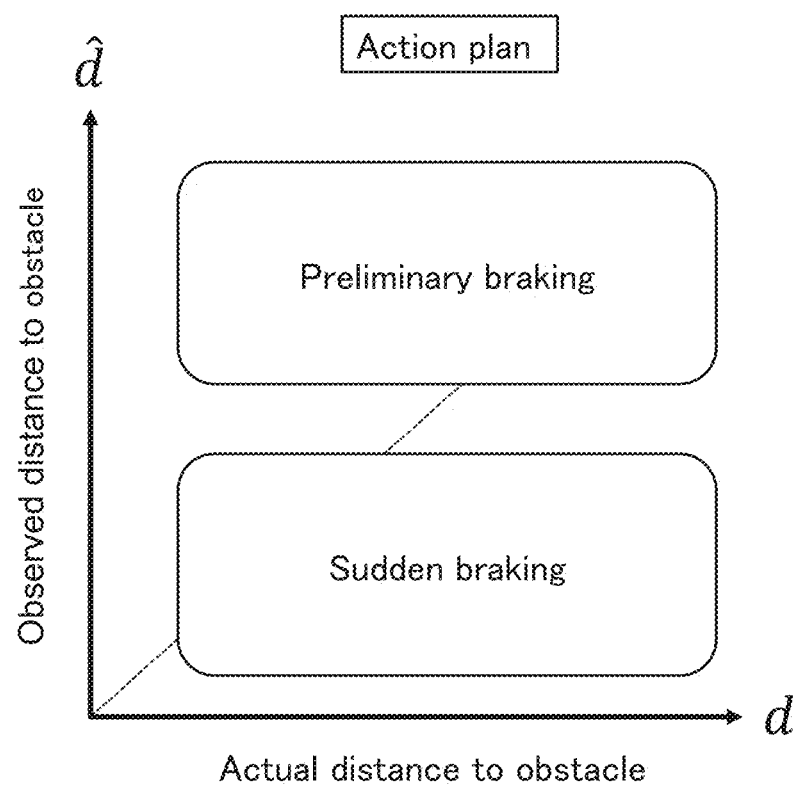
FIG. 25 illustrates a conceptual image of the action plan of the vehicle control device according to the embodiment.

FIG. 25 illustrates a conceptual image of the action plan, in which the horizontal axis represents the distance d to an actual obstacle and the vertical axis represents the observed distance $\hat{d}$ to the obstacle. As shown in FIG. 25, the action plan includes "sudden braking" which is to be performed when the observed obstacle distance $\hat{d}$ is near and "preliminary braking" to be performed when the observed obstacle distance $\hat{d}$ is relatively far.

Figure 26:
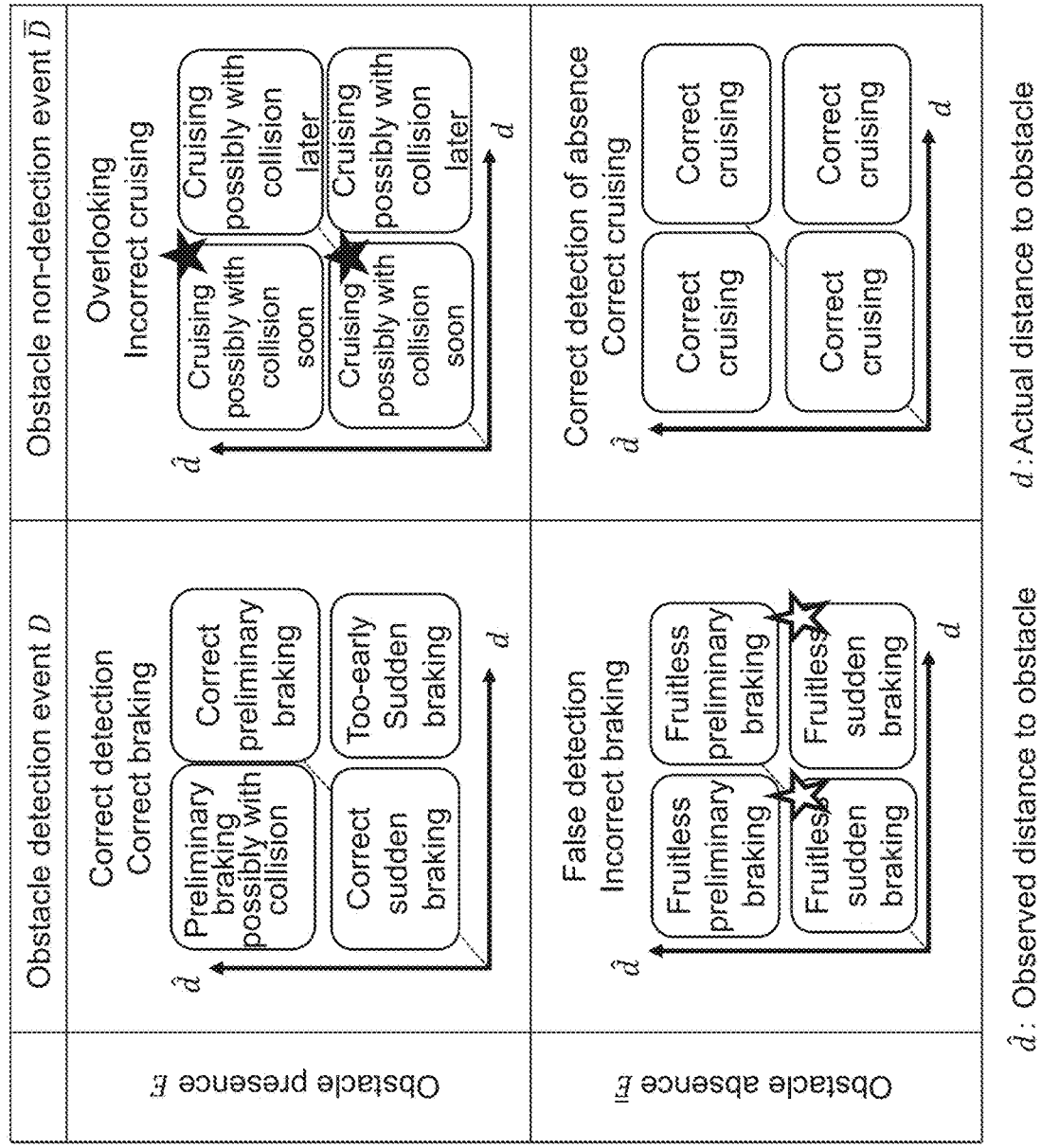
FIG. 26 illustrates a conceptual image of the results of the action plans illustrated in FIG. 25 and cruising operations to be performed in the event of non-detection of an obstacle, in a matrix map in which one axis consists of an obstacle detection event and an obstacle non-detection event and the other axis consists of obstacle presence and obstacle absence.

Action Plan Created Taking into Account the Detection Error and Detection Probability of Sensors FIG. 26 illustrates a conceptual image of the results of the action plans illustrated in FIG. 25 and cruising operations to be performed in the event of non-detection of an obstacle, in a matrix map in which one axis consists of an obstacle detection event D and an obstacle non-detection event $\overline{D}$ and the other axis consists of obstacle presence E and obstacle absence $\overline{E}$. In FIG. 26, the black star marks ★ each indicate a case in which an obstacle at a short distance is overlooked; and the white star marks ☆ each indicate a case in which a non-existent obstacle is falsely detected at a short distance. When an obstacle is detected by a sensor, a braking operation is performed; and otherwise a cruising operation is performed.

A case in which an obstacle detection event D occurs in a state of obstacle presence E This case means "correct detection", and the action plan will perform a sudden braking operation or a preliminary braking operation according to the observed obstacle distance. In a case where the observed obstacle distance $\hat{d}$ is far relative to the actual obstacle distance d, a preliminary braking operation will be performed with a certain likelihood of occurrence of a collision (the risk of collision can be relieved by a later action plan). In a case where the observed obstacle distance $\hat{d}$ is near relative to the actual obstacle distance d, a too-early sudden braking will be performed. In a case where the observed obstacle distance $\hat{d}$ is approximately equal to the actual obstacle distance d, a correct sudden braking operation or a correct preliminary braking operation will be performed in a manner depending on the observed obstacle distance $\hat{d}$.

A case in which an obstacle non-detection event $\hat{D}$ occurs in a state of obstacle presence E In this case, as no obstacle is recognized, the action plan will perform a cruising operation. This means "overlooking" and may possibly result in a collision accident. When the actual obstacle distance d is short, this cruising operation has a possibility of encountering a collision in a short time and will be required to perform a collision avoidance action rapidly. When the actual obstacle distance d is far, this cruising operation has a possibility of encountering a collision in a later time (the risk of collision can be relieved by a later action plan).

A case in which an obstacle detection event D occurs in a state of obstacle absence $\overline{E}$ This means a "false detection". As an obstacle is recognized falsely, the action plan will perform a braking operation. When the observed obstacle distance $\hat{d}$ is short, a fruitless sudden braking operation will be performed. When the observed obstacle distance $\hat{d}$ is far, a fruitless preliminary braking operation will be performed.

A case in which an obstacle non-detection event $\overline{D}$ occurs in a state of obstacle absence $\overline{E}$ This means a "correct detection of absence". In this case, as no obstacle is recognized, the action plan will perform a cruising operation. This is a correct cruising operation.

In the case in which an obstacle non-detection event $\overline{D}$ occurs in a state of obstacle presence E, overlooking an obstacle existing at a short distance (see black star mark ★) decreases the safety. In the case in which an obstacle detection event D occurs in a state of obstacle absence $\overline{E}$, the false detection detecting a non-existent obstacle at a short distance (see white star mark ☆) decreases the comfort and security.

The present embodiment restrains the above-described "overlooking" and "false detection".

AND Detection Scheme

Figure 27:
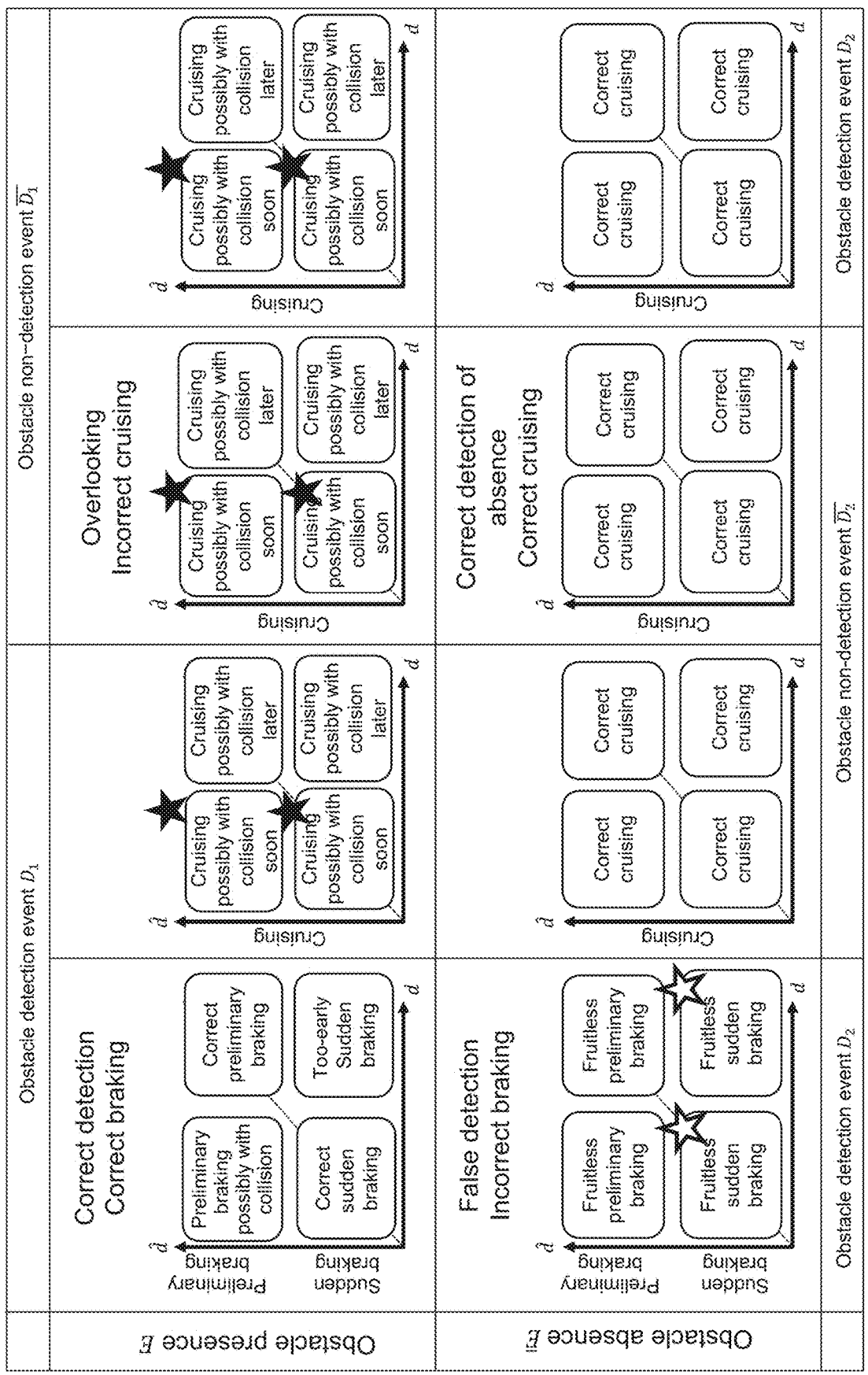
FIG. 27 illustrates a conceptual image of an AND detection scheme of an action plan utilizing the redundancy of two sensors of the vehicle control device according to the embodiment.

FIG. 27 illustrates a conceptual image of AND detection scheme of an action plan utilizing the redundancy of two sensors. FIG. 27 illustrates a conceptual image of results of applying the action plan in FIG. 25 according to AND detection scheme, in a matrix map in which a first dimension includes, as its elements, an obstacle detection event $D_1$ and an obstacle non-detection event $\overline{D_1}$ which are based on one sensor, a second dimension includes, as its elements, an obstacle detection event $D_2$ and an obstacle non-detection event $\overline{D_2}$ which are based on the other sensor, and a third dimension includes, as its elements, obstacle presence E and obstacle absence $\overline{E}$. In the case of AND detection scheme, braking is adopted only when both the sensors detect an obstacle at the same time, i.e. only when both $D_1$ and $D_2$ occur. In other cases, a cruising operation is adopted. In FIG. 27, the black star marks ★ each indicate a case in which an obstacle at a short distance is overlooked; and the white star marks ☆ each indicate a case in which a non-existent obstacle is falsely detected at a short distance.

AND detection scheme represented in FIG. 27 corresponds to the concept of detection with two sensors using the AND logic described above with reference to FIG. 18A.

A case in which an obstacle detection event $D_1$ and an obstacle non-detection event $\overline{D_2}$ are detected in a state of obstacle presence E This means a contradiction between two sensors, one of which fails to detect an existing obstacle. When AND detection scheme is used, even when an obstacle is detected ($D_1$), it is determined that the information from either of the two sensors is inaccurate. In this case, a braking operation could be incorrect and thus may possibly lead to an accident. In view of this, a cruising operation is adopted. When the actual obstacle distance d is short, this cruising operation has a possibility of encountering a collision in a short time and will be required to perform a collision avoidance action rapidly. When the actual obstacle distance d is far, this cruising operation has a possibility of encountering a collision in a later time.

A case in which an obstacle non-detection event $\overline{D_1}$ and an obstacle non-detection event $\overline{D_2}$ are detected in a state of obstacle presence E In this case, a cruising operation is adopted. This is an "oversight/incorrect cruising operation" selected by falsely determining that no obstacle is present. This could lead to a collision accident. When the actual obstacle distance d is short, this cruising operation has a possibility of encountering a collision in a short time and will be required to perform a collision avoidance action rapidly. When the actual obstacle distance d is far, this cruising operation has a possibility of encountering a collision in a later time.

A case in which an obstacle non-detection event $\overline{D_1}$ and an obstacle detection event $D_2$ are detected in a state of obstacle presence E This means contradiction between two sensors, one of which fails to detect an existing obstacle. When AND detection scheme is used, even when an obstacle is detected ($D_2$), it is determined that the information from either of the two sensors is inaccurate. In this case, a braking operation could be incorrect and thus may possibly lead to an accident. In view of this, a cruising operation is adopted. When the actual obstacle distance d is short, this cruising operation has a possibility of encountering a collision in a short time and will be required to perform a collision avoidance action rapidly. When the actual obstacle distance d is far, this cruising operation has a possibility of encountering a collision in a later time.

A case in which an obstacle detection event $D_1$ and an obstacle detection event $D_2$ are detected in a state of obstacle absence $\overline{E}$ In this case, a braking operation is adopted. This case means that an incorrect braking operation is performed as a result of the false detection. When the observed obstacle distance $\hat{d}$ is short, a fruitless sudden braking operation will be performed. When the observed obstacle distance $\hat{d}$ is far, a fruitless preliminary braking operation will be performed.

In this way, when AND detection scheme is used, a cruising operation is adopted in the cases other than the case when an obstacle detection event $D_1$ and an obstacle detection event $D_2$ occur. In a state of obstacle presence E, that cruising operation is possibly involved in a collision. In a state of obstacle absence $\overline{E}$, that cruising operation, adopted in the cases other than the case when an obstacle detection event $D_1$ and an obstacle detection event $D_2$ occur, is a correct cruising operation.

OR Detection Scheme

Figure 28:
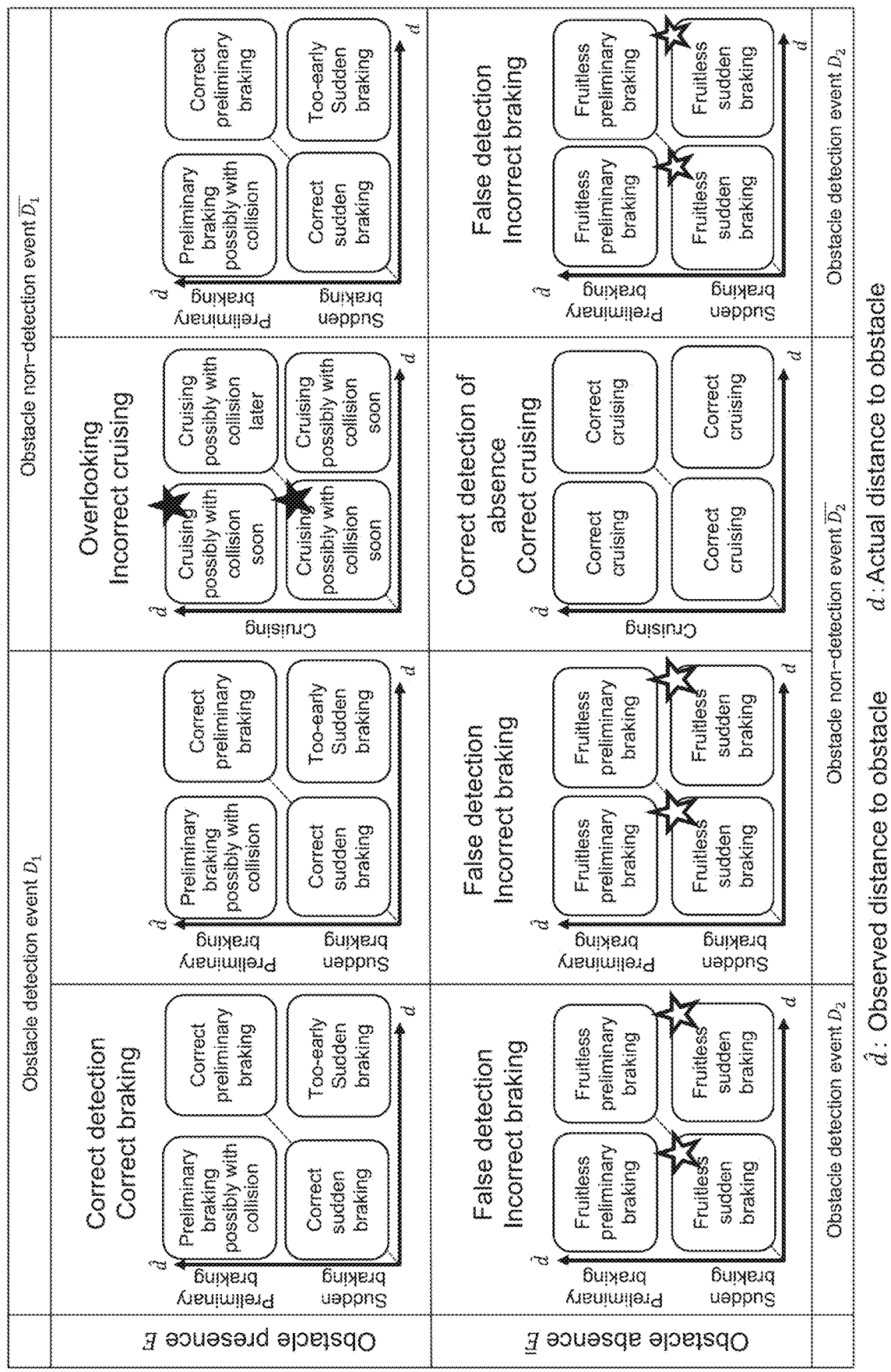
FIG. 28 illustrates a conceptual image of an OR detection scheme of an action plan utilizing the redundancy of two sensors of the vehicle control device according to the embodiment.

FIG. 28 illustrates a conceptual image of OR detection scheme of an action plan utilizing the redundancy of two sensors. FIG. 28 illustrates a conceptual image of results of applying the action plan in FIG. 25 according to OR detection scheme, in a matrix map in which a first dimension includes, as its elements, an obstacle detection event $D_1$ and an obstacle non-detection event $\overline{D_1}$ which are based on one sensor, a second dimension includes, as its elements, an obstacle detection event $D_2$ and an obstacle non-detection event $\overline{D_2}$ which are based on the other sensor, and a third dimension includes, as its elements, obstacle presence E and obstacle absence $\overline{E}$. In the case of OR detection scheme, braking is adopted when either or both the sensors detect an obstacle, i.e. when either or both $D_1$ and $D_2$ occur. In the other case, a cruising operation is adopted. In FIG. 28, the black star marks ★ each indicate a case in which an obstacle at a short distance is overlooked; and the white star marks ☆ each indicate a case in which a non-existent obstacle is falsely detected at a short distance.

OR detection scheme represented in FIG. 28 corresponds to the concept of detection with two sensors according to the OR logic described with reference to FIG. 18B.

A case in which an obstacle non-detection event $\overline{D_1}$ and an obstacle non-detection event $\overline{D_2}$ occur in a state of obstacle presence E In this case, a cruising operation is adopted. This is an "oversight/incorrect cruising operation" selected by falsely determining that no obstacle exists. This could lead to a collision accident. When the actual obstacle distance d is short, this cruising operation has a possibility of encountering a collision in a short time and will be required to perform a collision avoidance action rapidly. When the actual obstacle distance d is far, this cruising operation has a possibility of encountering a collision in a later time.

A case in which an obstacle detection event $D_1$ and an obstacle detection event $D_2$ occur in a state of obstacle absence $\overline{E}$ In this case, a braking operation is adopted. This case means that an incorrect braking operation is performed as a result of the false detection. When the observed obstacle distance $\hat{d}$ is short, a fruitless sudden braking operation will be performed. When the observed obstacle distance $\hat{d}$ is far, a fruitless preliminary braking operation will be performed.

A case in which an obstacle detection event $D_1$ and an obstacle non-detection event $\overline{D_2}$ occur in a state of obstacle absence $\overline{E}$ In this case, a braking operation is adopted. When the observed obstacle distance $\hat{d}$ is short, a fruitless sudden braking operation will be performed. When the observed obstacle distance $\hat{d}$ is far, a fruitless preliminary braking operation will be performed.

A case in which an obstacle non-detection event $\overline{D_1}$ and an obstacle detection event $D_2$ occur in a state of obstacle absence $\overline{E}$ In this case, a braking operation is adopted. When the observed obstacle distance $\hat{d}$ is short, a fruitless sudden braking operation will be performed. When the observed obstacle distance $\hat{d}$ is far, a fruitless preliminary braking operation will be performed.

According to OR detection scheme, a cruising operation is adopted only when an obstacle non-detection event $\overline{D_1}$ and an obstacle non-detection event $\overline{D_2}$ occur at the same time. In a state of obstacle presence E, that cruising operation will be an oversight/incorrect cruising operation; and in a state of obstacle absence $\overline{E}$, that cruising operation will be a correct cruising operation.

Comparing AND detection scheme (see FIG. 27) and OR detection scheme (see FIG. 28), AND detection scheme places emphasis on the sensor detection state and regards sensor malfunctions as factors that lead to the likelihood of the occurrence of a collision. This makes it possible to avoid overlooking the failure of sensors and thereby being late to determine the likelihood of the occurrence of a collision. Therefore, it is expected that the reliability be increased. According to AND detection scheme, when a contradiction between sensors occurs due to a sensor failure, a cruising operation is selected. In a state of obstacle absence $\overline{E}$, this leads to comfort. However, in a state of obstacle presence E, this may possibly lead to a compromise in safety.

According to OR detection scheme, when a contradiction between sensors occurs due to a sensor failure, a braking operation is selected. In a state of obstacle absence $\overline{E}$, this leads to a compromise in comfort. However, in a state of obstacle presence E, this leads to safety.

HALF-AND Detection Scheme

Figure 29:
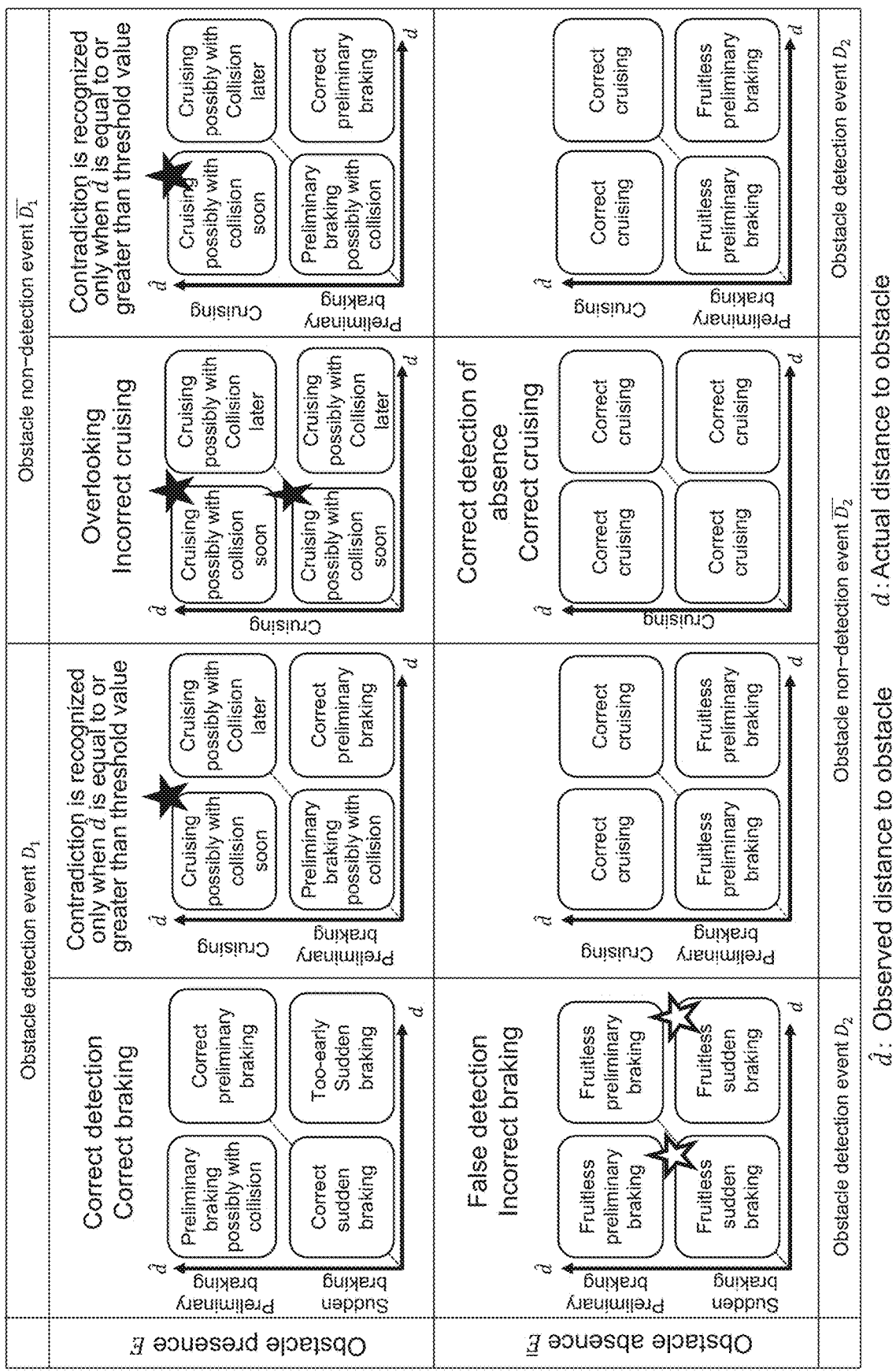
FIG. 29 illustrates a conceptual image of HALF-AND detection scheme of an action plan utilizing the redundancy of two sensors of the vehicle control device according to the embodiment.

FIG. 29 illustrates a conceptual image of HALF-AND detection scheme of an action plan utilizing the redundancy of two sensors. The same elements of AND detection scheme shown in FIG. 27 are given the same reference numerals and duplicated descriptions are omitted.

HALF-AND detection scheme represented in FIG. 29 corresponds to the concept of braking operation according to the detection states of two sensors, which has been described with reference to FIG. 18C.

In the case of AND detection scheme illustrated in FIG. 27, a contradiction between sensors is acknowledged in a case where an obstacle detection event $D_1$ and an obstacle non-detection event $\overline{D_2}$ occur and in a case where an obstacle non-detection event $\overline{D_1}$ and an obstacle detection event D2 occur. In the case of HALF-AND detection scheme illustrated in FIG. 29, a contradiction between sensors is acknowledged only when the above-described condition holds and the value of the obstacle distance a is equal to or greater than a predetermined threshold value.

As illustrated in FIG. 29, with HALF-AND detection scheme, when an obstacle detection event $D_1$ and an obstacle non-detection event $D_2$ occur or when an obstacle non-detection event $\overline{D_1}$ and an obstacle detection event $\overline{D_2}$ occur, and when the observed obstacle distance a is equal to or greater than the threshold value, a contradiction between the sensors is recognized and it is determined that no obstacle is present and thus a cruising operation is adopted. The results of adopting the cruising operation is the same as those of AND detection scheme. That is, in a state of obstacle presence E, when the actual obstacle distance d is short, the cruising operation has a possibility of encountering a collision in a short time, and when the actual obstacle distance d is far, the cruising operation has a possibility of encountering a collision in a later time. In a state of obstacle absence $\overline{E}$, the cruising operation will be a correct cruising operation.

As illustrated in FIG. 29, with HALF-AND detection scheme, when an obstacle detection event $D_1$ and an obstacle non-detection event $\overline{D_2}$ occur or when an obstacle non-detection event $\overline{D_1}$ and an obstacle detection event $D_2$ occur, and when the observed obstacle distance a is less than the threshold value, it is determined that an obstacle is present, and a preliminary braking operation is adopted. In a state of obstacle presence E, when the actual obstacle distance d is short, the preliminary braking operation has a possibility of encountering a collision in a short time, and when the actual obstacle distance d is far, the preliminary braking operation will be a correct preliminary braking operation. In a state of obstacle absence $\overline{E}$, the preliminary braking operation will be a fruitless preliminary braking operation.

As described, with HALF-AND detection scheme, when an obstacle detection event $D_1$ and an obstacle non-detection event $\overline{D_2}$ occur or when an obstacle non-detection event $\overline{D_1}$ and an obstacle detection event $\overline{D_2}$ occur, either the preliminary braking operation or the cruising operation is adopted in a manner depending on whether the observed obstacle distance $\hat{d}$ is less than the predetermined threshold value. With this, when a contradiction between sensors occurs due to a sensor failure, this leads to comfort in a state of obstacle absence $\overline{E}$ when the observed obstacle distance $\hat{d}$ is equal to or greater than the predetermined threshold value and leads to safety in a state of obstacle presence E when the observed obstacle distance $\hat{d}$ is less than the predetermined threshold value.

In the case of OR detection scheme illustrated in FIG. 28, in the state of obstacle absence $\overline{E}$, when an obstacle detection event $D_1$ and an obstacle non-detection event $\overline{D_2}$ occur and when an obstacle non-detection event $\overline{D_1}$ and an obstacle detection event $D_2$ occur, a "sudden braking" or "preliminary braking" is adopted in a manner depending on the observed obstacle distance a. This leads to a "fruitless sudden braking" or "fruitless preliminary braking". In the same situation in HALF-AND detection scheme, a "preliminary braking" or "cruising" is adopted in a manner depending on the observed obstacle distance a. This leads to a "fruitless preliminary braking" or "correct cruising". Therefore, compared to OR detection scheme, HALF-AND detection scheme is effective in decreasing the occurrences of fruitless sudden braking and fruitless preliminary braking not to impair the comfort as much as possible.

In the case of AND detection scheme shown in FIG. 27, the number of black star marks ★ each indicating a case in which an obstacle at a short distance is overlooked is 6, and the number of white star marks ☆ each indicating a case in which a non-existent obstacle is falsely detected at a short distance is 2, resulting in 8 star marks in total. In the case of OR detection scheme shown in FIG. 28, the number of black star marks ★ is 2, and the number of white star marks ☆ is 6, resulting in 8 star marks in total, again. In the case of HALF-AND detection scheme shown in FIG. 29, the number of black star marks ★ is 4, and the number of white star marks ☆ is 2, resulting in 6 star marks in total.

From this results, HALF-AND detection scheme is considered as being superior in comfort compared to AND detection scheme and is considered as being superior in comfort but inferior in safety compared to OR detection scheme. However, comparing them in a general viewpoint, i.e., by comparing them with the total number of black star marks ★ and white star marks ☆, HALF-AND detection scheme is considered as providing an improved result compared to AND detection scheme and OR detection scheme.

Descriptions have been given of the action plans using AND detection scheme, OR detection scheme, and HALF-AND detection scheme. Hereinafter, a method for obtaining collision probabilities of states while traveling will be described in detail.

Event Occurrence Probability

Next, a description will be given of a method for obtaining event occurrence probability. When the event of interest is a collision, the event occurrence probability corresponds to a collision probability. The event occurrence probability is a generalized concept of collision probability.

Figure 30:
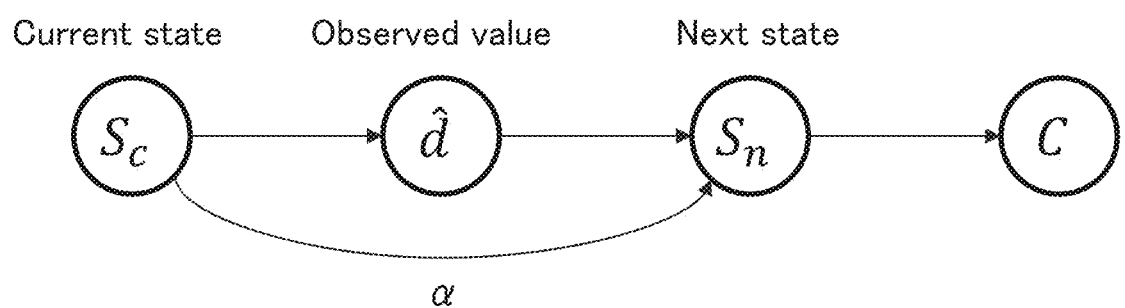
FIG. 30 illustrates a conceptual state transition diagram the vehicle control device according to the embodiment, which state transition diagram illustrates the occurrence of a collision.

FIG. 30 illustrates a conceptual state transition diagram illustrating the occurrence of a collision. In FIG. 30, Sc represents a current state; $\hat{d}$, an observed value; a, an action; $S_n$, a next state; and C, an event (collision). The state transition diagram shown in FIG. 30 illustrates that a current state $S_c$ transitions to a next state $S_n$ when an action a (deceleration) is performed in response to an observed value $\hat{d}$, and at the next state $S_n$, a collision has occurred. According to this state transition model, a probability $p(C|S_c)$, representing the probability of the occurrence of a collision in the state transition from state $S_c$, can be represented as formula (11).

$$p(C|S_c) = \iint p(C|S_n) p(S_n|S_c, a(\hat{d})) p(\hat{d}|S_c) d\hat{d} dS_n \quad (11)$$

In formula (11), a denotes an action, $S_c$ denotes a current state, $S_n$ denotes a next state, C denotes an event (collision), $\hat{d}$ denotes an observed value, $a(\hat{d})$ represents an action to be performed in response to the detection of the observed value $\hat{d}$, $p(C|S)$ represents a probability of occurrence of an event (collision) at state S, $p(S_n|S_n, a(\hat{d}))$ represents a probability of a state transition from state $S_c$ to state $S_n$ being caused by the action $a(\hat{d})$, which is performed in response to the observation of $\hat{d}$, and $p(\hat{d}|S_c)$ represents a probability of $\hat{d}$ being observed at state $S_c$.

Method for Obtaining Collision Probability

FIGS. 31A to 31D are explanatory diagrams for explaining a method for obtaining collision probability under the condition that the actual location of an obstacle is known. FIG. 31A illustrates a trace of the location and speed of a vehicle attempting to decelerate from the current location and speed to stop at a target stop location located before an obstacle, on a two-dimensional graph whose horizontal axis represents the location and whose vertical axis represents the speed. FIG. 31A corresponds to FIG. 10A. FIG. 31B illustrates a collision probability distribution when speed is 0 in a graph whose horizontal axis represents the location and whose vertical axis represents the collision probability. FIG. 31C illustrates an error distribution of detecting a target object by the distance detection part (detection device DD, vehicle sensor 60, and autonomous driving control part 120), in a graph whose horizontal axis represents the location and whose vertical axis represents the error frequency. FIG. 31D represents a probability of detecting a target object by the distance detection part (detection device DD, vehicle sensor 60, and autonomous driving control part 120), in a graph whose horizontal axis represents the location and whose vertical axis represents the detection probability. In FIGS. 31A to 31D, $p(\varepsilon_a)$ represents a probability of uncertainty $\varepsilon_a$ of the action plan; $\hat{d}_1$ represents whether an obstacle is detected or not ($\hat{d}_1$ takes a value of 1 when an obstacle is detected; or 0 when no obstacle is detected); $\hat{d}_2$ represents an observed distance to an obstacle; $x_c$ represents the current location; $x_o$ represents the actual location of the obstacle; $v_c$ represents the speed at the current location $x_c$; $d_M$ represents a marginal distance set between the location at the observed obstacle distance $\hat{d}_2$ and a target location at which the vehicle is to be controlled to stop.

Figure 31:
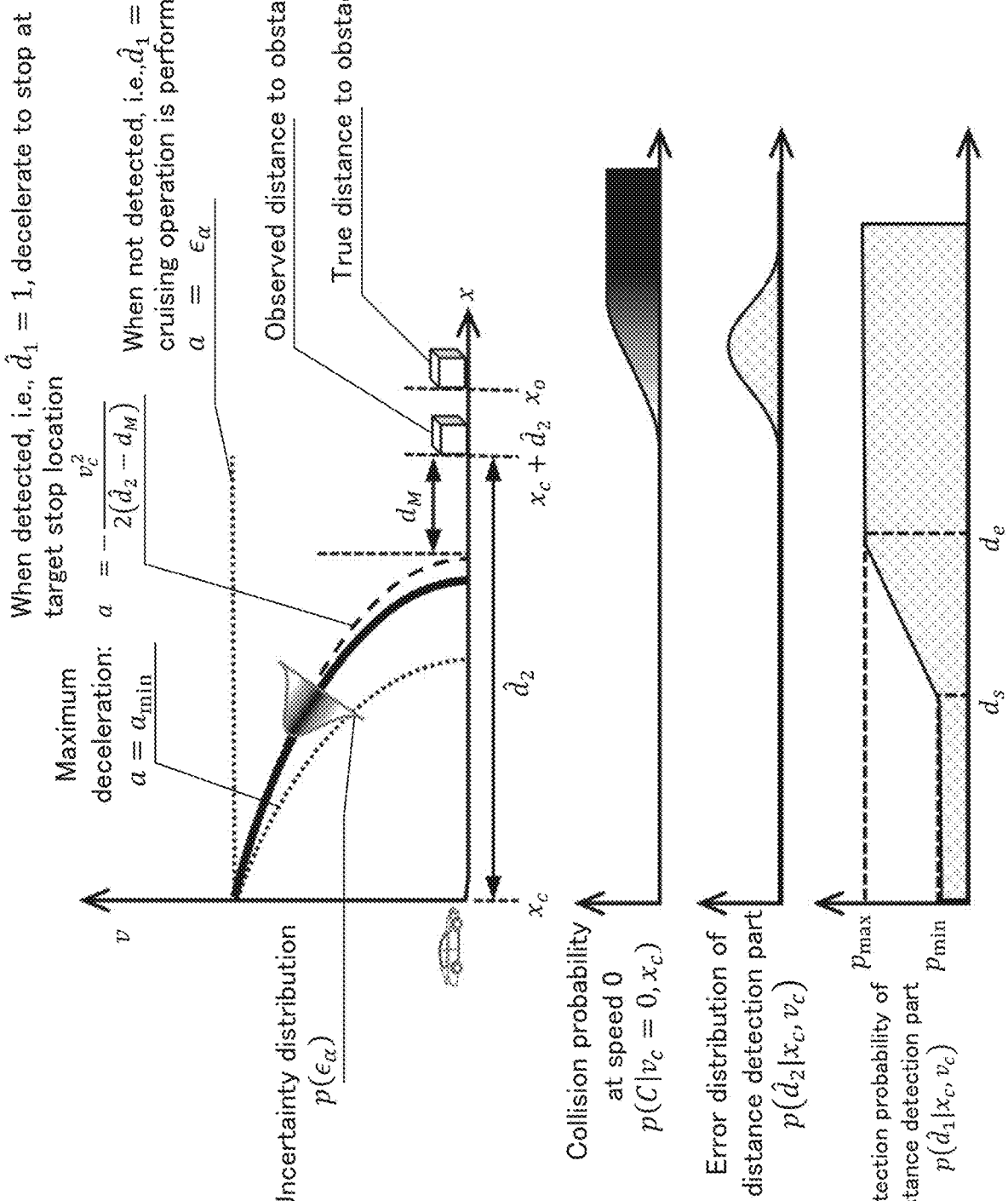
FIGS. 31A to 31D are explanatory diagrams for explaining a method for obtaining collision probability, which method is to be used in the vehicle control device according to the embodiment.
Figure 32:
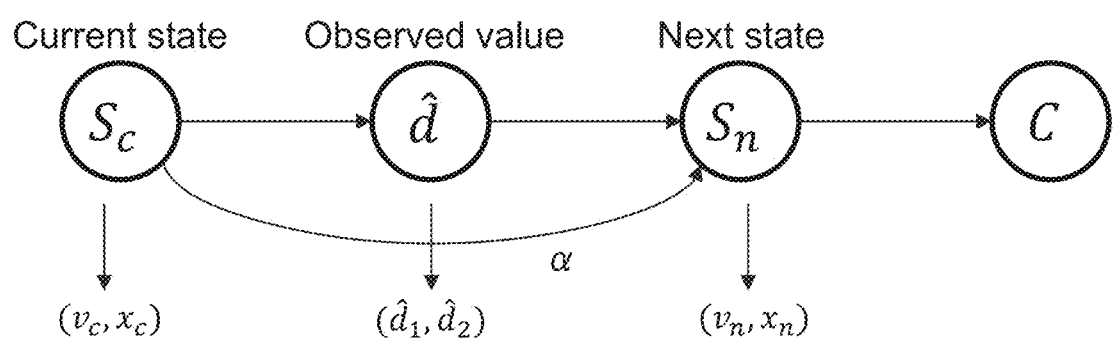
FIG. 32 illustrates a conceptual state transition diagram illustrating the occurrence of a collision illustrated in FIG. 31A.

FIG. 32 illustrates a conceptual state transition diagram illustrating the occurrence of a collision illustrated in FIG. 31. In FIG. 32, $S_c$ represents a current state; $\hat{d}$, an observed value; a, an action (deceleration); $S_n$, a next state; and C, an event (collision). From FIG. 31A, the current state $S_c$ is defined with the current speed $v_c$ and the current location $x_c$ and denoted as $(v_c, x_c)$. The observed value $\hat{d}$ is defined with $\hat{d}_1 = \{1,0\}$, which represents whether a target object is detected, and $\hat{d}_2 = x_0 - x_c$, which represents the distance to the target object, and is denoted as $(\hat{d}_1, \hat{d}_2)$. The next state $S_n$ is defined with the speed $v_n$ and the location $x_n$ of the next state and denoted as $(v_n, x_n)$.

The trace of location and speed (solid bold line) shown in FIG. 31A has an uncertainty probability distribution $p(\varepsilon_a)$, where $\varepsilon_a$ means uncertainty of the next state transition by the action plan. The current state $S_c$ is defined by the current speed $v_c$ and current location $x_c$ and is denoted as $(v_c, x_c)$. The observed value $\hat{d}$ is denoted as $\{\hat{d}_1, \hat{d}_2\}$, where $\hat{d}_1$ takes a value of 0 when no target object is detected and a value of 1 when a target object is detected, and $\hat{d}_2$ an observed distance to the target object, i.e., $\hat{d}_2 = x_0 - x_c$. $d_M$ represents the marginal distance for stopping. Formula (12) gives the algorithm (deceleration) a of the vehicle attempting to stop at the target stop location $\hat{d}_2 - d_M$ from the current state $S_c = (v_c, x_c)$. The speed $v_n$ and location $x_n$, representing the next state $S_n$, are determined according to formulas (13) and (14). In formulas (13) and (14), $\Delta T$ represents a time difference from the current state $S_c$ to the next state $S_n$. The next state $S_n$ is a state which is predicted to be reached when the vehicle is decelerated with deceleration a for a time period $\Delta T$ from the current state $S_c$.

$$a = \begin{cases} \varepsilon_a & \ldots \hat{d}_1 = 0 \\ \max\left(a_{min}, -\dfrac{v_c^2}{2(\hat{d}_2 - d_M)} + \varepsilon_a\right) & \ldots \hat{d}_1 = 1 \end{cases} \quad (12)$$

$$v_n = v_c + a(\varepsilon_a, \hat{d}_1, \hat{d}_2)\Delta T \quad (13)$$

$$x_n = x_c + v_n \Delta T + \frac{1}{2} a(\varepsilon_a, \hat{d}_1, \hat{d}_2)\Delta T^2 \quad (14)$$

The collision probability at a state where the speed is $v_c = 0$ and the location is at $x_c$, denoted as $p(C|v_c=0, x_c)$ and shown in FIG. 31B, is a cumulative distribution of a normal distribution. This is represented in formula (15) presented below, in which the standard deviation of the normal distribution is denoted by $\sigma_d$.

The error distribution of detecting a target object by the distance detection part (detection device DD, vehicle sensor 60, and autonomous driving control part 120), shown in FIG. 31C, is denoted as $p(\hat{d}_2|x_c, v_c)$. This means a distribution of the observed detected distance $\hat{d}_2$ that would be observed at the current state located at $x_c$. The distribution depends on $x_c$.

The probability of detecting a target object by the distance detection part (detection device DD, vehicle sensor 60, and autonomous driving control part 120), shown in FIG. 31D, is denoted as $p(\hat{d}_1=1|x_c,v_c)$. The detection probability varies as a function of the distance to the target object.

$p(C|v_c=0,x_c)$, which represents the probability of a collision with $v_c=0$, is represented by formula (15), where $\sigma_d$ denotes the standard deviation of the normal distribution described above and erf denotes the Gaussian error function. The uncertainty probability $p(\varepsilon_a)$ of the algorithm (deceleration) a has a normal distribution and can be represented by formula (16). In other words, $p(\varepsilon_a)$ represents a probability of uncertainty $\varepsilon_a$, which represents a difference between the deceleration actually performed by the vehicle and deceleration a requested by an instruction. In formula (16), aa is the standard deviation of the normal distribution that represents the uncertainty. Probability (error distribution) $p(\hat{d}_2|x_c,v_c)$ representing the probability of the distance detection part (detection device DD, vehicle sensor 60, and autonomous driving control part 120) located at state $(x_c,v_c)$ and detecting a target object at location $\hat{d}_2$ is represented by formula (17). Probability $p(\hat{d}_1=1|x_c,v_c)$ representing the probability of the distance detection part (detection device DD, vehicle sensor 60, and autonomous driving control part 120) located at state $(x_c,v_c)$ and detecting the target object is represented by formula (18). In formula (18), $P_{max}$ and $P_{min}$ respectively denote maximum and minimum detection probabilities of the distance detection part (detection device DD, vehicle sensor 60, and autonomous driving control part 120) detecting a target object. In formula (18), $d_s$ and $d_c$ are parameters representing locations depending on a characteristic of the detection by the distance detection part (detection device DD, vehicle sensor 60, and autonomous driving control part 120) detecting a target object. The parameters define locations between which the probability of detecting a target object by the distance detection part varies from $P_{min}$ to $P_{max}$ (see FIG. 31D).

$$p(C|v_c = 0, x_c) = \frac{1}{2}\left[1 + \mathrm{erf}\left(\frac{x_0 - x_c}{\sqrt{2}\,\sigma_d}\right)\right] \tag{15}$$

$$p(\varepsilon_a) = \frac{1}{\sqrt{2\pi}\,\sigma_\alpha}\exp\left\{-\frac{\epsilon_\alpha^2}{2\pi\sigma_\sigma^2}\right\} \tag{16}$$

$$p(\hat{d}_2|x_c, v_c) = \frac{1}{\sqrt{2\pi}\,\sigma_d}\exp\left\{-\frac{(\hat{d}_2 - (x_o - x_c))^2}{2\pi\sigma_d^2}\right\} \tag{17}$$

$$p(\hat{d}_1 = 1|v_c, x_c) = f(x_c) = \max(\min(a_c x_c + b_c, p_{max}), p_{min}) \tag{18}$$

$$a_c = \frac{p_{max} - p_{min}}{d_s - d_e} \quad b_c = p_{max} - a_c(x_c - d_e)$$

Calculation of Collision Probability p(C|S)

Next, a description will be given of how the collision probability p(C|S) at each state (location, speed) is to be calculated.

Figure 33:
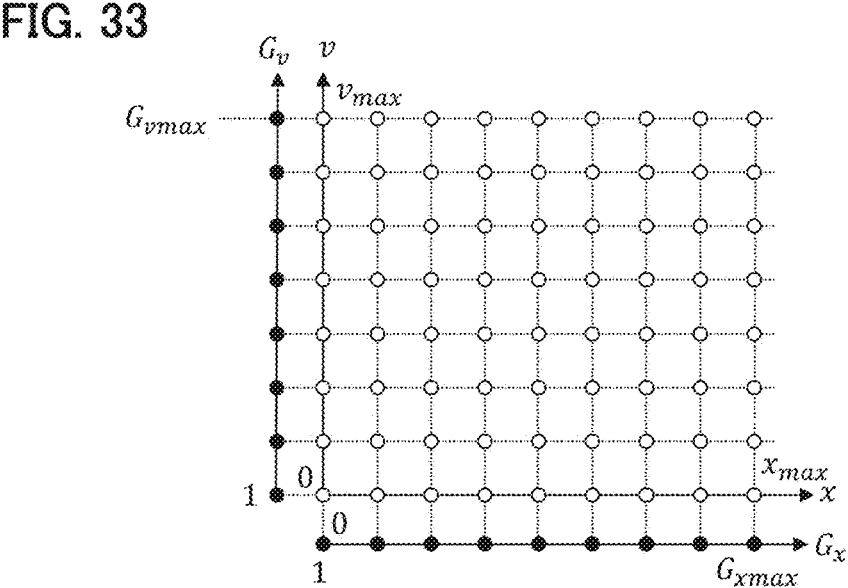
FIG. 33 illustrates grid points representing a two-dimensional space of location and speed in which the collision probability map of the vehicle control device according to the embodiment is represented.
Figure 34:
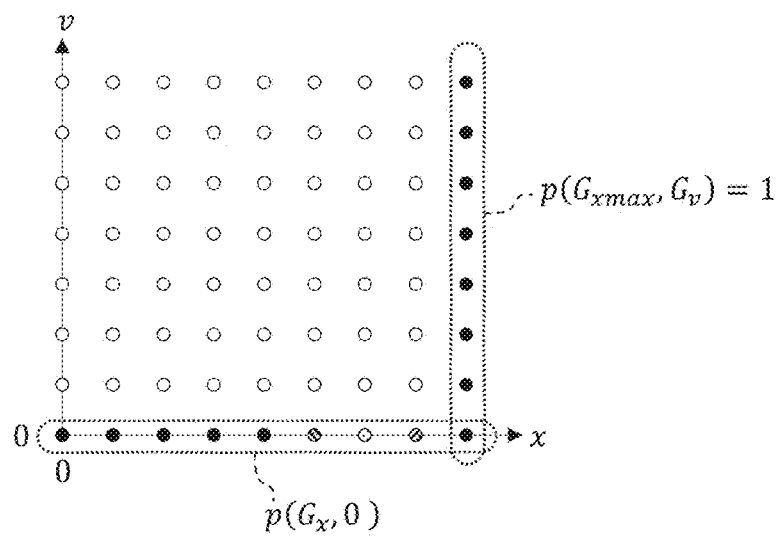
FIG. 34 is an explanatory diagram for explaining that conditions are given on ends of the grid points of the collision probability map of the vehicle control device according to the embodiment.
Figure 35:
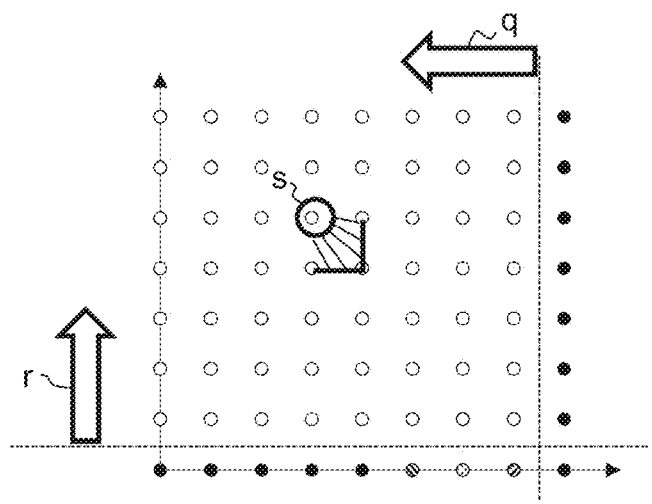
FIG. 35 is an explanatory diagram for explaining that collision probabilities are obtained in order from ends of the grid points of the collision probability map of the vehicle control device according to the embodiment.

FIGS. 33 to 35 illustrates states as grid points representing a two-dimensional space of location and speed, for each of which states a collision probability p(C|S) is to be calculated.

1. Assume Grid Points

FIG. 33 illustrates how the grid points are allocated in the space of location and speed. The grid points shown in FIG. 33 are defined. To obtain the collision probability p(C|S) at each of the states (each representing a location and a speed) corresponding to the grid points (see FIG. 33), the calculation is performed sequentially starting from the states whose collision probabilities are known.

Here, assume that $G_x$ and $G_v$ denote indices of the grid points; the $G_{xsize}$ and $G_{vsize}$ denote the size of the grid; x denotes the location of a state and v denotes the speed of the state; $x_{max}$ denotes a maximum value of location and $v_{max}$ denotes a maximum value of speed. A conversion from indices to the state values of the corresponding actual state is represented by formulas (19) and (20) (see FIG. 33). A conversion from state values of an actual state to the corresponding indices is represented by formula (21) and (22) (see FIG. 33).

Indices State→values $$x = \frac{G_x - 1}{G_{xsize} - 1} x_{max} \tag{19}$$

$$v = \frac{G_v - 1}{G_{vsize} - 1} v_{max} \tag{20}$$

State values→Indices $$G_x = \frac{x}{x_{max}}(G_{xsize} - 1) + 1 \tag{21}$$

$$G_v = \frac{v}{v_{max}}(G_{vsiz} - 1) + 1 \tag{22}$$

2. Conditions are Given to Ends of Grid Points of Collision Probability Map

FIG. 34 illustrates the concept of setting conditions to the ends of the grid points of the collision probability map.

The collision probabilities of the locations beyond the target object are assumed as 1.

$$p(G_{xmax}, G_v) = 1$$

Collision probability at a speed of 0, i.e., $p(G_x, 0)$, is represented by a cumulative distribution of the distribution of the distance detection part (detection device DD, vehicle sensor 60, and autonomous driving control part 120) detecting a target object and is represented by formula (23) based on formula (15).

$$p(G_x, 0) = \frac{1}{2}\left[1 + \mathrm{erf}\left(\frac{x_o - \frac{G_x - 1}{(G_{xsize} - 1)} x_{max}}{\sqrt{2}\,\sigma_d}\right)\right] \tag{23}$$

In formula (23), $x_o$ denotes the location of the obstacle; and $\sigma_d$ denotes the standard deviation of the error distribution of the target object detection by the distance detection part (detection device DD, vehicle sensor 60, and autonomous driving control part 120).

3. The Collision Probabilities are Obtained Sequentially from Ends of the Grid Points of the Collision Probability Map.

FIG. 35 illustrates the concept of obtaining the collision probabilities sequentially from ends of the grid points of the collision probability map. The arrows q and r indicated in FIG. 35 represent the directions in which the collision probabilities of states are obtained sequentially from the ends of the grid points of the collision probability map. The reference numeral s shown in FIG. 35 represents an image of the calculation obtaining the collision probability of a state.

Hereinafter, the collision probability on a grid point $G_x$, $G_y$ is denoted as $p(C|S) = p_c(G_x|G_y)$. The collision probability at a current state $S_c$, denoted as $p(C|S_c)$, is given by formula (24) and the collision probability at a current grid point $G_{xc}$, $G_{vc}$, denoted as $p_c(G_{xc}|G_{vc})$, is given by formula (25). Formula (24) and Formula (25) are shown in FIG. 39.

In formula (24) and (25),
- $p(\hat{d}|S_c)$ corresponds to $p(\hat{d}_1)p(\hat{d}_2)$, where $p(\hat{d}_1)$ represents the detection probability of detecting $\hat{d}_1$ and $p(\hat{d}_2)$ represents the error distribution of $\hat{d}_2$;
- $p(S_n|S_c, a(\hat{d}))$ corresponds to $p(\varepsilon_a)$ and they each represent an error distribution of action a (deceleration); and
- $p(C|S_n)$ corresponds to $P_c(g_{xn}, g_{vn})$ and they each represent the collision probability at the next state ($P_c(g_{xn}, g_{vn})$ represents an approximated value obtained by interpolation).

Descriptions has been given of how the collision probability $p(C|S)$ at each state (location, speed) can be calculated.

Calculation of Collision Probability by Approximation from Next State

Next, a description will be given of how the collision probability of a current state can be obtained from the next state by approximation.

FIGS. 36 to 38B are explanatory diagrams for explaining how the collision probability at a current state is obtained from a next state by approximation.

1. Obtain Current Speed and Location Based on the Location of Grid Point

Figure 36:
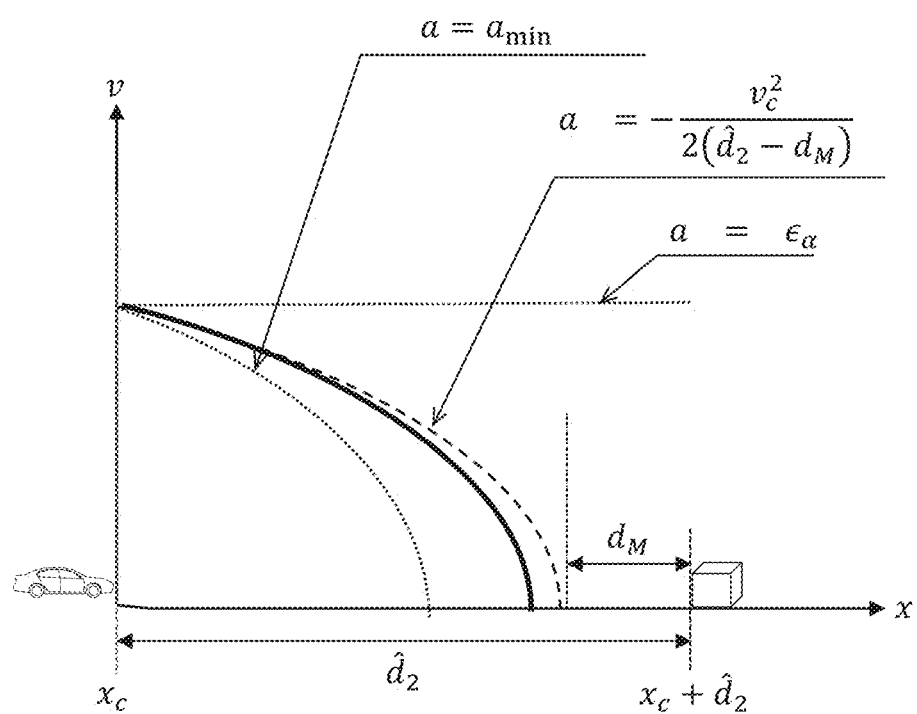
FIG. 36 is an explanatory diagram for explaining how the vehicle control device according to the embodiment can obtain a collision probability from next states by approximation.

FIG. 36 corresponds to FIG. 31A. Assuming that the coordinates (grid indices) of a grid point corresponding to the current state illustrated in FIG. 36 are given as $G_{xc}$, $G_{vc}$, the current speed $v_c$ and the current location $x_c$ are calculated by formulas (26) and (27).

$$x_c = \frac{G_{xc} - 1}{G_{xsize} - 1} x_{max} \tag{26}$$

$$v_c = \frac{G_{vc} - 1}{G_{vsize} - 1} v_{max} \tag{27}$$

2. Set the Parameters $\hat{d}_1$, $\hat{d}_2$, and $\varepsilon_a$

3. Obtain Necessary Deceleration

The necessary deceleration a is calculated according to formula (28).

$$a = \begin{cases} \varepsilon_a & \ldots \hat{d}_1 = 0 \\ \max\left(a_{min}, -\frac{v_c^2}{2(\hat{d}_2 - d_M)} + \varepsilon_a\right) & \ldots \hat{d}_1 = 1 \end{cases} \tag{28}$$

4. Determine a Time Difference to Next State

Figure 37A:
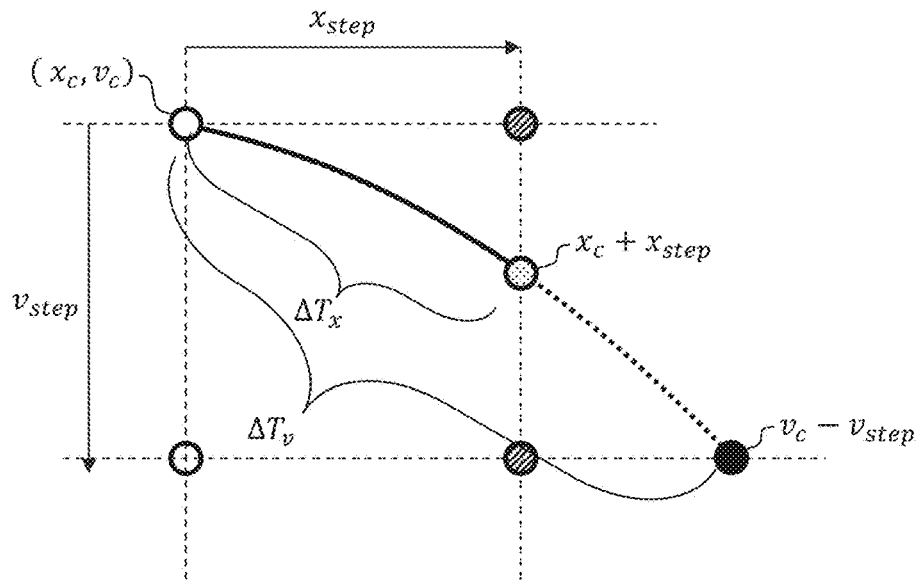
FIGS. 37A and 37B are each an explanatory diagram for explaining how the vehicle control device according to the embodiment can obtain a collision probability from next states by approximation.
Figure 37B:
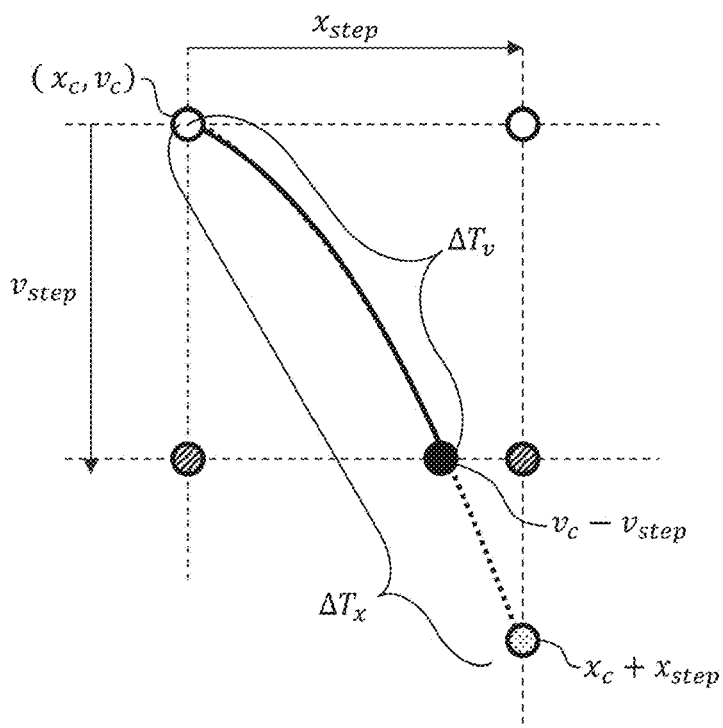

FIGS. 37A and 37B are explanatory diagrams for explaining how to determine the time at which the next state is to be defined. In FIGS. 37A and 37B, $\Delta T_x$ represents the time length by which the vehicle reaches the grid line $x = x_c + x_{step}$, where $x_{step}$ is the spacing of the grids in the location axis. In FIGS. 37A and 37B, $\Delta T_v$ represents the time length by which the vehicle reaches the grid line $v = v_c - x_{step}$, where $v_{step}$ is the spacing of the grids in the speed axis. FIG. 37A represent a case in which $\Delta T_x < \Delta T_v$; and FIG. 37B represents a case in which $\Delta T_x \geq \Delta T_v$.

Firstly, as shown in FIGS. 37A and 37B, ATM, which corresponds to the intersection with line $x = x_c + x_{step}$, and $\Delta T_v$, which corresponds to the intersection with line $v = v_c -$ $v_{step}$, are respectively obtained according to formulas (29) and (30). Note that $\Delta T_x$ is obtained by formula (29) only when $\Delta = v_c^2 + 2ax_{step} > 0$.

$$\Delta T_x = \frac{-v_c + \sqrt{v_c^2 + 2ax_{step}}}{a} \tag{29}$$

$$\Delta T_v = \frac{V_{step}}{a} \tag{30}$$

Next, the smaller one of $\Delta T_x$ and $\Delta T_v$ is selected as follows:

$$\Delta T = \min(\Delta T_v, \Delta T_x) \tag{31}$$

5. Obtain the Next State

The next state $S_n(x_n, v_n)$ is obtained by formulas (32) and (33).

$$v_n = v_c + a\Delta T \tag{32}$$

$$x_n = x_c + v_n \Delta T + \tfrac{1}{2} \times a\Delta T^2 \tag{33}$$

Figure 38A:
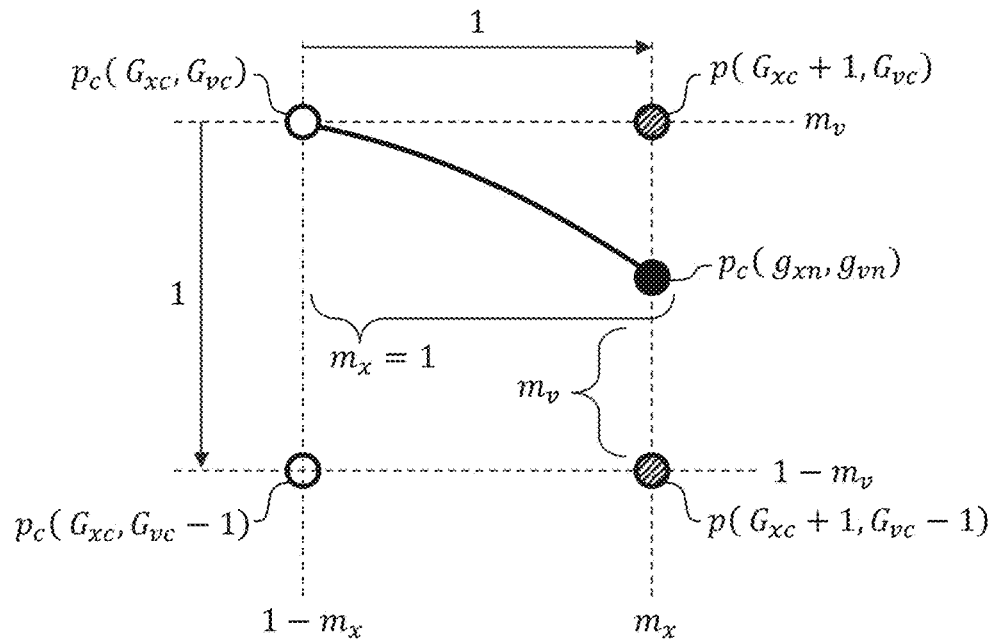
FIGS. 38A and 38B are each an explanatory diagram for explaining how the vehicle control device according to the embodiment can obtain a collision probability from next states by approximation.
Figure 38B:
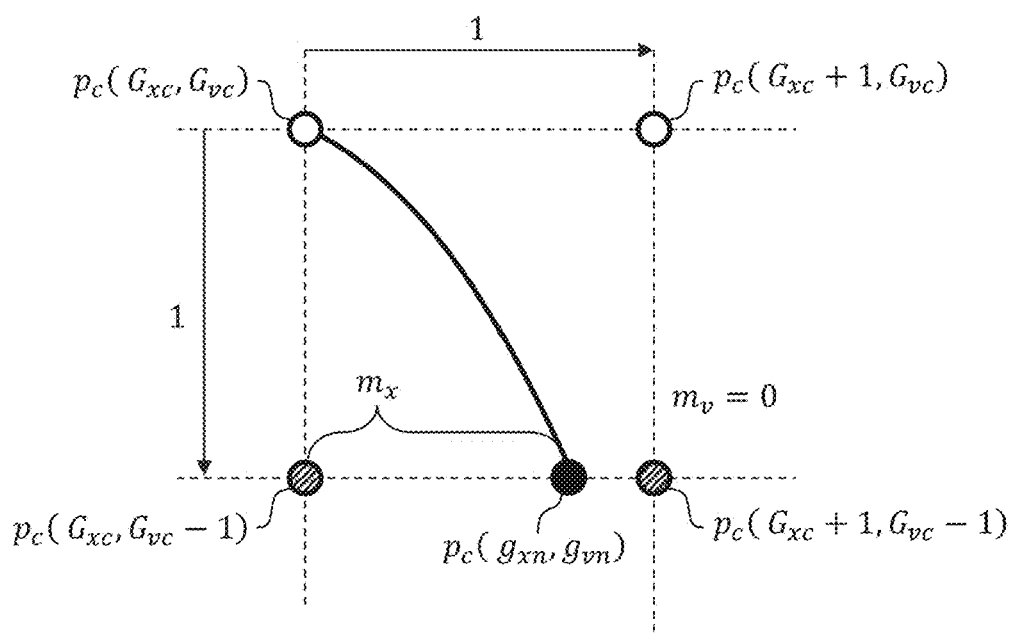

6. Obtain the Collision Probability of the Next State by Approximation from the Grid Points in the Vicinities of the Next State FIGS. 38A and 38B are explanatory diagrams for explaining the method for determining the collision probability of the next state using the collision probabilities of the grid points in the vicinity of the next state. FIG. 38A illustrates a case where $\Delta Tx < \Delta Tv$; and FIG. 38B illustrates a case where $\Delta Tx \geq \Delta Tv$.

As illustrated in FIGS. 38A and 38B, using the collision probabilities at the grid points $(G_{xc}, G_{vc}-1)$, $(G_{xc}+1, G_{vc}-1)$, and $(G_{xc}+1, G_{vc})$ located in the vicinity of the next state $(g_{xn}, g_{vn})$ (see the mark in FIGS. 38A and 38B), the collision probability $p_c(g_{xn}, g_{vn})$ of the next state is calculated according to formula (34). Note that mx is a value obtained by normalizing a distance from the current state $(G_{xc}, G_{vc})$ to the next state $(g_{xn}, g_{vn})$ by $x_{step}$ and thus takes a value between 0 and 1, and that my represents value obtained by normalizing a speed difference from the next state $(g_{xn}, g_{vn})$ to the state at grid point $(G_{xc}+1, G_{vc}-1)$ by $v_{step}$ and thus takes a value between 0 and 1. Note that index distance between adjacent grid points is 1 and thus grid indices of a state adjacent to a current state are obtained by adding/subtracting 1 to/from grid index $G_{xc}$ and/or $G_{vc}$ of the current state.

$$p_c(g_{xn}, g_{vn}) = (1 - m_x)(1 - m_v)p(G_{xc}, G_{vc} - 1) + \tag{34}$$
$$(m_x)(1 - m_v)p(G_{xc} + 1, G_{vc} - 1) +$$
$$(m_x)(m_v)p_c(G_{xc} + 1, G_{vc})$$

Here, the next state has been determined according to the parameters $\hat{d}_1, \hat{d}_2$, and $\varepsilon_a$ set at step 2, and the collision probability $p_c(g_{xn}, g_{vn})$ at the determined next state has been calculated.

7. Obtain the collision probability at the current state by sweeping parameters $\hat{d}_1, \hat{d}_2$, and $\varepsilon_a$ The collision probability $p_c(G_{xc}, G_{vc})$ at the current state is obtained by accumulating the calculated collision probability $p_c(g_{xn}, g_{vn})$ in accordance with formula (35) with sweeping the parameters $\hat{d}_1$, $\hat{d}_2$, and $\varepsilon_a$.

$$p_c(G_{xc}, G_{vc}) = \Sigma_{\hat{d}_1} \Sigma_{\hat{d}_2} \Sigma_{\varepsilon_a} p(\hat{d}_1) p(\hat{d}_2) p(\varepsilon_a) p_c(g_{xn}, g_{vn}) \tag{35}$$

It should be noted that:

$p_c(g_{xn},g_{vn})$ in formula (35) is given by formula (34);

$m_x$ and $m_v$ in formula (34) are determined by the next state $(g_{xn},g_{vn})$;

the next state $(g_{xn},g_{vn})$ is given by formulas (32) and (33);

formulas (32) and (33) are each a function of deceleration a and $\Delta T$;

$\Delta T$ is determined by formula (31), based on $\Delta T_v$ and $\Delta T_x$; and $\Delta T_v$ and $\Delta T_x$ are given by functions of deceleration a, which are represented by formula (29) and (30). The deceleration a is given by formula (28) representing a function of uncertainty $\varepsilon_a$ of deceleration a. That is, the next state $(g_{xn},g_{vn})$ is obtained by a calculation in which deceleration a is added with uncertainty $\varepsilon_a$.

That is, $p_c(g_{xn},g_{vn})$ in formula (35) takes a value to which uncertainty $\varepsilon_a$ of deceleration a is reflected. The summation $\Sigma\Sigma\Sigma$ in formula (35) is applied to a term in which $p_c(g_{xn},g_{vn})$ is multiplied by $P(\varepsilon_a)$, which represents the probability of uncertainty $\varepsilon_a$ of deceleration a, and the summation is performed with respect to the uncertainty $\varepsilon_a$. Therefore, collision probability $p_c(G_{xc},G_{vc})$ of the current state, given by formula (35), will take a value to which uncertainty $\varepsilon_a$ of deceleration a has been reflected. In this way, the embodiment makes it possible to handle the collision probability continuously.

It should be noted that the term to which the summation $\Sigma\Sigma\Sigma$ in formula (35) is applied is multiplied with $p(\hat{d}_1)$, which represents a probability of detecting a target object by the distance detection part (detection device DD, vehicle sensor 60, and autonomous driving control part 120). $p(\hat{d}_1)$, which represents a probability of detecting a target object by the distance detection part (detection device DD, vehicle sensor 60, and autonomous driving control part 120), is given by formula (18) and presents the characteristic as shown in FIG. 31D. In a region where $p(\hat{d}_1)$, which represents a probability of detecting a target object by the distance detection part (detection device DD, vehicle sensor 60, and autonomous driving control part 120), is low, i.e., in a region where the distance from the target object is far, collision probability $p_c(G_{xc},G_{vc})$ is assessed as low by formula (35). In the region where the collision probability is assessed as low in the collision probability map, the action plan creating part 200 can create an action plan to start deceleration in a manner that does not influence the ride quality, as described with reference to FIG. 8.

How to Obtain Approximate Collision Probability Map

The collision probability map to be set in STEP S12 of the flow according to the embodiment is calculated approximately assuming the situation shown in FIG. 36, using formulas (16) to (18), (23), and (26) to (35). That is, the collision probability map is calculated assuming that an obstacle is present at the detected distance detected by the current sensor configuration currently detecting the obstacle. Hereinbelow, this collision probability map is referred to as "approximate collision probability map".

The term "approximate collision probability map" is used here for the sake of convenience because it is, unlike the above-described "collision probability map" in which the true location of the target object is known, to be calculated on the assumption that the obstacle is present at the detected distance $\hat{d}_2$ detected by the distance detection part (detection device DD, vehicle sensor 60, and autonomous driving control part 120) as shown in FIG. 36.

The term $\hat{d}_2$ in FIG. 36 and formula (28) corresponds to the detected distance, which is included in the detection information outputted from the distance detection part (detection device DD, vehicle sensor 60, and autonomous driving control part 120) and at which a combination of sensors (sensor configuration), of the plurality of sensors of the detection device DD, is detecting the obstacle. The term $d_M$ in FIG. 36 and formula (28) corresponds to the offset amount to be determined by the instruction value offset amount calculation part 230.

The collision probabilities at grid points at which the speed v=0, i.e., at points on one end portion of the approximate collision probability map are given by formula (23) with substituting $x_o$, which represents the true location of the target object, with the value of detected distance. The collision probabilities at points at which the location is $x_c+\hat{d}_2$ and at which the speed v≠0, i.e., at points on the other end portion of the approximate collision probability map, are given as 1.

Based on the collision probabilities at points at which the speed v=0 and the collision probabilities at points at which the location is $x_c+\hat{d}_2$ and at which the speed v≠0, collision probability at each of the grid points in the approximate collision probability map is obtained by approximate calculation according to formula (34).

The value of $p(\hat{d}_1)$ in formula (35) is given by applying formula (18) to each of the grid points in the approximate collision probability map. In formula (18), $x_c$ is substituted with a location given by formula (19).

The value of $p(\hat{d}_2)$ in formula (35) is calculated using formula (17) with substituting $x_o$, which represents the true location of the target object, with the value of detected distance. The term $p(\hat{d}_2)$ in formula (35) corresponds to the above-described fusion accuracy reliability-based probability distribution 1003. As described above, characteristic values representing the fusion accuracy reliability-based probability distribution 1003 can be obtained based on a result of measuring the characteristics of the distance detection part (detection device DD, vehicle sensor 60, and autonomous driving control part 120) detecting a target object in a situation where the true distance is known. The width of the fusion accuracy reliability-based probability distribution 1003 depends on the detected distance. The larger the detected distance, the fusion accuracy reliability-based probability distribution 1003 presents a normal distribution which has a wider width. Therefore, the parameter $\sigma_d$ in formula (17), which represents the normal distribution, is to be substituted with a value obtained by a function of detected distance detected by the distance detection part (detection device DD, vehicle sensor 60, and autonomous driving control part 120), which function is to be obtained in advance based on measurement values. Note that the value of the parameter $\sigma_d$ is to be used also in formula (23), which gives the collision probabilities at locations at which the speed v=0.

The term $p(\varepsilon_a)$ in formula (35) is given by formula (16). The parameter $\sigma_a$ of the normal distribution represented by formula (16) is to be obtained in advance through a measurement process. The value calculated by formula (16) using the measured value of $\sigma_a$ is used as the value of $p(\varepsilon_a)$.

The term $p_c(g_{xn},g_{vn})$ in formula (35) is given by formula (34).

The instruction value offset amount ($d_M$), which is used to calculate the approximate collision probability map, has been described as being obtained from the predetermined target collision probability, instruction achievement probability density distribution 1001, and fusion accuracy reliability-based probability distribution 1003. The instruction achievement probability density distribution 1001 is to be measured in advance through a measurement process to measure the stop location of the vehicle 1 to which a certain deceleration instruction has been given and can be regarded as a function of deceleration. The fusion accuracy reliability-based probability distribution 1003 is a characteristic to be measure through a process of finding an error distribution according to which the errors of the detected distances are distributed in a situation where the true distance is known. The fusion accuracy reliability-based probability distribution 1003 can be regarded as a function of detection information (sensor configuration, detected time period, and detected distance) outputted by the distance detection part (detection device DD, vehicle sensor 60, and autonomous driving control part 120).

It will be appreciated from the above description that the approximate collision probability map can be regarded as a function of the deceleration, detection information (sensor configuration, detected time period, and detected distance) outputted from the distance detection part (detection device DD, vehicle sensor 60, and autonomous driving control part 120).

How to Obtain Approximate Collision Probability Map According to the Embodiment While Traveling According to the embodiment, a plurality of approximate collision probability maps are created in advance assuming a plurality of situations and stored in the collision probability map storage part 1010. Then, while the own vehicle 1 is traveling, the collision probability map setting part 250 selects one from the plurality of approximate collision probability maps that has been created for a situation close to the current situation.

As described above, the approximate collision probability map can be regarded as a function of the deceleration, detection information (sensor configuration, detected time period, and detected distance) outputted from the distance detection part (detection device DD, vehicle sensor 60, and autonomous driving control part 120). According to this idea, a table (approximate collision probability map table) that receives a deceleration, a sensor configuration, a detected time period, and a detected distance as input parameters and outputs an approximate collision probability map is created and stored in the collision probability map storage part 1010 in advance. Then, while the own vehicle 1 is traveling, the collision probability map setting part 250 inputs: the maximum deceleration set by the action plan creating part 200 and the detection information obtained from the distance detection part (detection device DD, vehicle sensor 60, and autonomous driving control part 120), i.e., the combination of sensors (sensor configuration) currently detecting an obstacle, the detected time period during which the obstacle has been continuously detected by the sensor configuration, and the detected distance detected by the sensor configuration, to the approximate collision probability map table stored in the collision probability map storage part 1010 and sets the approximate collision probability map outputted from the table as the approximate collision probability map to be used currently.

Using the approximate collision probability map table makes it possible to set the approximate collision probability map in a short time without consuming a computation resource.

The more information amount of the input parameters to the approximate collision probability map table (the smaller the quantization steps), the more precise the approximate collision probability maps can be. However, the size of the table increases. The input information amount is to be determined by a tradeoff between precision and table size (cost).

Incidentally, the table size can be reduced by storing collision probabilities for not all the grid points in the approximate collision probability map. For example, the data format of the approximate collision probability map can be determined such that the collision probabilities in a region where the collision probabilities are higher or lower than the target collision probability by a certain value may be regarded as a fixed value and the collision probabilities in such a region are not stored in the collision probability map storage part 1010.

As another embodiment, unlike the above-described embodiment in which an approximate collision probability map table is stored in the collision probability map storage part 1010 and an approximate collision probability map created for a situation close to the current situation is selected while the own vehicle 1 is traveling, the collision probability map setting part 250 may be configured to calculate the approximate collision probability map in a real time manner based on: the maximum deceleration currently set, the characteristic of the own vehicle 1 measured in advance, and the detection information obtained from the distance detection part (detection device DD, vehicle sensor 60, and autonomous driving control part 120), i.e., the combination of sensors (sensor configuration) currently detecting an obstacle, the detected time period during which the obstacle has been continuously detected by the sensor configuration, and the detected distance detected by the sensor configuration. With this embodiment, the collision probability map storage part 1010 can be eliminated. In this embodiment, the collision probability map setting part 250 is configured to calculate the approximate collision probability map in accordance with formulas (16) to (18), (23), and (26) to (35) with the offset amount determined by the instruction value offset amount calculation part 230 according to the above described STEP 4.

In addition, in the case of the embodiment in which the collision probability map setting part 250 calculates the approximate collision probability map in a real-time manner, the collision probability map setting part 250 may be configured to store the calculated approximate collision probability map in the collision probability map storage part 1010 as an element of the approximate collision probability map table and to read and reuse the stored approximate collision probability map afterward when the collision probability map setting part 250 encounters a similar situation. In this case, the collision probability map setting part 250 may be configured to delete the stored approximate collision probability map from the approximate collision probability map table of the collision probability map storage part 1010 if the frequency of reusing the map is low. With this embodiment, the storage size necessary for the collision probability map storage part 1010 can be reduced.

In addition, even in the case of the embodiment in which the collision probability map setting part 250 calculates the approximate collision probability map in a real-time manner, calculating collision probabilities for not all the grid points in the approximate collision probability map can reduce necessary computation resource and reduce the storage size for storing the approximate collision probability map in the collision probability map storage part 1010.

The details of how to obtain the approximate collision probability map in the embodiments have been described.

A vehicle control device 100 according to the embodiment includes: an action plan creating part 200 configured to create an action plan for autonomous driving of an own vehicle 1; a vehicle behavior control part 160 configured to control at least a speed of the own vehicle 1 based on the action plan; and a distance detection part (detection device DD, vehicle sensor 60, and autonomous driving control part 120) configured to detect an object and output detection information on detection of the object. The action plan creating part 200 is configured to set a maximum deceleration of the own vehicle 1 for autonomous driving. The action plan creating part 200 includes a collision probability map setting part 250 configured to, when the distance detection part (detection device DD, vehicle sensor 60, and autonomous driving control part 120) detects an obstacle, determine a collision probability map, which is a two-dimensional map of a collision probability distribution representing likelihood of a collision between the own vehicle 1 and the detected obstacle in a two-dimensional space of a location and a speed. The collision probability map has been created based on a target stop location at which the own vehicle 1 is to be controlled to stop, which target stop location is determined based on a predetermined target collision probability, the maximum deceleration, and the detection information. The action plan creating part 200 is configured to create a current action plan based on the collision probability map, the predetermined target collision probability, and a current location and a current speed of the own vehicle 1.

An example of conventional techniques controls the speed of a vehicle with reference to a location error probability distribution as described in Japanese Patent No. 4796400. Another example of conventional techniques determines the likelihood of a collision of an own vehicle to an obstacle as described in Japanese Patent No. 4967840. These examples of conventional technique control the speed of a vehicle based on the location error probability distribution or the likelihood of a collision but does not relate action plans of autonomous driving to those information. In the conventional techniques, there is a problem (problem 1) that in the event of determining an action plan using sensors, the distance to be detected by the sensors may not be enlarged while maintaining the reliability of the sensors due to insufficient detectable distances of the sensors. In addition, another problem (problem 2) of the conventional technique is an insufficiency of clarification of safety levels and an insufficiency of quantification of reliability (accuracy, detection probability) of sensors and the accuracy of the action plan.

In contrast, the embodiment introduces a collision probability map, which is a two-dimensional map of a collision probability distribution representing likelihood of a collision between the own vehicle 1 and the detected obstacle in a two-dimensional space of a location and a speed. The action plan creating part 200 is configured to create a current action plan based on the collision probability map, the predetermined target collision probability, and a current location and a current speed of the own vehicle 1. With this, the action plan creating part 200 can know the own position in the two-dimensional space of location and speed with respect to the points (location, speed) having the target collision probability, thereby to create an action plan taking into account the safety and comfort in autonomous driving.

The collision probability map according to the embodiment defines a plurality of grid points in the two-dimensional space. A collision probability has been calculated for each of the plurality of grid points. The collision probability calculated for each of the plurality of grid points represents a probability of the own vehicle 1 to collide with the obstacle when the vehicle behavior control part 160 instructs the own vehicle 1 to decelerate from the location and speed at the grid point with the maximum deceleration being an upper limit so as to stop at the target stop location.

With this configuration, the action plan creating part 200 can create an action plan based on the collision probabilities calculated assuming the maximum deceleration currently set.

The collision probability map includes a low collision probability region (see FIG. 14) consisting of grid points having collision probabilities lower than a first threshold value that is lower than the target collision probability and includes a high collision probability region (see FIG. 14) consisting of grid points having collision probabilities lower than the target collision probability but equal to or higher than a second threshold value that is equal to or higher than the first threshold value. The action plan creating part 200 according to the embodiment is configured to, when the current location and speed of the own vehicle 1 is in the low collision probability region, create an action plan that keeps a speed currently set for autonomous driving and allows sudden braking as the current action plan. The action plan creating part 200 according to the embodiment is configured to, when the current location and speed of the own vehicle 1 is in the high collision probability region, create an action plan that avoids sudden braking by preliminary braking as the current action plan, which preliminary braking repeats short-time braking.

With this configuration, the action plan creating part 200 can create a sudden braking allowed action plan and a preliminary braking action plan in the two-dimensional space of the collision probability map. The sudden braking allowed action plan keeps the set speed set for autonomous driving and permits sudden braking operations in a low collision probability region (see FIG. 14) in the two-dimensional space of the collision probability map. The low collision probability region is a region having collision probabilities lower than a first predetermined threshold value lower than the target collision probability. The preliminary braking action plan avoids sudden braking operations by repeating short-time braking in a high collision probability region (see FIG. 14) in the two-dimensional space of the collision probability map. The high collision probability region is a region having collision probabilities lower than the target collision probability but equal to or higher than a second threshold value that is equal to or higher than the first predetermined threshold value. Controlling the autonomous driving control of the own vehicle 1 in such a way makes it possible to provide safety and comfort.

The distance detection part (detection device DD, vehicle sensor 60, and autonomous driving control part 120) includes a plurality of sensors. The detection information includes: a sensor configuration representing a combination of sensors included in the plurality of sensors and having detected the obstacle; a detected distance detected by the sensor configuration; and a detected time period during which the sensor configuration continuously having detected the obstacle. The target stop location has been determined so that a collision probability calculated by performing convolution between an instruction achievement probability density distribution 1001 and an error distribution (fusion accuracy reliability-based probability distribution 1003) is equal to the target collision probability. The instruction achievement probability density distribution 1001 represents a probability density distribution of a location at which the vehicle will stop when the vehicle behavior control part 160 instructs the own vehicle 1 to decelerate with the maximum deceleration so as to stop the own vehicle 1 at the target stop location. The error distribution represents a probability distribution whose center location is at the detected distance and whose distribution represents a distribution of a difference between a true distance from the vehicle to the obstacle and the detected distance. The instruction achievement probability density distribution 1001 has been estimated with reference to the maximum deceleration, based on vehicle stopping characteristics of the own vehicle 1. The vehicle stopping characteristics have been measured in advance by performing stopping operations on the own vehicle 1 according to deceleration instructions given to the own vehicle 1. The error distribution (fusion accuracy reliability-based probability distribution 1003) has been estimated with reference to the sensor configuration, the detected distance, and the detected time period, based on distance detecting characteristics of the distance detection part (detection device DD, vehicle sensor 60, and autonomous driving control part 120). The distance detecting characteristics have been measured in advance by performing a measurement of a distance to a known object using the distance detection part in a situation where the true distance to the known objection is known.

An error distribution representing a probability distribution of a difference between the true distance to the obstacle and the detected distance detected by the distance detection part (detection device DD, vehicle sensor 60, and autonomous driving control part 120) can be estimated based on: the combination of sensors (sensor configuration), of the plurality of sensors included in the distance detection part, which has detected an obstacle; a detected distance detected by the sensor configuration; and the detected time period during which the obstacle has been continuously detected by the sensor configuration. The overlapping of the error distribution and the instruction achievement probability density distribution under the maximum deceleration represents a collision probability of the own vehicle 1. By determining the target stop location so that this collision probability becomes equal to a target collision probability equal to or lower than a collision probability predicted in a case of manual driving, it is possible to determine the collision probability map according to which the driving by the autonomous driving system can drive the own vehicle 1 in a manner safer than a case where a human drives the own vehicle 1.

In addition, with the above configuration, the action plan creating part 200 can use a collision probability map in which the target stop location is determined based on the actually measured characteristics of the own vehicle 1 and the distance detection part (detection device DD, vehicle sensor 60, and autonomous driving control part 120).

Collision probability $p_c(G_{xc},G_{vc})$ of a grid point $(G_{xc},G_{vc})$ in the collision probability map that is set by the collision probability map setting part 250 of the vehicle control device 100 according to the embodiment has been obtained by formula (35) where: $p(\hat{d}_1)$ represents a detection probability of the distance detection part (detection device DD, vehicle sensor 60, and autonomous driving control part 120) to, at the grid point $(G_{xc},G_{vc})$, detect the obstacle; $p(\hat{d}_2)$ represents a probability of the distance detection part (detection device DD, vehicle sensor 60, and autonomous driving control part 120) to, at the grid point $(G_{xc},G_{vc})$, detect the obstacle at a distance $\hat{d}_2$; $p_c(g_{xn},g_{cn})$ represents a collision probability of a point $(g_{xn},g_{cn})$ to which the own vehicle 1 will transition in the collision probability map when the own vehicle 1 is instructed by the vehicle behavior control part 160 so as to decelerate with a deceleration a to stop at the target stop location from the grid point $(G_{xc},G_{vc})$; and $p(\varepsilon_a)$ represents a probability of an uncertainty $\varepsilon_a$ associated with the deceleration a, the uncertainty $\varepsilon_a$ representing difference between the deceleration a and a deceleration actually performed by the own vehicle 1. The point $(g_{xn},g_{cn})$ in the collision probability map is obtained by performing calculation in which the deceleration a is added with the uncertainty $\varepsilon_a$. In the collision probability map, the collision probabilities of grid points whose speed is 0 are given based on a result of measuring the characteristic of the distance detection part in advance. In the collision probability map, the collision probabilities of grid points whose speed is not 0 and whose location is at the detected distance are given of a predetermined value. The value of $p_c(g_{xn},g_{cn})$ is approximately calculated based on collision probabilities of grid points, of the plurality of grid points, in the vicinity of the point $(g_{xn},g_{cn})$. The collision probability $p_c(G_{xc},G_{vc})$ for each of the plurality of grid points in the collision probability map is obtained by repeating summation $\Sigma\Sigma\Sigma$ of formula (35) from a corner grid point whose speed is 0 and whose location is at the detected distance in a direction in which the speed increases and/or the location approaches to the own vehicle 1.

The collision probability map obtained in this way includes collision probability values for which uncertainty Ca of deceleration a has been taken into account. With this, the collision probability map represents situations that are close to state transitions in the actual traveling.

The term to which the summation $\Sigma\Sigma\Sigma$ in formula (35) is applied is multiplied with $p(\hat{d}_1)$, which represents a detection probability of the detection by the distance detection part (detection device DD, vehicle sensor 60, and autonomous driving control part 120). When the detected distance is far, the value of the detection probability $p(\hat{d}_1)$ of the detection by the distance detection part (detection device DD, vehicle sensor 60, and autonomous driving control part 120) takes a low value. In a region where detection probability $p(\hat{d}_1)$ of the distance detection part (detection device DD, vehicle sensor 60, and autonomous driving control part 120) detecting a target object is low, i.e., in a region where the distance from the target object is far, collision probability $p_c(G_{xc},G_{vc})$ is assessed as low by formula (35). In a region where the collision probability is assessed as low in the collision probability map, the action plan creating part 200 can create an action plan to start deceleration in a manner that does not influence the ride quality, as described with reference to FIG. 8.

In the embodiment, the probability $p(\varepsilon_a)$ has a normal distribution with a standard deviation determined based on a characteristic of the own vehicle 1, which characteristic has been measured in advance.

With this, the collision probability map setting part 250 can set a collision probability map based on the uncertainty appearing in actual deceleration operations of the own vehicle 1.

The action plan creating part 200 according to the embodiment includes a collision probability map storage part 1010 storing a plurality of collision probability maps calculated based on: a result of a measurement process to measure a stop location of the own vehicle 1 to which a certain deceleration instruction has been given; a result of a measurement process to measure characteristics of the distance detection part (detection device DD, vehicle sensor 60, and autonomous driving control part 120) detecting a target object in a situation where a true distance to the target object is known; and the predetermined target collision probability. The collision probability map setting part 250 is configured to select a collision probability map from the plurality of collision probability maps stored in the collision probability map storage part 1010 as the collision probability map based on which the current action plan is to be created, based on the maximum deceleration and the detection information.

With this configuration, as the collision probability map setting part 250 can determine the collision probability map without performing calculation for obtaining the collision probability map while the own vehicle 1 is traveling, consumption of calculation resource is low.

The collision probability map setting part 250 according to the embodiment may be configured to determine the collision probability map by calculating the collision probability map in a real-time manner while the own vehicle 1 is traveling, based on: parameters representing characteristics of the own vehicle 1 and the distance detection part (detection device DD, vehicle sensor 60, and autonomous driving control part 120); the target collision probability; the maximum deceleration; and the detection information, wherein the parameters have been derived from a result of a measurement process to measure a stop location of the own vehicle 1 to which a certain deceleration instruction has been given and a result of a measurement process to measure characteristics of the distance detection part detecting a target object in a situation where a true distance to the target object is known.

The action plan creating part 200 according to the embodiment may include a collision probability map storage part 1010 storing a collision probability map calculated by the collision probability map setting part 250 in a real-time manner while the own vehicle 1 is traveling. The collision probability map setting part 250 may be configured to, when the collision probability map stored in the collision probability map storage part 1010 corresponds to the predetermined target collision probability, the maximum deceleration, and the detection information, determine the collision probability map stored in the collision probability map storage part 1010 as the collision probability map based on which the current action plan is to be created.

With this configuration, the storage resource of the collision probability map storage part 1010 storing collision probability maps can be eliminated or reduced.

The distance detection part (detection device DD, vehicle sensor 60, and autonomous driving control part 120) includes a plurality of sensors for detecting obstacles. The detection information includes: a sensor configuration representing a combination of sensors included in the plurality of sensors and having detected the obstacle; and a detected distance detected by the sensor configuration. The action plan creating part 200 may be configured such that when the obstacle has been detected by only a subset of the plurality of sensors and the detected distance is equal to or greater than a predetermined distance threshold value, the action plan creating part 200 regards the obstacle as not existing and creates an action plan for performing a cruising operation as the current action plan, and that when the obstacle has been detected by only a subset of the plurality of sensors and the detected distance is less than the predetermined distance threshold value, the action plan creating part 200 regards the obstacle as existing and creates an action plan for performing a preliminary braking operation as the current action plan.

When a contradiction between sensors occurs due to a sensor failure, this configuration leads to comfort in a state of obstacle absence $\bar{E}$ when the observed obstacle distance $\hat{d}$ is equal to or greater than the predetermined threshold value and leads to safety in a state of obstacle presence E when the observed obstacle distance $\hat{d}$ is less than the predetermined threshold value.

The above-described embodiment is intended to be illustrative of the present invention in an easily understandable manner. The present invention is not limited to that includes all of the components of the embodiment described. Moreover, a part of the configuration of a certain embodiment may be replaced with configurations of other embodiments, or configurations of other embodiments may be added to the configuration of a certain embodiment. Further, a part of the configuration of a certain embodiments may be eliminated, or added or replaced with another configuration.

The vehicle control device and the vehicle control method of the present invention can be realized by a program for causing a computer to function as each of the vehicle control device and the vehicle control method. The program may be stored in a computer readable storage medium.

What is claimed is:

1. A vehicle control device configured to control a vehicle, the vehicle control device comprising a plurality of sensors and one or more processors configured to:
    create an action plan for autonomous driving of the vehicle;
    control at least a speed of the vehicle based on the action plan; and
    detect an object and output detection information on detection of the object using the plurality of sensors,
    wherein the one or more processors are configured to set a maximum deceleration of the vehicle for autonomous driving,
    wherein the one or more processors are configured to, when the plurality of sensors detect an obstacle, determine a collision probability map, which is a two-dimensional map of a collision probability distribution representing likelihood of a collision between the vehicle and the detected obstacle in a two-dimensional space in which a first axis represents a location of the vehicle, and a second axis represents a speed of the vehicle,
    wherein the collision probability map has been created based on a target stop location determined based on a predetermined target collision probability, the maximum deceleration, and the detection information, and
    wherein the one or more processors are configured to create a current action plan based on the collision probability map, the predetermined target collision probability, and a current location and a current speed of the vehicle.

2. The vehicle control device according to claim 1,
    wherein the collision probability map defines a plurality of grid points in the two-dimensional space,
    wherein a collision probability has been calculated for each of the plurality of grid points, and
    wherein the collision probability calculated for each of the plurality of grid points represents a probability of the vehicle to collide with the obstacle when the one or more processors instruct the vehicle to decelerate from the location and speed at the grid point with the maximum deceleration being an upper limit so as to stop at the target stop location.

3. The vehicle control device according to claim 2,
    wherein the detection information includes: a sensor configuration representing a combination of sensors included in the plurality of sensors and having detected the obstacle; a detected distance detected by the sensor configuration; and a detected time period during which the sensor configuration continuously having detected the obstacle, wherein the target stop location has been determined so that a collision probability calculated based on overlapping between an instruction achievement probability density distribution and an error distribution is equal to the predetermined target collision probability, the instruction achievement probability density distribution representing a probability density distribution of a location at which the vehicle will stop when the one or more processors instructs the vehicle to decelerate with the maximum deceleration so as to stop the vehicle at the target stop location, the error distribution representing a probability distribution whose center location is at the detected distance and whose distribution represents a distribution of a difference between a true distance from the vehicle to the obstacle and the detected distance, wherein the instruction achievement probability density distribution has been estimated with reference to the maximum deceleration, based on vehicle stopping characteristics of the vehicle, the vehicle stopping characteristics having been measured in advance by performing stopping operations according to decelerations instructed to the vehicle, and wherein the error distribution has been estimated with reference to the sensor configuration, the detected distance, and the detected time period, based on distance detecting characteristics of the plurality of sensors and the one or more processors, the distance detecting characteristics having been measured in advance by performing a measurement of a distance to a known object using the plurality of sensors and the one or more processors in a situation where a true distance to the known objection is known.

4. The vehicle control device according to claim 3, wherein a collision probability pc(Gxc,Gvc) of a grid point (Gxc,Gvc) in the collision probability map has been obtained by formula (I):

$$p_c(G_{xc}, G_{vc}) = \Sigma_{\hat{d}_1} \Sigma_{\hat{d}_2} \Sigma \epsilon_a p(\hat{d}_1) p(\hat{d}_2) p(\epsilon_a) p_c(g_{xn}, g_{vn}) \quad (1)$$

where:

$p(\hat{d}_1)$ represents a detection probability of the plurality of sensors and the one or more processors to, at the grid point $(G_{xc}, G_{vc})$, detect the obstacle, $p(\hat{d}_2)$ represents a probability of the plurality of sensors and the one or more processors to, at the grid point $(G_{xc}, G_{vc})$, detect the obstacle at a distance $\hat{d}_2$, $p_c(g_{xn}, g_{cn})$ represents a collision probability of a point $(g_{xn}, g_{cn})$ to which the vehicle will transition in the collision probability map when the vehicle is instructed by the one or more processors so as to decelerate with a deceleration a to stop at the target stop location from the grid point $(G_{xc}, G_{vc})$, and $p(\epsilon_a)$ represents a probability of an uncertainty $\epsilon_a$ associated with the deceleration a, the uncertainty $\epsilon_a$ representing difference between the deceleration a and a deceleration actually performed by the vehicle, wherein the point $(g_{xn}, g_{cn})$ is obtained by performing calculation in which the deceleration a is added with the uncertainty $\epsilon_a$, wherein grid points included in the plurality of grid points of the collision probability map and each having a speed of 0 are each given a collision probability based on a result of measuring a characteristic of the plurality of sensors and the one or more processors in advance, wherein grid points included in the plurality of grid points of the collision probability map and each located at the detected distance and having a non-zero speed are each given a predetermined collision probability, wherein a value of $p_c(g_{xn}, g_{cn})$ is approximately calculated based on collision probabilities of grid points, of the plurality of grid points, in the vicinity of the point $(g_{xn}, g_{cn})$, and wherein the collision probability $p_c(G_{xc}, G_{vc})$ for each of the plurality of grid points of the collision probability map is obtained by repeating summation $\Sigma\Sigma\Sigma$ of formula (I) from a corner grid point whose speed is 0 and whose location is at the detected distance in a direction in which the speed increases and/or the location approaches to the vehicle.

5. The vehicle control device according to claim 4, wherein the probability p(ca) has a normal distribution determined based on characteristics of the vehicle, the characteristics having been measured in advance.

6. The vehicle control device according to claim 1, wherein the one or more processors includes a collision probability map storage device storing a plurality of collision probability maps calculated based on: a result of a measurement process to measure a stop location of the vehicle to which a certain deceleration instruction has been given; a result of a measurement process to measure characteristics of the plurality of sensors and the one or more processors detecting a target object in a situation where a true distance to the target object is known; and the predetermined target collision probability, and wherein the one or more processors is configured to select a collision probability map from the plurality of collision probability maps stored in the one or more processors as the collision probability map to be used, based on the maximum deceleration and the detection information.

7. The vehicle control device according to claim 1, the one or more processors are configured to determine the collision probability map by calculating the collision probability map in a real-time manner while the vehicle is traveling, based on: parameters representing characteristics of the vehicle the plurality of sensors and the one or more processors; the predetermined target collision probability; the maximum deceleration; and the detection information, wherein the parameters have been derived from a result of a measurement process to measure a stop location of the vehicle to which a certain deceleration instruction has been given and a result of a measurement process to measure characteristics of the plurality of sensors and the one or more processors detecting a target object in a situation where a true distance to the target object is known.

8. The vehicle control device according to claim 7, wherein the one or more processors includes a collision probability map storage device storing a collision probability map calculated by the one or more processors in a real-time manner while the vehicle is traveling, and wherein the one or more processors is configured to, when the collision probability map stored in the one or more processors corresponds to the predetermined target collision probability, the maximum deceleration, and the detection information, determine the collision probability map stored in the one or more processors as the collision probability map to be used.

9. The vehicle control device according to claim 1, wherein the detection information includes: a sensor configuration representing a combination of sensors included in the plurality of sensors and having detected the obstacle; and a detected distance detected by the sensor configuration, wherein the one or more processors are configured such that when the obstacle has been detected by only a subset of the plurality of sensors and the detected distance is equal to or greater than a predetermined distance threshold value, the one or more processors regard the obstacle as not existing and creates an action plan for performing a cruising operation as the current action plan, and that when the obstacle has been detected by only a subset of the plurality of sensors and the detected distance is less than the predetermined distance threshold value, the one or more processors regard the obstacle as existing and creates an action plan for performing a preliminary braking operation as the current action plan.

10. A method for controlling a vehicle by a vehicle control device implemented using one or more processors and configured to control at least a speed of the vehicle based on an action plan for autonomous driving by the vehicle, the method comprising:

setting, by the vehicle control device, a maximum deceleration of the vehicle for autonomous driving;

detecting a distance between the vehicle and an obstacle and outputting detection information on detection of the obstacle, by the vehicle control device and a plurality of sensors;

when the obstacle is detected, determining, by the vehicle control device, a collision probability map, which is a two-dimensional map of a collision probability distribution representing likelihood of a collision between the vehicle and the detected obstacle in a two-dimensional space in which a first axis represents a location of the vehicle, and a second axis represents a speed of the vehicle; and controlling, by the vehicle control device, at least the speed of the vehicle based on the determined collision probability map, a predetermined target collision probability, and a current location and a current speed of the vehicle, wherein the detection information includes: a sensor configuration representing a combination of sensors included in the plurality of sensors and having detected the obstacle; a detected distance detected by the sensor configuration; and a detected time period during which the sensor configuration continuously having detected the obstacle, wherein the collision probability map has been created based on a target stop location determined based on the predetermined target collision probability, the maximum deceleration, and the detection information, wherein the collision probability map defines a plurality of grid points in the two-dimensional space, wherein a collision probability has been calculated for each of the plurality of grid points, and wherein the collision probability calculated for each of the plurality of grid points represents a probability of the vehicle to collide with the obstacle when the vehicle control device instructs the vehicle to decelerate from the location and the speed at the grid point with the maximum deceleration being an upper limit so as to stop at the target stop location.

11. The vehicle control device according to claim 1, wherein the predetermined target collision probability is a predetermined constant value of less than 1.0, and the target stop location is determined as a location located before the detected obstacle.

12. The method for controlling the vehicle according to claim 10, wherein the predetermined target collision probability is a predetermined constant value of less than 1.0, and the target stop location is determined as a location located before the detected obstacle.

13. The vehicle control device according to claim 1, wherein the collision probability map includes: a low collision probability region having collision probabilities lower than a first threshold value that is lower than the predetermined target collision probability; and a high collision probability region having collision probabilities lower than the predetermined target collision probability but higher than a second threshold value that is equal to or higher than the first threshold value, wherein the one or more processors are configured to, when the current location and the current speed of the vehicle are in the low collision probability region, create an action plan that keeps a speed currently set for autonomous driving and allows sudden braking as the current action plan, wherein the one or more processors are configured to, when the current location and the current speed of the vehicle are in the high collision probability region, create an action plan that avoids sudden braking by preliminary braking as the current action plan, which preliminary braking repeats short-time braking.

* * * * *